United States Patent
Çetintaş et al.

(10) Patent No.: US 12,511,804 B2
(45) Date of Patent: Dec. 30, 2025

(54) SYSTEMS AND METHODS FOR AUTOMATING CONVERSION OF DRAWINGS TO INDOOR MAPS AND PLANS

(71) Applicant: Pointr Limited, London (GB)

(72) Inventors: Ege Çetintaş, Ankara (TR); Melih Peker, Ankara (TR); Can Tunca, Istanbul (TR)

(73) Assignee: Pointr Limited, London (GB)

( * ) Notice: Subject to any disclaimer, the term of this patent is extended or adjusted under 35 U.S.C. 154(b) by 223 days.

(21) Appl. No.: 18/216,900

(22) Filed: Jun. 30, 2023

(65) Prior Publication Data
US 2023/0377227 A1 Nov. 23, 2023

Related U.S. Application Data

(63) Continuation-in-part of application No. 18/052,852, filed on Nov. 4, 2022, now Pat. No. 11,769,287.
(Continued)

(51) Int. Cl.
*G09G 5/00* (2006.01)
*G06F 30/13* (2020.01)
(Continued)

(52) U.S. Cl.
CPC .............. *G06T 11/60* (2013.01); *G06F 30/13* (2020.01); *G06N 20/00* (2019.01); *G06T 11/20* (2013.01)

(58) Field of Classification Search
CPC ......... G06T 11/60; G06T 19/00; G06T 11/00; G06T 11/20; G06T 11/206; G06T 7/0012;
(Continued)

(56) References Cited

U.S. PATENT DOCUMENTS 7,227,893 B1   6/2007   Srinivasa et al.
10,539,424 B2  1/2020   Roy et al.
(Continued)

FOREIGN PATENT DOCUMENTS

CN   111854758 A   10/2020

OTHER PUBLICATIONS

Extended European Search Report mailed Aug. 3, 2023 for European Application No. 23155925.3-1009, 6 pages.
(Continued)

*Primary Examiner* — Gordon G Liu
(74) *Attorney, Agent, or Firm* — Dickinson Wright PLLC

(57) ABSTRACT

Automating conversion of drawings to indoor maps and plans. One example is a computer-implemented method comprising: preprocessing a CAD drawing to create a text database containing text from the CAD drawing and associations of the text with locations within the CAD drawing; determining a floor depicted in the CAD drawing, the determining results in a floor-level outline; identifying a plurality of room-level outlines within the floor-level outline, the plurality of room-level outlines corresponds to a respective plurality of rooms; selecting a name of a first room from the plurality of rooms, the selecting based on text within the text database; and creating an indoor map including the name of the first room, the name of the first room associated with a location of the first room within the floor-level outline.

16 Claims, 45 Drawing Sheets

Related U.S. Application Data which is a continuation of application No. 17/732,652, filed on Apr. 29, 2022, now Pat. No. 11,514,633.

(60) Provisional application No. 63/318,522, filed on Mar. 10, 2022.

(51) Int. Cl.
*G06N 20/00* (2019.01)
*G06T 11/20* (2006.01)
*G06T 11/60* (2006.01)

(58) Field of Classification Search
CPC .......... G06T 2207/10081; G06T 2207/30004; G06F 9/4443; G06F 3/0481; G06F 30/13; G06F 3/04845; G06F 3/04883; G06F 40/143; G06F 16/54; G06F 16/56; G06F 16/5838; G06V 20/20; G06V 10/7753; G11B 27/10; H04N 21/47217; G16H 30/20; G06N 20/20; G06N 3/045
USPC .......................................................... 345/619
See application file for complete search history.

(56) References Cited

U.S. PATENT DOCUMENTS

| | | | |
|---|---|---|---|
| 11,156,465 | B2 | 10/2021 | Roy et al. |
| 11,190,902 | B1 | 11/2021 | Brosowsky et al. |
| 11,514,633 | B1 | 11/2022 | Cetintas et al. |
| 11,657,555 | B1 | 5/2023 | Cetintas et al. |
| 11,725,948 | B2 | 8/2023 | Roy et al. |
| 11,769,287 | B1 | 9/2023 | Cetintas et al. |
| 2004/0049307 | A1 | 3/2004 | Beatty et al. |
| 2010/0214290 | A1 | 8/2010 | Shiell et al. |
| 2015/0199557 | A1 | 7/2015 | Zhang et al. |
| 2019/0311533 | A1* | 10/2019 | Doh ................. G06T 7/70 |
| 2020/0126003 | A1* | 4/2020 | McLaughlin, III .... G06Q 10/02 |
| 2021/0073302 | A1* | 3/2021 | Srinivasaraghavan ...................... G06F 40/205 |
| 2021/0073433 | A1* | 3/2021 | Austern ................. G06F 30/13 |
| 2021/0073435 | A1 | 3/2021 | Segev et al. |
| 2021/0150088 | A1 | 5/2021 | Gallo et al. |
| 2021/0241072 | A1* | 8/2021 | Katzenelson .......... G06N 3/045 |
| 2021/0409903 | A1 | 12/2021 | Shapiro et al. |
| 2022/0035973 | A1 | 2/2022 | Liebman et al. |
| 2022/0138621 | A1 | 5/2022 | Patil et al. |
| 2022/0147026 | A1 | 5/2022 | Poelman et al. |
| 2023/0157506 | A1 | 5/2023 | Tamino et al. |
| 2023/0306664 | A1 | 9/2023 | Cetintas et al. |

OTHER PUBLICATIONS

Simonsen, Christoffer P. et al., "Generalizing Floor Plans Using Graph Neural Networks", International Conference on Image Processing (ICIP), Sep. 2021, pp. 654-658.

"Import AutoCAD Files in 1 Minute Only", https://www.mapwize.io/news/2019-01-import-autocad-files-in-1-minute--only/, ServiceNow, Jan. 2019, 2 pages.

"Manage all your indoor maps from a dedicated platform", https://visioglobe.com/indoor-mapping-tools, Visioglobe.com, Accessed: Jul. 6, 2022, 6 pages.

"Integrate Indoor Mapping Data Format {IMDF} Using FME", https://visioglobe.com/indoor-mapping-tools, Safe Software Accessed: Jul. 6, 2022, 9 pages.

DIY Augmented Reality Indoor Mapping for your venue, https://www.safe.com/blog/2018/09/diy-augmented-reality-indoor-mapping-for-your-venue/, Safe Software, Accessed: Jul. 6, 2022, 11 pages.

"Covert DWG to IMDF," https://www.safe.com/blog/2018/09/diy-augmented-reality-indoor-mapping-for-your-venue/, Safe Software, Accessed: Jul. 6, 2022, 6 pages.

Sarker, Iqbal H., "Deep Learning: A Comprehensive Overview of Techniques, Taxonomy, Applications and Research Directions", SN Computer Science, Aug. 18, 2021, 20 pages.

Huang H.C., et al., "Graph Theory-based Approach for Automatic Recognition of CAD Data", ScienceDirect, Engineering Applications of Artificial Intelligence 21, 2008, 7 pages.

Tang, Rui, et al., "Automatic Structural Scene Digitalization", Centre for the Analysis of Motion, Entertainment Research and Applications, University of Bath UK, Nov. 17, 2017, 16 pages.

Tang, Hao, et al., "Automatic Pre-Journey Indoor Map Generation Using AutoCAD Floor Plan", The Journal on Technology and Persons with Disabilities, Sep. 2017, 17 pages.

"Apple Indoor Maps and Positioning", Apple Inc., Apr. 2021, 22 pages.

De Las Heras, Lluis-Pere, et al., "Statistical Segmentation and Structural Recognition for Floor Plan Interpretation", German Research Center for AI, Dec. 2013, 18 pages.

\* cited by examiner

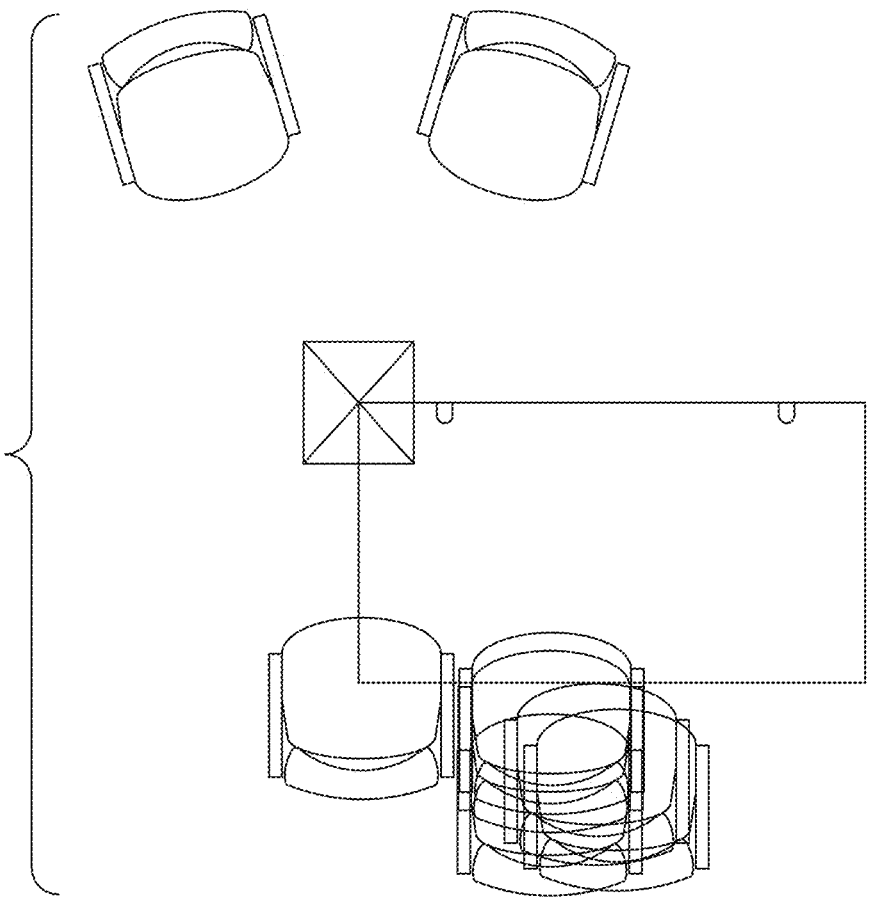
FIG. 4A
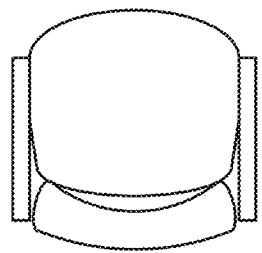
FIG. 4B

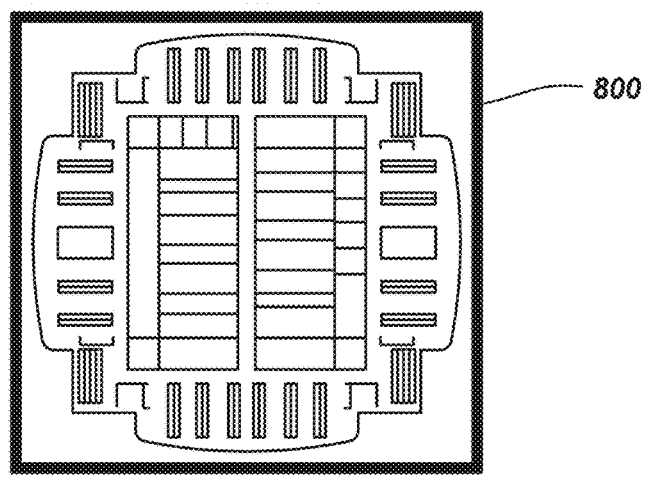
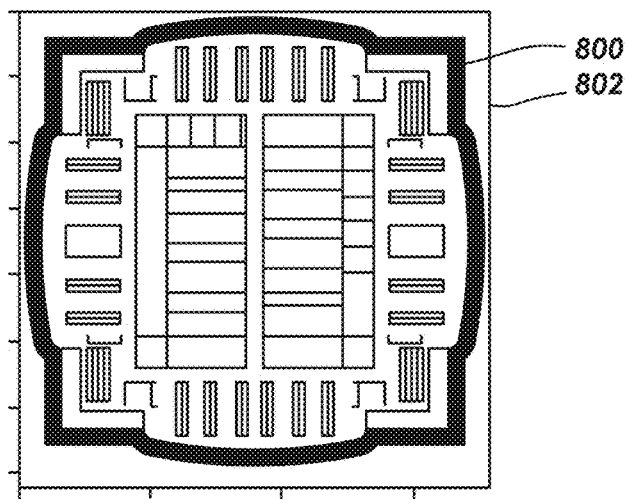
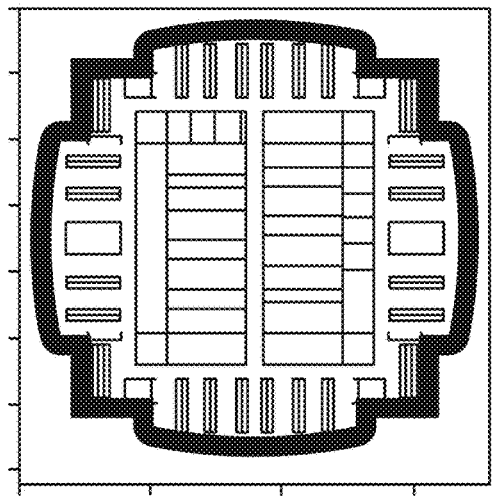
FIG. 8

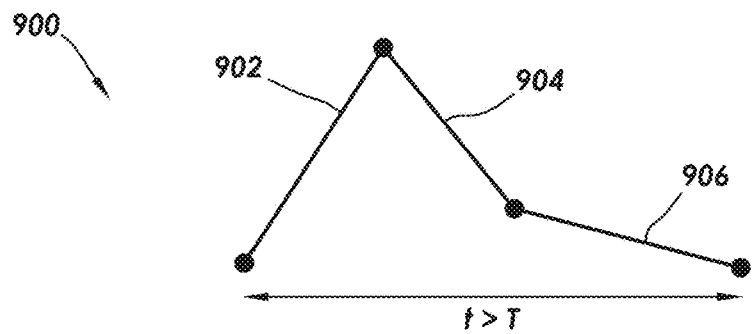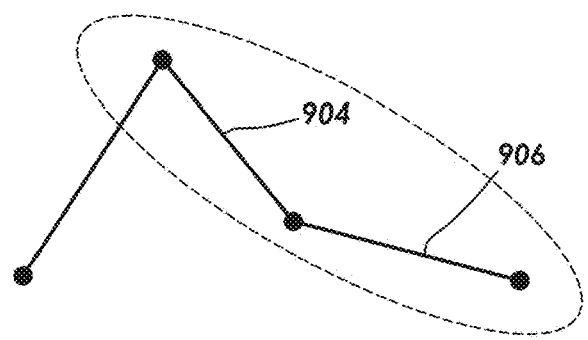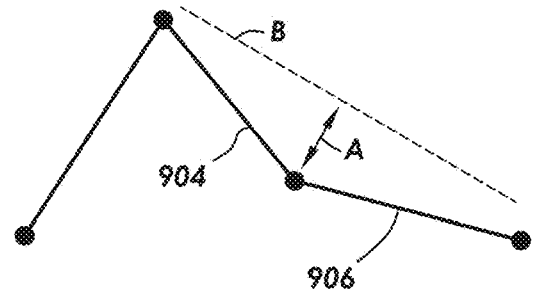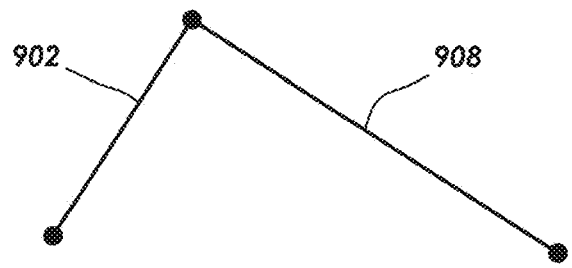
FIG. 9

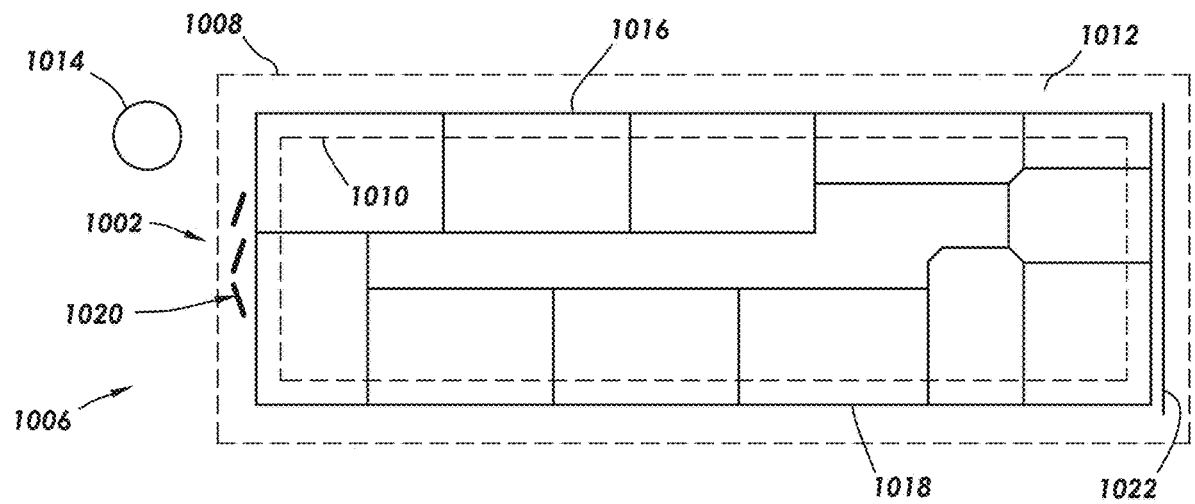
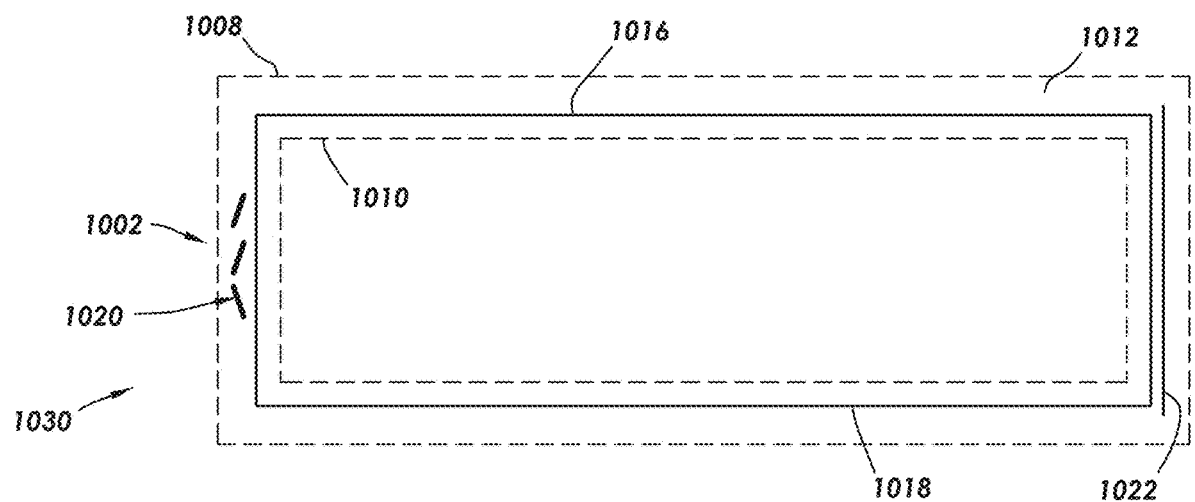
FIG. 10B

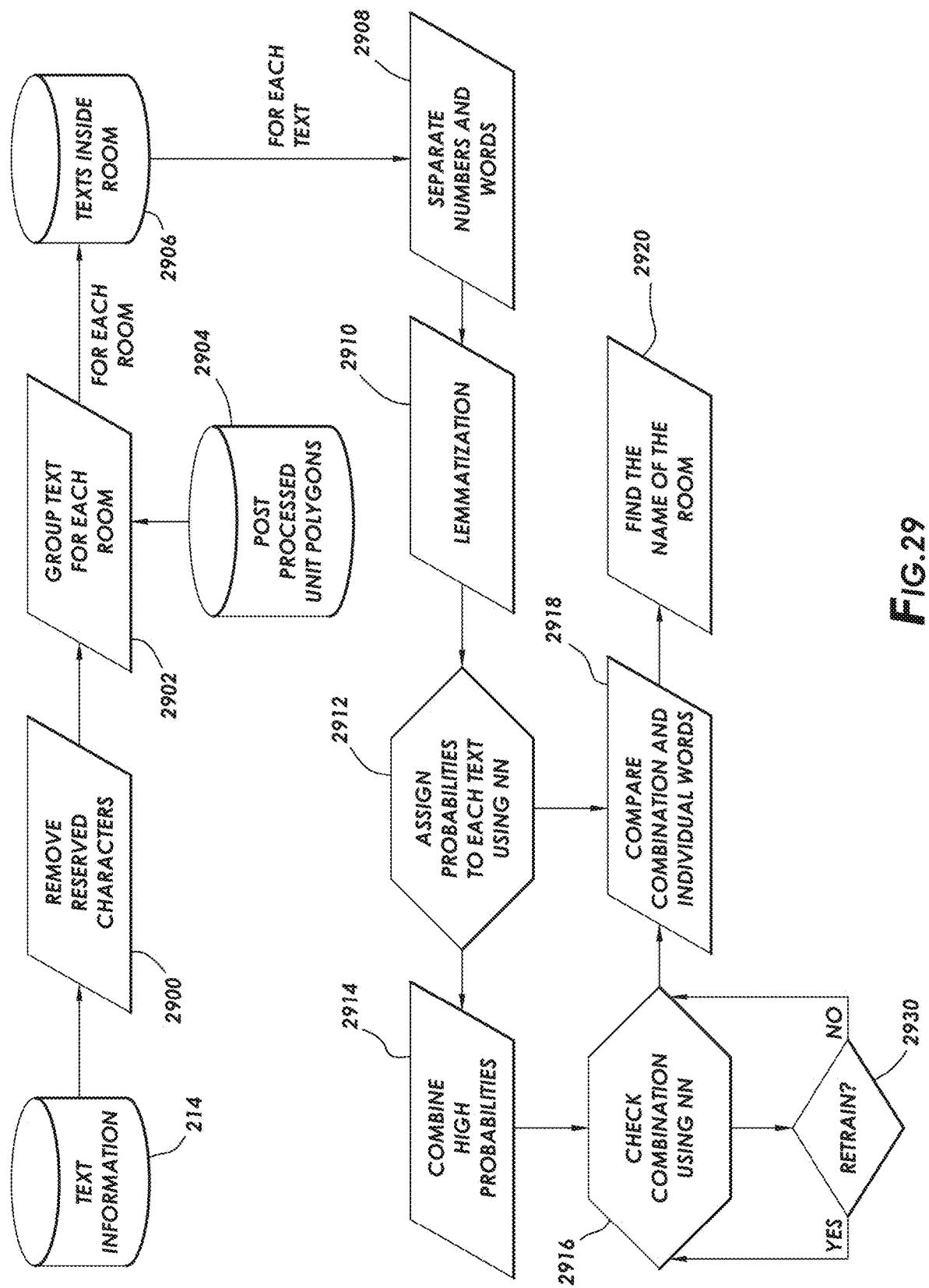

SYSTEMS AND METHODS FOR AUTOMATING CONVERSION OF DRAWINGS TO INDOOR MAPS AND PLANS

CROSS-REFERENCE TO RELATED APPLICATIONS

This application is a continuation-in-part of U.S. application Ser. No. 18/052,852 filed Nov. 4, 2022 titled "Systems and Methods for Automating Conversion of Drawings to Indoor Maps and Plans." The '852 Application is a continuation of U.S. application Ser. No. 17/732,652 filed Apr. 29, 2022 titled "Systems and Methods for Automating Conversion of Drawings to Indoor Maps and Plans." The '652 Application claims the benefit of U.S. Provisional Application No. 63/318,522 filed Mar. 10, 2022 and titled "Systems and Methods for Automating Conversion of Drawings to Indoor Maps and Plans." All the noted applications are incorporated herein by reference as if reproduced in full below.

BACKGROUND

Indoor navigation using a portable computer (e.g., cellular phone) is a subset of overall navigation. In indoor navigation, the ability for the portable computer to receive signals from global positioning system (GPS) satellites may be limited, and thus portable computers may determine indoor location using signals from locally placed beacon devices, such as Bluetooth Low Energy (BLE) devices or Ultra Wide Band (UWB) devices. Knowing the location of the portable computer relative to beacon devices is only part of the process. Conveying the location information to the user may also involve showing the user's position on an indoor map, and perhaps even providing route guidance to arrive at the endpoint location.

Indoor maps may be created from architectural drawings, such as CAD drawings generated by the architect as the basis to buildout the indoor space. However, there are no universal standards for the contents of architectural drawings. For example, one architect may call a room a "meeting room" and a second architect may call the same room a "conference room." Moreover, the symbols used by one architect to depict objects (e.g., furniture) are likely not the same as the symbols used by another architect to depict the same objects.

Notwithstanding the lack universal standards for architectural drawings, the CAD drawings are merely data depicting points, lines, polygons, and text stored with the computer file that is the CAD drawing. The points, lines, polygons, and text do not inherently identify the depicted space or location within the building. For example, a set of lines within the CAD drawing may depict a room, and another set of lines may depict a door into the room. However, the lines are not inherently a room, as lines could be used to depict many different objects (e.g., outside walls, inside walls, conference tables). At very fine detail, it may be that the lines that depict the walls of the room do not even touch on the respective ends.

For these reasons, and many others, creating indoor maps from the architectural CAD drawings is a cumbersome process. While some "automated" tools exist, those tools require significant human interaction at many stages throughout the process. Thus, any method or system that increases the automation of creating indoor maps from CAD drawings would provide a competitive advantage in the marketplace.

SUMMARY

One example is a computer-implemented method of extracting room names from CAD drawings, the method comprising: preprocessing, by a device, a CAD drawing to create a text database containing text from the CAD drawing and associations of the text with locations within the CAD drawing; determining, by a device, a floor depicted in the CAD drawing, the determining results in a floor-level outline; identifying, by a device, a plurality of room-level outlines within the floor-level outline, the plurality of room-level outlines corresponds to a respective plurality of rooms; selecting, by a device, a name of a first room from the plurality of rooms, the selecting based on text within the text database; and creating, by a device, an indoor map including the name of the first room, the name of the first room associated with a location of the first room within the floor-level outline.

Another example is a computer-implemented method of determining a geo-location, the method comprising: determining, by a device, a floor-level outline of a floor depicted in a CAD drawing; receiving, by a device, an approximate geo-location of a building to which the CAD drawing applies; obtaining, by a device, an overhead image of a target area encompassing the approximate geo-location, the overhead image comprising a plurality of buildings within the target area; identifying, by a device, a plurality of building footprints within the target area; calculating, by a device, a plurality of distance functions that relate the floor-level outline to the each of the plurality of building footprints, the calculating creates a plurality of similarity scores; selecting, by a device, a building footprint from plurality of building footprints, the selecting based on the plurality of similarity scores; and calculating, by a device, a final geo-location of the building corresponding to the building footprint.

Yet another example is a computer-implemented method of machine learning, the method comprising: receiving, by a device, a first set of updates to a first indoor map, the first indoor map previously created by a production machine-learning system having a production map accuracy; training, by a device, a supporting machine-learning system using the first set of updates to the first indoor map; and then applying, by a device, test data to the supporting machine-learning system, the applying results in first-evaluation indoor map with a first-evaluation map accuracy; and when the first-evaluation map accuracy is within a predetermined window above the production map accuracy refraining, by a device, from updating the production machine-learning system based on the first set of updates.

Another is a computer-implemented method of creating an indoor map from a CAD drawing, the method comprising: preprocessing, by a device, an original CAD drawing to create a modified CAD drawing, a text database containing text from the original CAD drawing, a CAD vector-image of the modified CAD drawing, and a CAD raster-image of the modified CAD drawing; determining, by a device, a floor depicted in the CAD drawing by applying the CAD raster-image, the CAD vector-image, and the text database to a floor-level machine-learning algorithm, the determining results in a floor-level outline; sensing, by a device, furniture depicted on the floor by applying the floor-level outline, the CAD vector-image, and the text database to a furniture-level machine-learning algorithm, the sensing creates a set of furniture entities; identifying, by a device, each room depicted in the CAD drawing by applying the floor-level outline, the set of furniture entities, CAD vector-image, and the text database to room-level machine-learning algorithm, the identifying creates a plurality of room-level outlines; and creating, by a device, an indoor map by combining the set of furniture entities and the plurality of room-level outlines.

Yet another example is a computer-implemented method of creating an indoor map from a CAD drawing, the method comprising: preprocessing, by a device, an original CAD drawing and thereby creating a modified CAD drawing, a text database containing text from the modified CAD drawing, a CAD vector-image of the modified CAD drawing, and a CAD raster-image of the modified CAD drawing; creating, by a device, a floor-level bounding line that encircles a floor depicted in the modified CAD drawing, the creating by applying the CAD raster-image, the CAD vector-image, and the text database to a floor-level machine-learning algorithm; applying, by a device, an active contour model to an initial floor-level segmentation created from the floor-level bounding line, the active contour model creates an intermediate floor outline that delineates the floor; removing, by a device, drawing-entities from the modified CAD drawing that are a predetermine distance away from the intermediate floor outline to create a final floor outline; and creating, by a device, an indoor map for the floor using the final floor outline.

Another example is a computer-implemented method of creating an indoor map from a CAD drawing, the method comprising: preprocessing, by a device, an original CAD drawing to create a modified CAD drawing, a text database containing text from the original CAD drawing, a CAD vector-image of the modified CAD drawing, and a CAD raster-image of the modified CAD drawing; determining, by a device, a floor depicted in the CAD drawing, the determining results in a floor-level bounding line; sensing, by a device, furniture depicted on the floor by applying the floor-level bounding line, the CAD vector-image, and the text database to machine-learning algorithms, the sensing results in a plurality of furniture entities and associated location information; identifying, by a device, each room depicted in the CAD drawing within the floor-level bounding line, the identifying results in a plurality of room outlines; and creating, by a device, an indoor map for the floor by combining the plurality of furniture entities and associated location information with the plurality of room outlines.

Yet another example is a computer-implemented method of creating an indoor map from a CAD drawing, the method comprising: preprocessing, by a device, an original CAD drawing to create a modified CAD drawing, a text database containing text from the original CAD drawing, a CAD vector-image of the modified CAD drawing, and a CAD raster-image of the modified CAD drawing; creating, by a device, a floor-level outline; sensing, by a device, furniture depicted on the floor, the sensing creates set of furniture entities; identifying, by a device, a room depicted in the CAD drawing by: applying the floor-level outline and the CAD vector-image to a first machine-learning algorithm to produce a room-level bounding line and a first probability distribution regarding identity of the room; applying the room-level bounding line and the text database to a second machine-learning algorithm to produce a second probability distribution regarding identity of the room; applying the first and second probability distributions to a third machine-learning algorithm to generate a room identity; and selecting, based on the room-level bounding line, a room-level outline; and creating, by a device, the indoor map for a floor using the floor-level outline, the room-level outline and the room identity.

While the preceding examples are presented as computer-implemented methods, such examples may be equivalently stated as non-transitory computer-readable mediums and/or computer systems.

BRIEF DESCRIPTION OF THE DRAWINGS

For a detailed description of example embodiments, reference will now be made to the accompanying drawings in which:

FIG. 4A shows a partial rendering of CAD drawing depicting an overhead view of desk, desk chairs, and guest chairs, in accordance with at least some embodiments;

FIG. 4B shows a partial rendering of CAD drawing depicting an overhead view of the desk and desk chair after simplification, in accordance with at least some embodiments;

FIG. 8 show a series of overhead view drawings of the active contour model at various stages, in accordance with at least some embodiments;

FIG. 9 graphically shows an example of simplifying line segments within an incremental length of the bounding line, and in accordance with at least some embodiments;

FIG. 10B graphically shows filtering drawing-entities, continuing from FIG. 10A;

FIG. 29 shows a flow diagram of selecting room names in accordance with at least some embodiments;

DEFINITIONS

Figure 1:
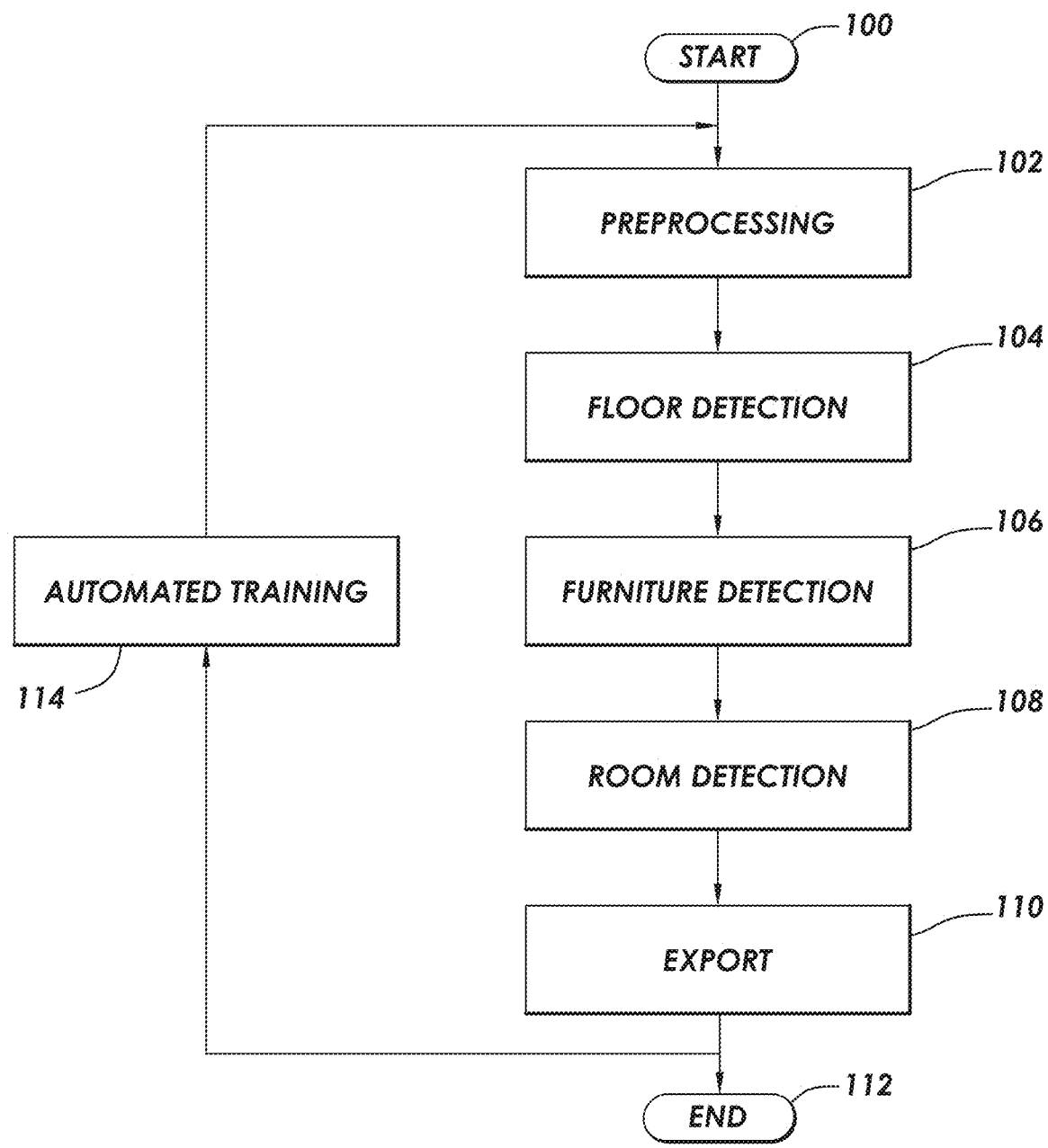
FIG. 1 shows a flow diagram of a method in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or a direct connection. Thus, if a first device couples to a second device, that connection may be through a direct connection or through an indirect connection via other devices and connections.

"Bounding box" shall mean a closed line segment having four vertices.

"Bounding line" shall mean a closed line segment having four or more vertices. Thus, a bounding line may be, in some cases, a bounding box.

"CAD" shall mean computer-aided design.

"CAD drawing" shall mean a computer file containing data that, when rendered by a CAD program, shows a design. One example file format for a CAD drawing is the DXF format.

"Vector-image" shall mean a computer file containing data indicating relative locations of geometric shapes that, when rendered by a computer program, show a design.

"Raster-image" shall mean a computer file containing data indicating pixels of an array of a raster-graphics image that, when rendered by a computer program, show a design.

"Machine-learning algorithm" shall mean a computer algorithm, such as a convolution neural network, that creates a mathematical or computational model of relationships between input data and output data based on being trained by a set of training data, and then the machine-learning algorithm applies the mathematical or computational model to non-training data to produce predictions.

"Active contour model," sometimes referred to as a snake algorithm, shall mean a deformable model that deforms in the direction of gradients, and stops deformation at high gradient locations.

"Generative adversarial network" or "GAN" shall mean two or more machine-learning algorithms (e.g., two neural networks) that work together (e.g., in an adversarial sense) to produce a room-level bounding-line.

The terms "input" and "output" when used as nouns refer to connections (e.g., software), and shall not be read as verbs requiring action. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"GeoJSON" shall mean an open standard geospatial data interchange format that represents geographic features and related non-spatial attributes.

In the claims, reference to "a processor" and later to "the processor", in conformance with antecedent basis requirements, shall not be read to require only one processor. The reference to "a processor" may be one or more processors, and similarly the later reference with proper antecedent to "the processor" may likewise be one or more processors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to systems and methods for automating conversion of drawings to indoor maps and plans. The example process may be conceptually, though not necessarily physically, separated into preprocessing of the input CAD drawing, performing floor detection (e.g., first floor or story, second floor or story) within the CAD drawing, performing furniture detection for each floor, performing room detection for each floor, and then generating an indoor map based on the outputs from each stage. In many cases, the processing may proceed with little or no human interaction, and thus greatly improves the speed and quality of creating indoor maps from CAD drawings. The description now turns to a high-level overview.

FIG. 1 shows a flow diagram of an example computer-implemented method for automating conversion of drawings to indoor maps and plans. Each of the example steps is introduced here, and then discussed in detail below. In particular, the method starts 100 and comprises preprocessing 102. In the example preprocessing an input CAD drawing or original CAD drawing is subject to various reductions in complexity (e.g., removing leader lines, removing text) to create a modified CAD drawing. The modified CAD drawing may be the original computer file itself with various portions removed, or the modified CAD drawing may be a separately saved computer file (leaving the original CAD drawings unchanged). Still considering the example preprocessing 102, in various examples a text database may be created using text (e.g., words) extracted from the original CAD drawings. Moreover, to be useful for later steps, the text in the text database may be associated with location information indicating where, in the coordinate space of the CAD drawing, the text resided. Further still, the example preprocessing 102 may create representations of the CAD drawing in different file formats, such as creating a CAD vector-image based on the modified CAD drawing, and creating a CAD raster-image based on the modified CAD drawing. The modified CAD drawing, the text database, the CAD vector-image, and the CAD raster-image may be provided to the floor detection 104 stage.

The next example stage in the processing is the floor detection 104 stage. As the name implies, the floor detection 104 is used to detect stories or floors shown in the CAD drawings, and to generate a floor outline for each floor. For example, the original CAD drawing may show the layout of one or more floors of a building within a single computer file. The floor detection 104 identifies each floor shown in the CAD drawings. For buildings that have a uniform exterior footprint for all floors, the floor detection may be a relatively straightforward task—once the first floor outline is determined, all the floors have the same outline. However, for buildings that change shape with changing exterior elevation, or for CAD drawings in which only partial floors are depicted, determining the outline for each floor is more challenging. In various examples, the floor detection 104 may be implemented by applying the CAD raster-image, the CAD vector-image, and the text database to a floor-level machine-learning algorithm.

Still referring to FIG. 1, the next example stage in the processing is furniture detection 106. As the name implies, the furniture detection 106 is used to sense furniture, and locations of the furniture, within the coordinate space of the CAD drawing. In various examples, the furniture detection 106 may be implemented by applying a floor-level bounding line, the CAD vector-image, and the text database to a furniture-level machine-learning algorithm. The furniture detection 106 is repeated for each floor found in the CAD drawings. The furniture-level machine-learning algorithm may create a plurality of furniture raster-images, one each for each floor. The furniture raster-image(s) may be supplied to the room detection 108 stage.

The next example stage in the processing is room detection 108. As the name implies, the room detection 108 is used to identify each room shown on each floor in the CAD drawing. The identifying may have two conceptual components: identifying a room outline; and identifying the intended use of the room (e.g., executive office, conference room, water closet). In various examples, the room detection 108 may be implemented by applying the output of the floor detection 104 (e.g., a floor outline), the output of the furniture detection 106 (e.g., furniture outlines), the CAD vector-image, and the text database to a room-level machine-learning algorithm. The room-level machine-learning algorithm may create a plurality of room outlines, one each for each room on each floor. The room outlines, and corresponding room identities, may be supplied to the export 110 stage.

Still referring to FIG. 1, the next example stage is the export 110 stage. The export stage 110 is designed and constructed to conglomerate the floor outlines, the room outlines, the room identities, and the furniture outlines created by the prior stages, and create an indoor map (e.g., GeoJSON) for each floor depicted in the CAD drawing. And thereafter, for a particular indoor map, the method ends 112; however, the example method may begin anew with a new set of CAD drawings.

Couple of points before proceeding. Though the example flow diagram of FIG. 1 shows the process to be linear, the input data to the export 110 stage may be the output of any one or more of the prior stages directly. For example, the room detection 108 may receive as input the output from the floor detection and the output from the furniture detection. Also as shown, prior to any particular implementation of the method, the underlying machine-learning algorithms may be subjected to automated training 114, as additional information about any prior-created indoor map is received, such as asynchronous review by professional reviewers, or by comparison of the indoor maps to ground truth (e.g., comparing the indoor map created from CAD drawings to the physical space). The specification now turns to preprocessing 102 in greater detail.

Preprocessing

Figure 2:
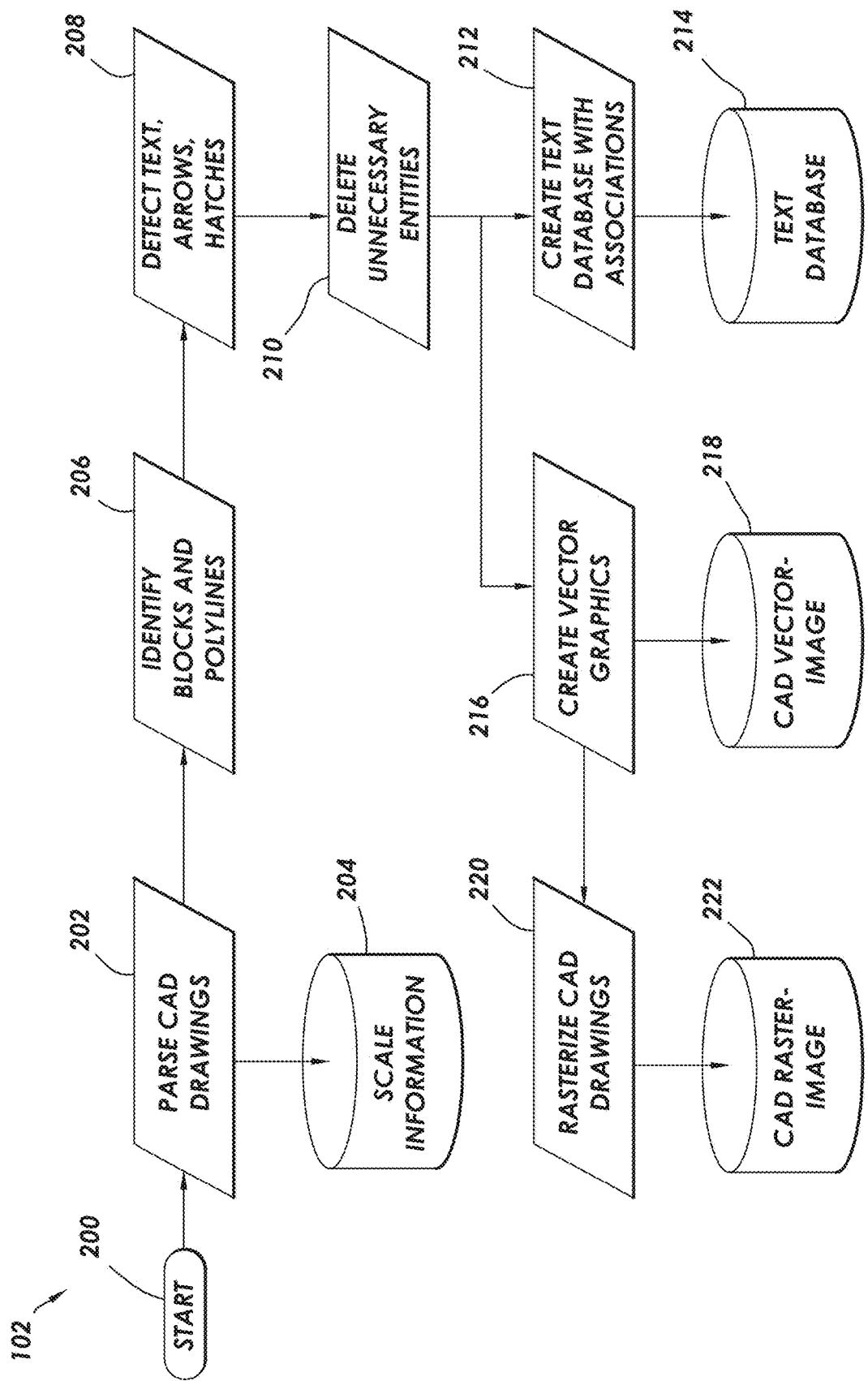
FIG. 2 shows a flow diagram of preprocessing in accordance with at least some embodiments.

FIG. 2 shows a flow diagram of the example preprocessing. CAD drawings may be implemented in many different file formats (e.g., DXF). The example CAD drawing may be a collection of data identifying points, lines, polygons, groups of objects, and text (e.g., words) within a file, and with each component having a location or set of locations in the coordinate space of the CAD drawing. For example, a line showing a wall may be represented by a line segment with two vertices, one vertex on each end of the line segment, and each vertex may define a location in the coordinate space of the CAD file. As other example, text (e.g., words) within the CAD drawing may be associated with a drawing-entity, such as a group of objects that represent furniture (e.g., a chair). The group of objects represented thus has a location within the coordinate space of the CAD drawing, and by being associated with the group of objects the text may likewise be associated with location information. In other cases, the text may have an attribute that directly associates the text with a location within the coordinate space of the CAD drawing, and thus the association of text with a drawing object is not strictly required.

The example workflow starts 200 and turns to parsing the original CAD drawing 202 to create scale information. In the example of FIG. 2, the scale information is placed in the scale-information 204 database, but the scale information may be stored and passed to other stages in any suitable form (e.g., storage within a globally accessible memory).

The next step in the example process is identifying blocks and polylines 206, and similarly detecting text, arrows, and hatches 208. These two steps may be described as finding, within the CAD drawing, various drawing-entities of interest, and then where possible deleting unnecessary entities 210. The steps are described visually below in reference to example drawings objects, but for now the steps 206, 208, and 210 may be considered to be finding and removing drawing-entities within the CAD drawing that obfuscate underlying floor-level and room-level detection (e.g., leader lines, text, words), and likewise saving information that may be helpful later in identifying drawing objects (e.g., chair, desk) or identifying the purpose of an interior space (e.g., conference room, water closet). For example, the method of FIG. 2 may remove one or more of: leader lines from the CAD drawings; text from the CAD drawing; cross-hatching from the CAD drawing; and duplicate furniture entities from the CAD drawing. The identifying, detecting, and extraction or deletion thus creates (i.e., one of the outputs of block 210) a modified CAD drawing.

In example cases, the text information extracted from the CAD drawing is used to create a text database with associations, and the resultant is shown in FIG. 2 as a text database 214. The contents of the text database 214 are made available to later processing steps (e.g., floor detection 104, furniture detection 106, and room detection 108). In the example, the resultant modified CAD drawing is used as the input to create a vector-graphics 216 representation of the modified CAD drawing, the vector-graphics representation hereafter referred to as a CAD vector-image 218. The CAD vector-image 218 is made available to later processing steps (e.g., floor detection 104, furniture detection 106, and room detection 108). Finally, the CAD vector-image 218 is used as the input to rasterize the CAD drawings 220, resulting in a CAD raster-image 222. The CAD raster-image 222 is made available to later processing steps (e.g., floor detection 104, furniture detection 106, and room detection 108). Examples of the preprocessing 102 of FIG. 2 are shown graphically in the following figures.

Figure 3A:
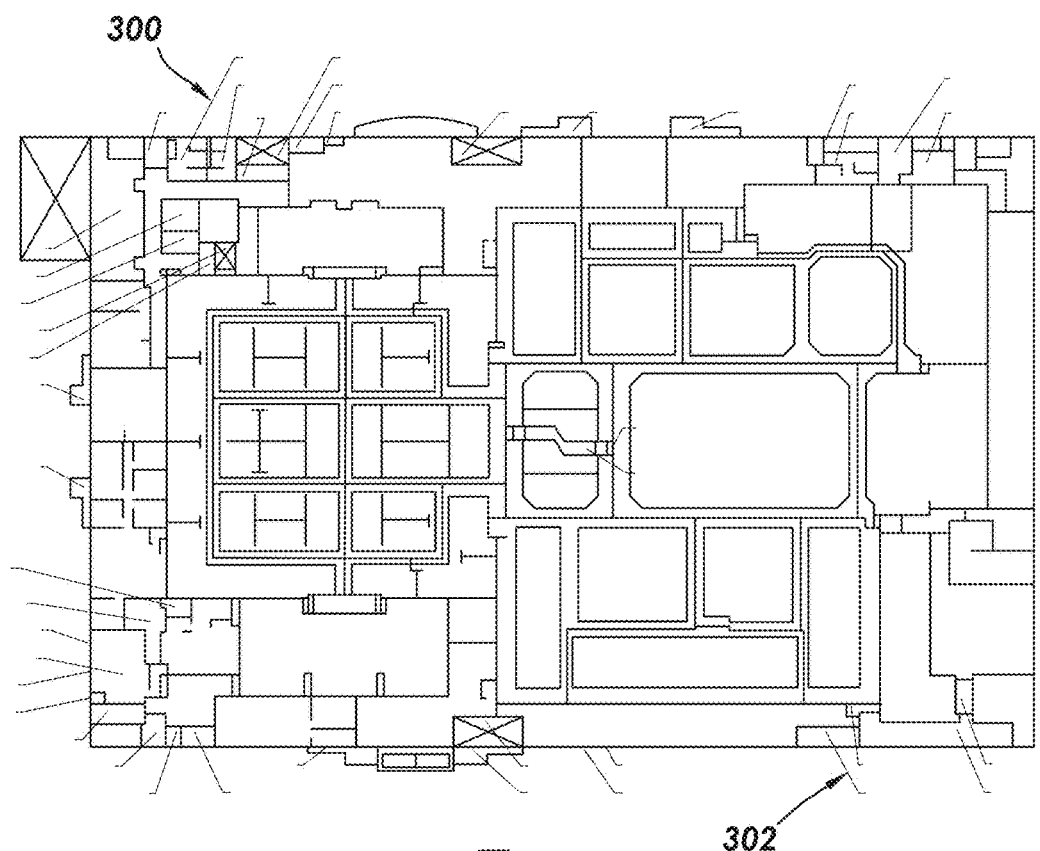
FIG. 3A shows a rendering of a CAD drawing depicting an overhead view of a floor of a building, in accordance with at least some embodiments.
Figure 3B:
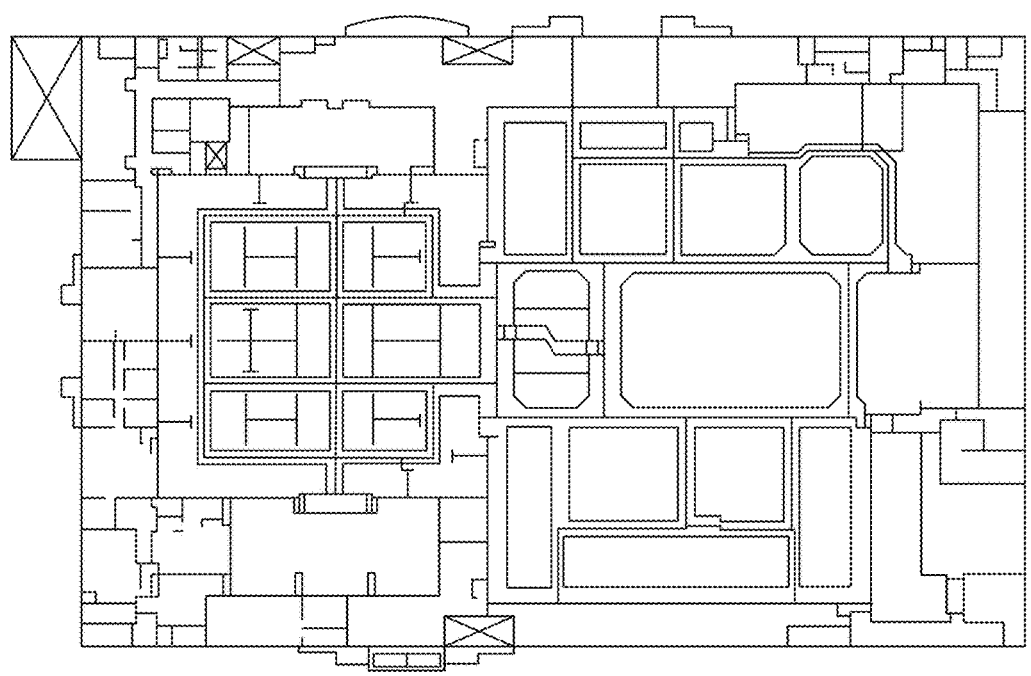
FIG. 3B shows a rendering of a CAD drawing depicting an overhead view of a floor of a building with leader lines and text removed, in accordance with at least some embodiments.

FIG. 3A shows a rendering of a CAD drawing of an overhead view of a floor of a building. In particular, visible are many rooms, hallways, water closets, and the like. In many cases, the interior rooms are associated with arrows, lead lines, or leader lines, such as leader lines 300 and 302. In practice, each leader line is associated with the text to provide additional context for the identity and/or purpose of the object or space at the terminal end of the leader line, but in FIG. 3A such text information has already been removed (and placed in the text database). As alluded to above, the lines or polylines representing the leader lines may not inherently identifying themselves as leader lines. Thus, in example cases the leaders lines are identified (e.g., lines with the non-zero slope that cross other lines) and are removed from the CAD drawing. FIG. 3B shows the rendering of the modified CAD with the leader lines and text removed.

FIG. 4A shows a partial rendering of CAD drawing of an overhead view of desk, desk chairs, and guest chairs. In particular, FIG. 4A shows a desk, a plurality of desk chairs, and two guest chairs. Having a plurality of desk chairs may have been an oversight on the part of architect (e.g., multiple chairs placed but inadvertently moved to the background or made transparent). For purposes of later furniture detection, and as it relates to maps for indoor navigation, guest chairs and duplicate desk chairs provide little to no usable information, and thus in example cases the duplicate and unneeded entities are removed from the CAD drawing. With respect to duplicate drawing objects, when duplicate drawing objects are found within a predetermined distance of each other (e.g., less than greatest dimension of the drawing object), the duplicates entities may be removed. FIG. 4B shows the partial rendering of CAD drawing after simplification.

Figure 5A:
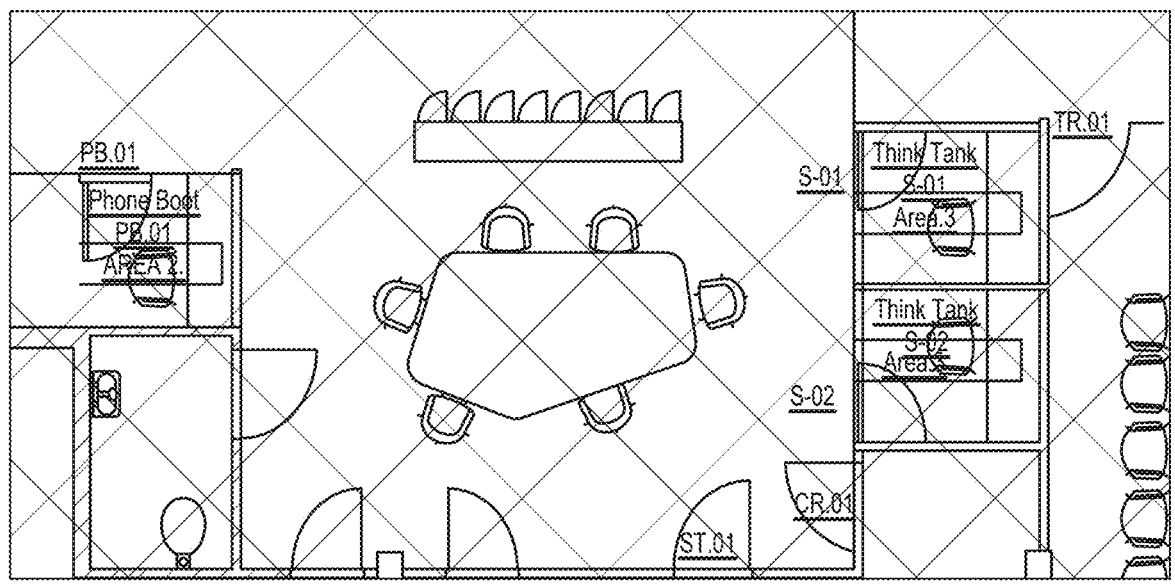
FIG. 5A shows a partial rendering of CAD drawing depicting an overhead view of a portion of a building containing cross-hatching, in accordance with at least some embodiments.
Figure 5B:
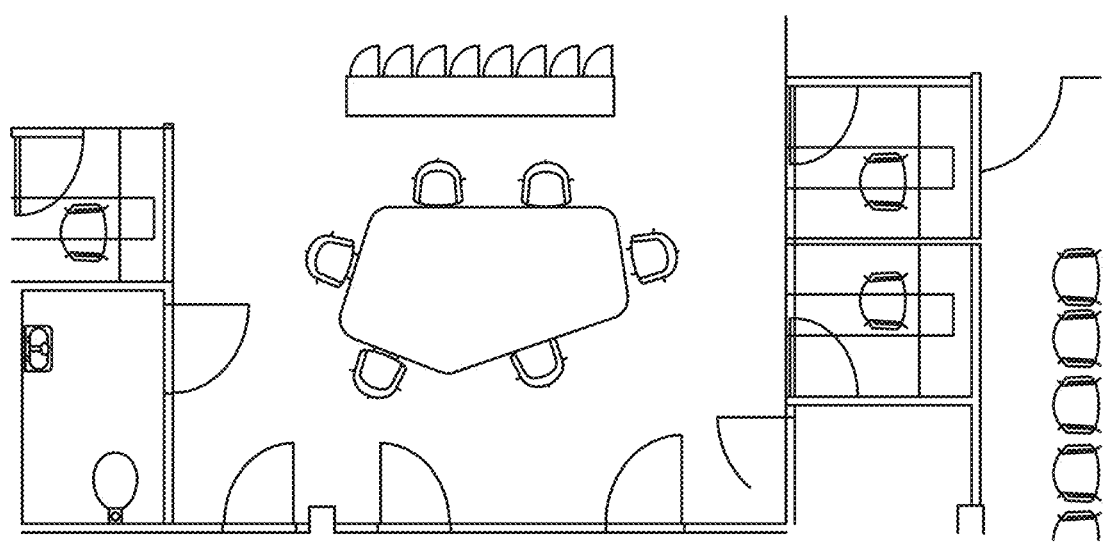
FIG. 5B shows a partial rendering of CAD drawing depicting an overhead view of a portion of a building with the cross-hatching removed, in accordance with at least some embodiments.

FIG. 5A shows a partial rendering of a CAD drawing of an overhead view of a portion of a building containing cross-hatching and text information. In particular, an architect may add cross-hatching to a CAD drawing for any number of reasons, such as to delineate different spaces, to aid in estimating distances within the spaces, to show control zones for thermostats, to name a few. However, as it relates to maps for indoor navigation, the cross-hatchings provide little, if any, relevant information. In fact, such cross-hatching may complicate later identification steps (e.g., room detection 108), and thus in example cases the cross-hatching (and associated coloring, if any), along with text, is removed from the CAD drawing. FIG. 5B shows the partial rendering of CAD drawing with the cross-hatching and text removed.

Thus, the result of the preprocessing is a modified CAD drawing with leader lines, text, duplicate entities, and cross-hatching removed. The text information, and associated location information, becomes the text database 214. The modified CAD drawing is used as the basis to create the CAD vector-image 218 and the CAD raster-image 222. The discussion now turns to the floor detection.

Floor Detection

Figure 6:
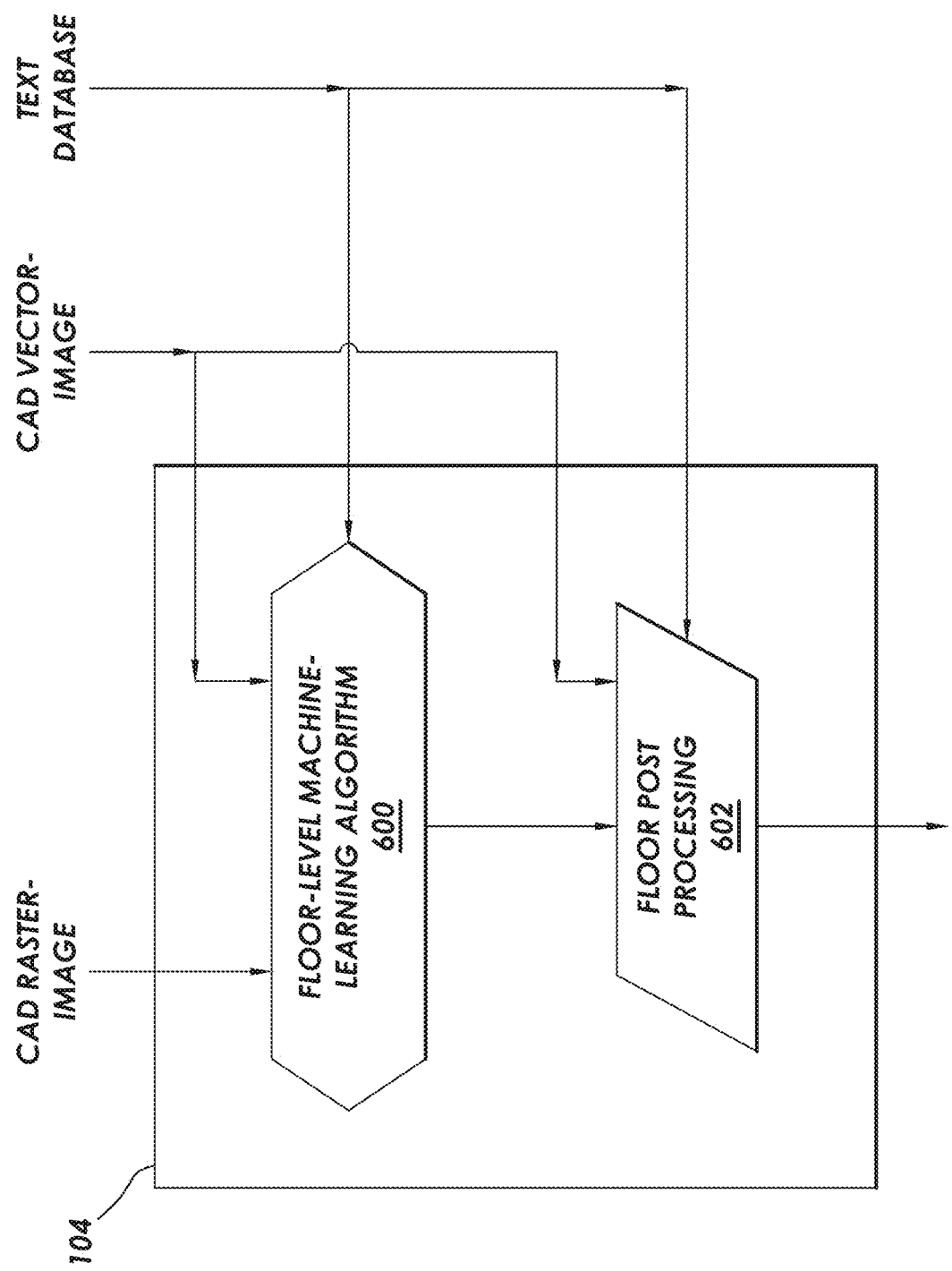
FIG. 6 shows, in block diagram form, the floor detection in accordance with at least some embodiments.

Returning briefly to FIG. 1. The discussion to this point has been directed to the preprocessing 102. The next step in the example computer-implemented method is the floor detection 104. FIG. 6 shows, in block diagram form, the example floor detection 104. In particular, the floor detection 104 may be conceptually, though not necessarily physically, divided into a floor-level machine-learning algorithm 600 and floor post processing 602. In example systems, the floor-level machine-learning algorithm 600 may be provided as input the CAD raster-image, the CAD vector-image, and the text database 214. The floor-level machine-learning algorithm 600 may be any suitable machine algorithm, such as a convolution neural network, trained with a set of curated training data. In example systems, the floor-level machine-learning algorithm 600 may produce a floor bounding line (e.g., a raster-image) that indicates the location of a floor shown the CAD drawing. To the extent the CAD drawing shows multiple stories or floors, the floor-level machine-learning algorithm produces a plurality of floor bounding lines, one each for each floor.

In example systems, each floor bounding line may be a raster-image that indicates the location of a floor shown the CAD drawing. The floor bounding line may not "tightly" show the exterior footprint of the floor. Rather, in some examples the floor bounding line depicts a polygon (e.g., a square) that fully encircles an identified floor, even though the floor may have a smaller and more complex exterior footprint. Stated otherwise, in the coordinate space of the CAD drawing, there may be non-zero offsets between the actual floor outline and an inside dimension of the floor bounding line. The specification now turns to the floor post processing 602.

The floor post processing 602 is summarized here first, and then described in greater detail below. In summary, starting from a floor bounding line created by the floor-level machine-learning algorithm, the floor post processing 602 creates an intermediate floor outline (e.g., raster-image) that indicates the outer footprint of the floor. The intermediate floor outline is then simplified, converted into an intermediate CAD drawing, and the intermediate CAD drawing is overlaid with the modified CAD drawing. The example floor post processing then removes drawing-entities that are a predetermined distance outside the intermediate floor outline, and removes drawing-entities that are a predetermine distance within the intermediate floor outline. Stated otherwise, the example floor post processing 602 removes drawing-entities from the modified CAD drawing that are a predetermine distance away from the intermediate floor outline. For various drawing-entities that remain, the drawing-entities are used to create a reduced-vertex shape, and thus a final floor outline, from which an indoor map may be created.

Figure 7A:
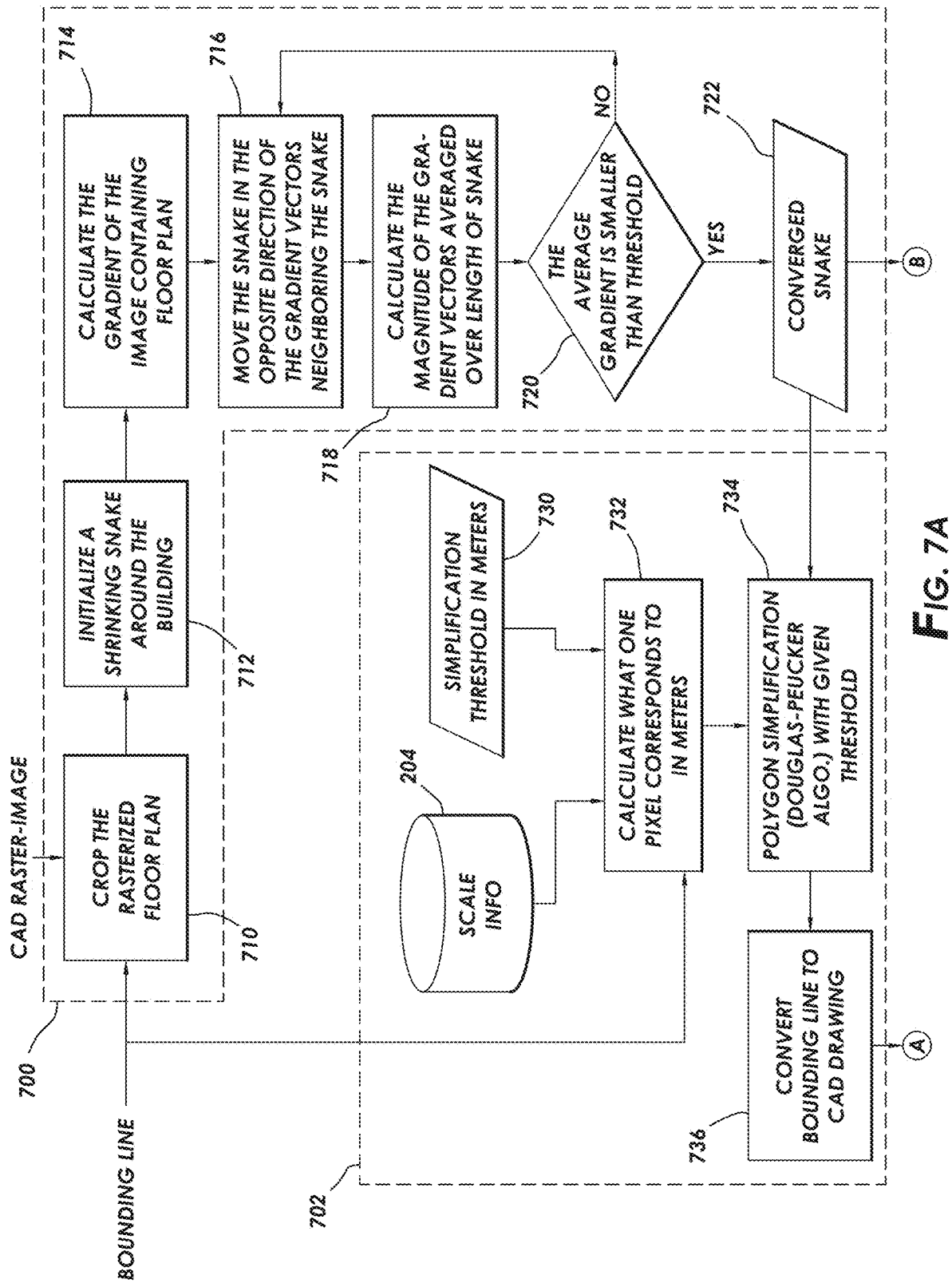
FIGS. 7A and 7B show a flow diagram of the floor post processing in accordance with at least some embodiments.
Figure 7B:
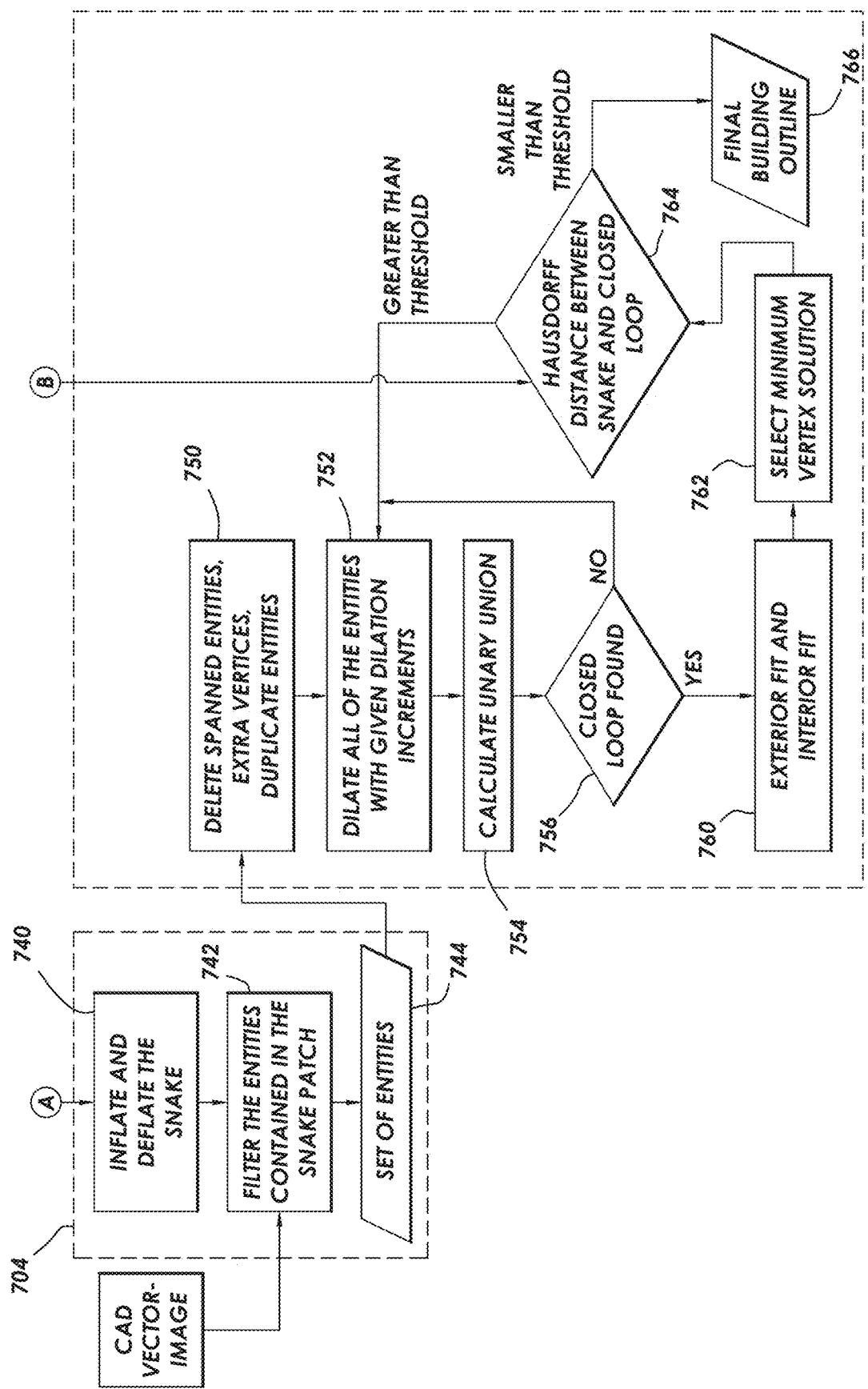

FIGS. 7A and 7B show a flow diagram of the example floor post processing 602. The floor post processing can be conceptually divided into an active contour model 700 to find a bounding line, smoothing the bounding line 702, filtering entities 704 based on the bounding line, and converging remaining entities 706. Each will be addressed in turn Active Contour Model Referring to FIG. 7A, the first step in the example process is the active contour model 700. An active contour model may be equivalently referred to as a software snake. In summary, an active contour model is applied starting at the bounding line found by the floor-level machine-learning algorithm, with the resultant of the active contour model being an intermediate floor outline. In particular, the bounding line is used to crop the CAD vector-image 710, leaving just the portions of the CAD vector-image showing the identified floor (e.g., entire building, floor of the building). An active contour model or snake is initialized 712. The active contour model here is initialized larger than the floor (e.g., initialized at the bounding line of the floor), and then the active model "shrinks" inward based on gradient calculations. For example, gradients of the vector-image are calculated 714, and the snake moves in directions opposite the gradient vector 716. Magnitudes of the gradient vectors are calculated 718, and then a determination is made as to whether the average gradient is smaller than a threshold, as shown by determination 720. If the average gradient is larger than the threshold, then the example method retreats again to moving or shrinking the snake at process 716. At some point, the average gradient will be smaller than the threshold (i.e., the "Yes" path out of decision block 720), and thus the snake is considered converged snake 722. The result of the example process is an intermediate floor outline (e.g., raster image) that delineates the floor.

FIG. 8 shows a series of drawings in order to graphically explain the steps of running the active contour model 700. In particular, the upper drawing shows an overhead view of floor identified by the floor-level machine-learning algorithm. As alluded to in the discussion of the floor-level machine-learning algorithm, the resultant of the floor-level machine-learning algorithm is a bounding line that delineates the floor. As shown, there may be non-zero distances between the bounding line and the actual floor footprint. The active contour model 800 is initialized with an initial shape larger than the footprint of the floor, and as shown the initialization may be at the bounding line 802 (i.e., thick lines at the outer boundary are the initialized active contour model and are coextensive with the bounding line 802). The active contour model is moved based on the gradient in the drawing (i.e., is moved toward the floor or building). The middle drawing of FIG. 8 shows the active contour model 800 about mid-way through the process. That is, the active contour model has found some of the outline of the building or floor (e.g., the curved portions), but other portions of the active contour model 800 (e.g., the square corners) have yet to find gradients that result in movement ceasing for that incremental length of the active contour model. Finally, the lower drawing of FIG. 8 shows a condition in which the active contour model ceased movement based on the gradient criteria discussed above. It follows the resultant of the active contour model is an intermediate floor outline or building outline at the elevation of the floor.

Smoothing the Bounding Line

Returning to FIG. 7A, the next step in the example method is smoothing the bounding line 702. That is, the floor outline found in the previous steps may comprise a plurality of line segments and may, in some senses, provide more detail than is needed for creation of indoor maps. Relatedly, because of operation of the active contour model, the floor outline may effectively contain many more line segments than strictly needed. In summary, in the example system the floor outline may be smoothed by selecting an incremental length of the floor outline, less than the entire floor outline, where the incremental length comprises a plurality of line segments. For the selected incremental length, an attribute of linearity is measured for a set of contiguous line segments. For any set of contiguous line segments for which the attribute of linearity is above a predetermined threshold, the set of line segments may be replaced with a single line segment. The measuring and replacing may be repeated for each set of contiguous line segments within the incremental length, and the process may be repeated for additional incremental lengths around the floor outline.

In particular, the example method takes as input the bounding line, the scale information 204, simplification thresholds 730, and the converged snake 722 or initial floor outline by the active contour model 700. Using the initial floor outline, the scale information 204, and the simplification thresholds 730, the example method calculates a distance 732 corresponding to one pixel of the raster-image comprising the floor outline. The next step in the example method is polygon simplification 734 (e.g., using Douglas Peucker algorithms). The resultant smoothed floor outline (e.g., again a raster image) may then be converted 736 into a CAD drawing for use in the further processing.

FIG. 9 graphically shows an example of smoothing within an incremental length of the floor outline. In particular, consider that the upper drawing shows an incremental length 900 of the floor outline, where the incremental length 900 itself has a length t less than the overall length T of the floor outline. The example incremental length 900 comprises three line segments 902, 904, and 906. Line segment 902 is contiguous with line segment 904. Line segment 904 is contiguous with line segment 906. As shown in the upper-middle drawing, first consider line segments 904 and 906. In example cases, an attribute of linearity is measured for a set of contiguous line segments; in this example, the set comprising line segments 904 and 906. If the attribute of linearity is above a predetermined threshold, the set of line segments may be replaced with a single line segment.

Referring to the lower-middle drawing, in example cases the attribute of linearity may comprise measuring an altitude A of a triangle formed by the set of contiguous line segments and a base B connecting opposite end of the set of contiguous line segments. If the altitude A is smaller than a predetermined threshold (e.g., smaller than a predetermined percentage of the length of the base B), then the line segments 904 and 906 may be replaced with single line segment 908, as shown in the lower drawing. A similar analysis may be performed between the line segment 902 and line segment 908 (or line segment 904), but in this example altitude is a larger percentage of a base line connecting the opposite ends of the line segments 902 and 908, and thus no line segment replacement takes place. The processing may be repeated for each set of contiguous line segments in the incremental length, and for each incremental length around the floor outline.

Returning to FIG. 7A, the next step in the example smoothing the bounding line 702 is converting 736 the floor outline into a CAD drawing. That is, the various simplifications performed (e.g., shown in FIG. 9) were assumed to take place within a raster-image containing the floor outline, and then the simplified raster-image is converted to a CAD drawing for the next steps in the example method. However, the simplifications discussed with respect the floor outline found by the active contour model may take place in any suitable file format.

Filtering Entities

Turning to FIG. 7B. The next step in the example method is filtering entities 704. In summary, the example method may overlay the floor outline with the modified CAD drawing, identify drawing-entities within a zone defined by an inflated and deflated versions of the floor outline, and with the resultant being an identified a set of drawing-entities. More particularly, the example method may remove drawing-entities from the modified CAD drawing that are a predetermine distance away from the floor outline. To that end, in the example method the floor outline may be inflated and deflated. More particularly still, the floor outline may be inflated by a predetermined amount (e.g., 5% of a wall length, 10% of a wall length) to create an inflated bounding line. As part of filtering, any drawing-entities outside the inflated bounding line are removed. For example, if the CAD drawings show a tree disposed outside the building, the tree is likely to reside outside the inflated bounding line, and thus for purposes of determining the final floor outline, the tree may be removed. Moreover, the floor outline may be deflated by a predetermined amount (e.g., 5% of a wall length, 10% of a wall length) to create a deflated bounding line. As part of filtering, any drawing-entities located inside the deflated bounding line may be removed. For example, drawing-entities that depict interior walls and furniture that reside inside the deflated bounding line may, for purposes of determining the floor outline, be removed.

The filtering of the example method may further comprise operations on drawing-entities that reside between the inflated bounding line and the deflated bounding line. That is the say, the area between the inflated bounding line and the deflated bounding line (sometimes referred to as the snake patch) may contain many desirable drawing-entities (e.g., lines showing the exterior walls), but may also contain undesirable drawing-entities. The undesirable drawing-entities may include small stray lines (e.g., remnants of leaders lines), duplicate lines (e.g., two coextensive lines representing a single wall), and data errors that manifest as standalone vertices—termed spanned entities. Thus, the various spanned entities may be removed from the modified CAD drawing.

Referring specifically to the flow diagram of FIG. 7B, the example method may thus comprise inflating and deflating the snake 740. The inflation and deflation creates the inflated bounding line, the deflated bounding line, and thus the snake patch between the inflated line and the deflated line. Based on the inflated and deflated bounding lines, and the CAD vector-image, the various drawing-entities discussed above are filtered 742, leaving a set of entities 744 for further processing.

Figure 10A:
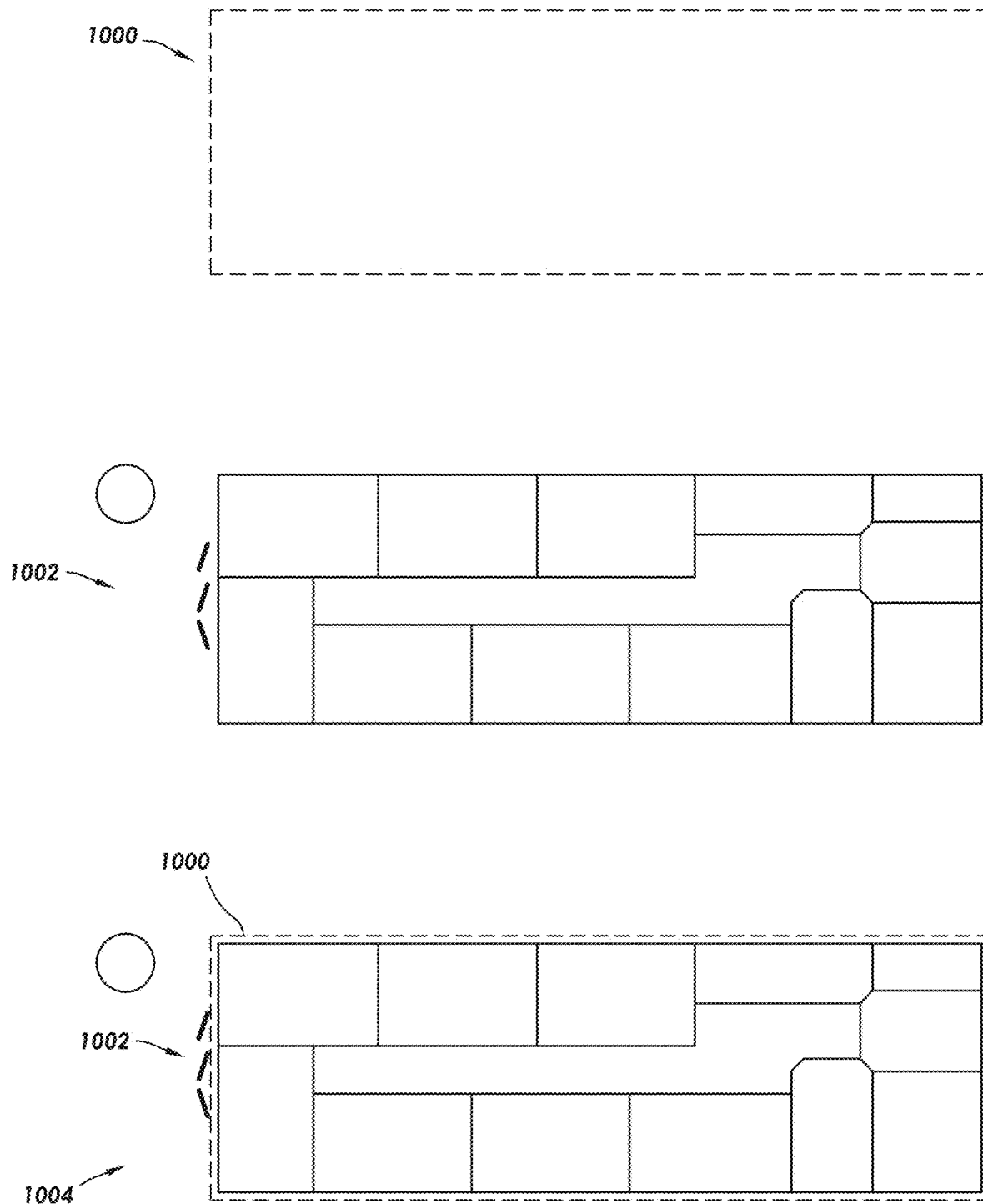
FIG. 10A graphically shows an example of filtering drawing-entities in accordance with at least some embodiments.

FIG. 10A graphically shows filtering entities 704 of the example method. In particular, consider that upper drawing represents a floor outline 1000 of a floor of a building, the floor outline 1000 as found by the example steps of FIG. 7A. Further, consider that the middle drawing 1002 is a portion of the modified CAD drawing showing a floor and various extraneous drawing-entities. In accordance with example methods, the floor outline 1000 may be overlaid with the middle drawing 1002 as shown by the lower drawing 1004. In some examples, the overlaying may be performed with both the floor outline 1000 and middle drawing 1002 in a CAD drawing format, but combining in other file formats, including mixed formats, is possible.

FIG. 10B graphically shows filtering entities 704 of the example method, continuing from FIG. 10A. As shown by upper drawing 1006, the floor outline may be inflated to create an inflated bounding line 1008, and the floor outline may be deflated to create the deflated bounding line 1010. The inflation and deflation of FIG. 10B are exaggerated for purposes of clarity, but again may be about +/−5% to 10% of the wall lengths. Moreover, the inflated bounding line 1008 and the deflated bounding line 1010 create a zone or area between them (i.e., the snake patch 1012).

The inflated bounding line 1008 and deflated bounding line 1010 delineate several categories of drawing-entities. For example, tree 1014 resides outside the inflated bounding line 1008. Within the snake patch 1012 resides various drawing-entities, such as outer walls of the floor (e.g., walls 1016 and 1018), short spanned entities 1020, and duplicate entity 1022 (i.e., a duplicate wall line). In practice, the duplicate entity 1022 may be hidden by being directly "behind" a line or set of lines showing the wall at that location, but duplicate entity 1022 is offset for clarity of the drawing. Inside the deflated bounding line 1010 resides various lines defining the rooms on the floor. In the example method, the drawing-entities that reside outside the inflated bounding line 1008, such as tree 1014, may be filtered or removed. Moreover, drawing-entities that reside inside the deflated bounding line 1010, including entities that cross the deflated bounding line 1010, may be filtered or removed. For example, all the interior lines (e.g., the lines depicting the rooms on the floor, furniture), may be removed.

Still referring to FIG. 10B, the lower drawing 1030 shows the remaining drawing-entities after having various entities outside the inflated bounding line 1008 removed, and having the various entities inside the deflated bounding line 1010 removed. Thus, the lower drawing 1030 shows a set of entities that may be passed to the next step in the example method.

Converging Remaining Entities

Returning to FIG. 7B, and particularly to the portion directed to converging remaining entities 706. The example method takes as input the set of entities 744 from the filtering entities 704 and the floor outline or converged snake 722 from the active contour model 700 (as shown by bubble "B"). In summary, the example method removes from the snake patch 1012: spanned entities whose size is below a predetermined size (e.g., short spanned entities 1020); duplicate entities (e.g., duplicate entity 1022); and extra vertices. With the remaining set of entities in the snake patch 1012, the example method dilates the remaining entities, performs a unary union of the dilated entities to create a union shape; and attempts to find closed-loop path within the union shape. More precisely, example method determines an internal and external outline of the union shape. The external outline may be deflated or contracted, while the internal outline may be dilated or expanded. The example method selects either the inflated internal outline or the deflated external outline, the selection based on which outline has the lowest number of vertices. If the selected outline represents a closed-loop path, and if the closed-loop path meets a predetermined criteria, the final floor outline is generated from the closed-loop path.

More precisely then, the example method deletes short spanned entities, extra vertices, and duplicate entities 750. Before proceeding, a brief digression into shortcomings of CAD drawings is in order. It may be that, within the original CAD drawing, various drawing-entities (e.g., lines) that represent the exterior walls do not fully touch or "connect up." At a drawing resolution where an entire floor is visible, the fact that two lines do not meet may not be evident or even relevant. However, the lack of continuity between drawing-entities (e.g., lines defining an outer wall of a floor) may cause issues in finding and refining the final floor outline. In order to address these potential shortcomings, the remaining entities are dilated with a given dilation increment 752. Thereafter, a unary union of the dilated entities is calculated, as shown by process 754, to create a unary entity or union shape. A determination 756 is made as to whether the union shape represents a closed-loop path. If no closed-loop path is found, this means the dilation was insufficient to make contiguous or "connect up" the drawing-entities, and the example method takes the "No" path out of the determination 764. Along the "No" path, the dilation increment is increased, and the dilation 752 and calculation of the unary union (process 754) are repeated until a closed-loop path is found (again determination 756).

Once a closed-loop path is found (e.g., the "Yes" path out of determination 756), the example method performs an exterior and interior fit 760 to find an exterior polygon of the union shape and an interior polygon of the union shape. In the example method, the exterior polygon is deflated, while the interior polygon is inflated, and a minimum or reduced vertex solution is selected, as shown by process 762.

The example method may continue refining of the closed-loop path in increments until the closed-loop path meets a predetermined criteria 764. For example, a Hausdorff distance may be calculated between reduced vertex solution and the floor outline or converged snake 722 (FIG. 7A). Assuming, for purposes of explanation, that the first reduced vertex solution does not meet the predetermined criteria (i.e., the "greater than threshold" path out of determination 764), the example method may again dilate the drawing-entities with an ever further increased dilation increment. When the closed-loop path and the floor outline meet the predetermined criteria 764 (i.e., the "smaller than threshold" path out of determination 764), the final reduced vertex solution becomes the final building outline 766. The specification now turns to a graphical explanation of converging remaining entities 706.

So as not to unduly lengthen the specification, not specifically shown in the graphical representations are the pre- and post-versions of removal of the short spanned entities 1020 (FIG. 10B), duplicate entities 1022 (FIG. 10B), and extra vertices. With that in mind, FIG. 11A graphically shows an example of converging remaining entities 706 in accordance with at least some embodiments. In order to convey various aspects of the further processing, the remaining drawing-entities are modified slightly from the discussion of FIGS. 10A and 10B. In particular, consider that the remaining drawing-entities within the snake patch are a group of lines that generally define the rectangular shape of the floor, but that those lines do not touch or do not fully "connect up" because of shortcomings of the original CAD drawing and/or because of a preprocessing step in which all the entities are "disconnected" or made non-contiguous. Thus, the upper drawing 1100 shows a set of remaining drawing-entities (e.g., lines 1102 and 1104) with exaggerated spacing, along with an example floor outline 1106. The separation of the floor outline 1106 from the various lines of the remaining drawing-entities is exaggerated for clarity. In some cases the upper drawing 1100 may be represented and be operated on in a vector-image format, but the operations may be performed in any suitable file format (e.g., CAD drawing format).

In accordance with example methods, the various lines are dilated with a dilation increment, and a resultant is shown as the upper-middle drawing 1108. In particular, the upper-middle drawing 1108 shows a situation in which dilation increment was insufficient to have all the dilated drawing-entities become contiguous, overlap, or "connect up." For example, there are still gaps between the dilated line 1102 and the dilated line 1104. Similarly, the dilated lower line 1110 does not overlap or "connect up" with the other lines. As can be gleaned, any union of the drawing-entities of the upper-middle drawing 1108 will not result in a union shape defining a closed-loop path. Thus, the discussion assumes the example method retreats to dilation 752 (FIG. 7B) but with a larger dilation increment.

Figure 11A:
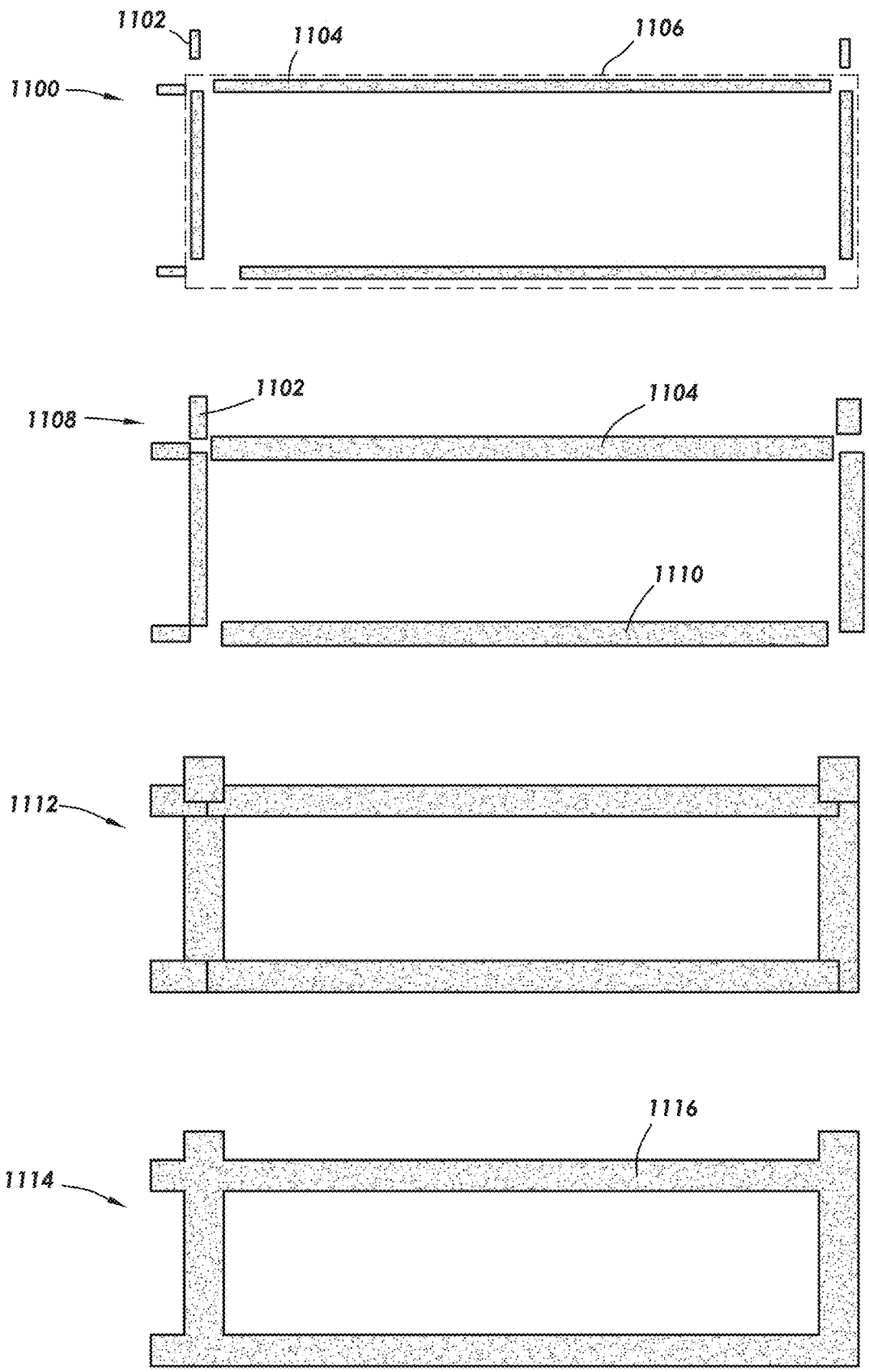
FIG. 11A graphically shows an example of converging remaining entities in accordance with at least some embodiments.

Still referring to FIG. 11A, the various lines are again dilated with a larger dilation increment, and an example resultant is shown in the lower-middle drawing 1112. In particular, the lower-middle drawing 1112 shows a case in which the dilation increment is sufficient to have all the lines become contiguous, overlap, or "connect up." The next step in the example method is to perform a unary union or unioning operation, which combines all the dilated entities into a single polyline or union shape, as shown by the lower drawing 1114 comprising union shape 1116.

Figure 11B:
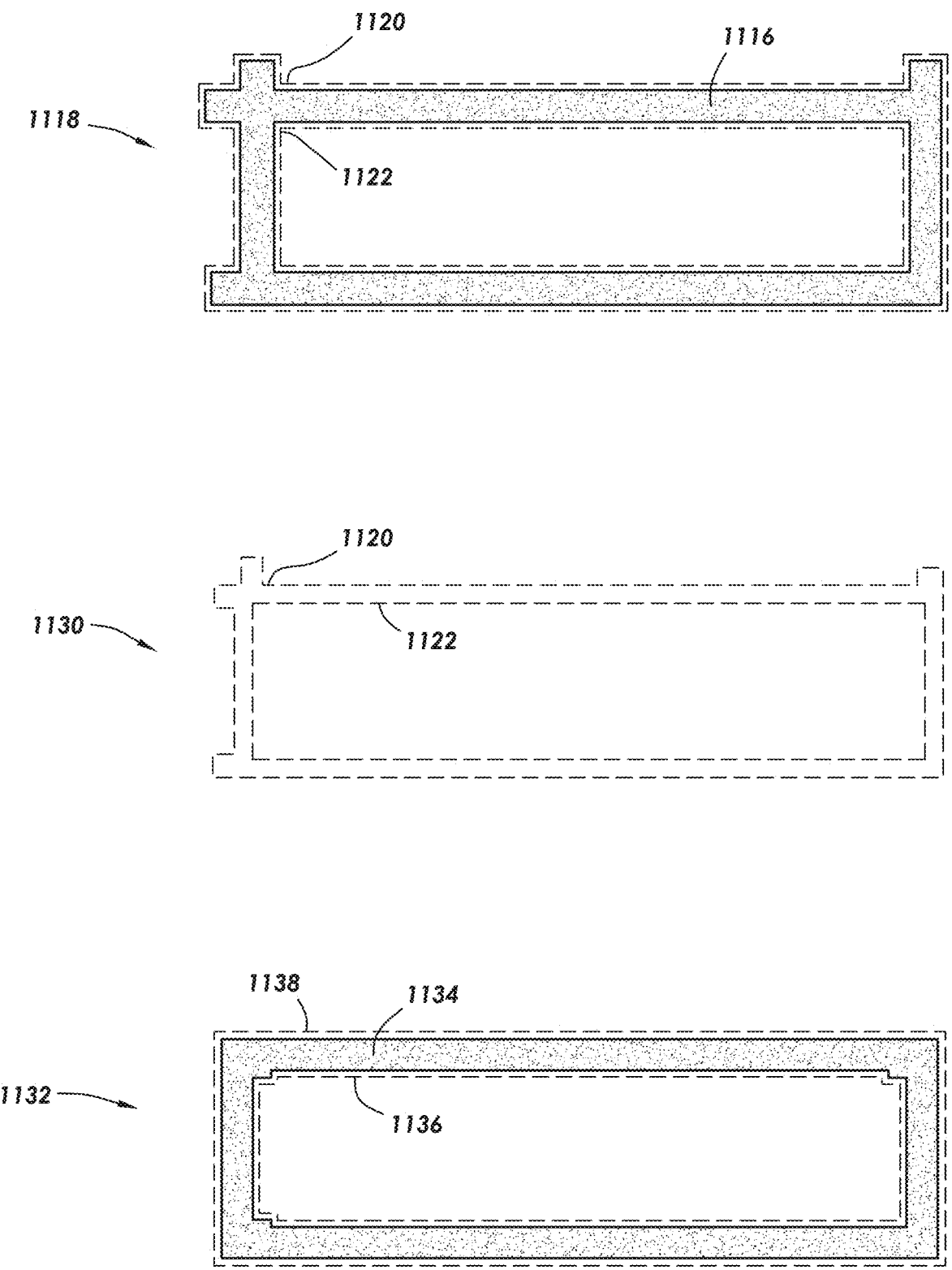
FIG. 11B graphically shows converging remaining entities, continuing from FIG. 11A.

FIG. 11B graphically shows converging remaining entities 706, continuing from FIG. 11A. In particular, in the example method the interior and exterior outlines or polygons are extracted. The resultant is shown as the upper drawing 1118. That is, upper drawing 1118 shows the union shape 1116, along with an exterior outline 1120 and an interior outline 1122. Finding the exterior outline 1120 and interior outline 1122 may take any suitable form. For example, the upper drawing 1118 may be in, or converted to, a raster-image. A shrinking active contour model may be initialized outside the union shape 1116, and thus may be used to find the exterior outline 1120. An expanding active contour model may initialized within the union shape 1116, and thus may be used to find the interior outline 1122. In any event, the exterior outline 1120 and the interior outline 1122 are determined. The example exterior outline 1120 and interior outline 1122 are shown displaced slightly from the union shape 1116 for clarity of the drawing, but in practice the exterior outline 1120 abuts the union shape 1116 around its external periphery, and similarly the interior outline 1122 abuts the union shape 1116 within its internal periphery.

In the next step (block 758 of FIG. 7B) in the example method, the exterior outline 1120 is deflated by a predetermined percentage and the interior outline 1122 is inflated by the predetermined percentage, and a minimum or reduced vertex solution is determined (process 762 of FIG. 7B) as between the two. In some example cases, the predetermined percentage used for the deflating the exterior outline 1120 and for inflating the interior outline 1122 is same as the dilation increment used to dilate the drawing-entities (block 752 of FIG. 7B), but such is not strictly required. In words then, the dilation at the prior step is used to expand the drawing-entities (i.e., mostly drawing-entities showing exterior walls at this point) so that all the drawing-entities become contiguous, overlap, or otherwise "connect up." The exterior outline 1120 and interior outline 1122 of the union shape 1116 are thus expanded and contracted representations, respectively, of the footprint of the outer walls of the floor. Deflating the exterior outline 1120 brings the exterior outline 1120 closer to the actual position of the outer walls, and likewise inflating the interior outline 1122 brings the interior outline 1122 closer to the actual position of the outer walls. Of the two outlines, the outline with the lowest number of vertices is selected.

Still referring to FIG. 11B, the middle drawing 1130 shows the example exterior outline 1120 after deflation and the interior outline 1122 after inflation. In accordance with example methods, either the exterior outline 1120 or the interior outline 1122 is selected as the candidate for the floor outline. Here, the exterior floor outline 1120 has fourteen vertices, while the interior outline 1122 has four vertices, and thus the interior outline 1122 is selected for further processing.

The lower drawing 1132 shows an opposite scenario. In particular, the lower drawing 1132 shows a situation in which the union shape 1134 has an interior outline 1136 having more vertices than the exterior outline 1138. It follows that after deflation and inflation of the exterior outline 1138 and the interior outline 1136, respectively, the reduced vertex solution will be the deflated exterior outline. The examples provided to this point have shown one outline (i.e., either the exterior or the interior) having four vertices; however, in practice both the exterior and interior outlines are likely to have many features resulting in many vertices, and thus the selected reduced vertex solution may not necessarily be selecting a square or rectangle.

Returning to FIG. 7B, with selected reduced vertex solution the example method may continue refining in increments until the reduced vertex solution meets the predetermined criteria 764. In example cases, the Hausdorff distance may be calculated between the reduced vertex solution and the floor outline found by the converged snake 722 (FIG. 7A). When the reduced vertex solution and the floor outline meet the predetermined criteria 764, the final reduced vertex solution becomes the final building outline 766.

Geo-Location

An optional next step is finding a geo-location for the building for which the final building outline 766 is found. While finding a geo-location does not necessarily aid in indoor navigation, such geo-location may be useful in selecting the appropriate indoor maps for use at any particular building and/or determining the building's location on World coordinates.

Figure 11C:
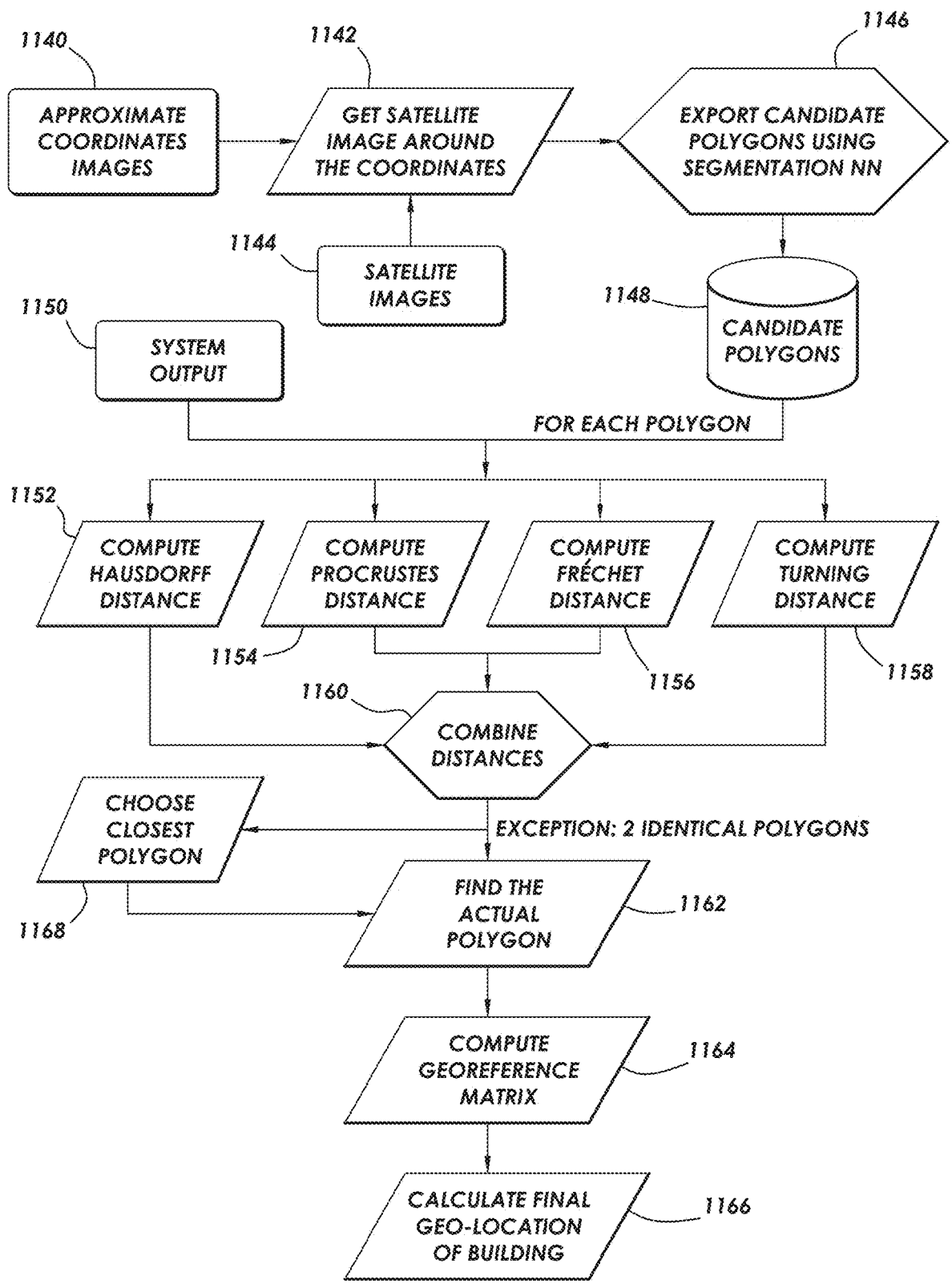
FIG. 11C shows, in block diagram form, geo-locating in accordance with at least some embodiments.

FIG. 11C shows, in block diagram form, a flow diagram of an example computer-implemented method of geo-locating. In particular, the method starts by receiving an approximate geo-location of a building to which a CAD drawing applies, as shown in step 1140. The next example step is obtaining an overhead image of a target area encompassing the approximate geo-location, as shown in step 1142, the overhead image comprising a plurality of buildings within the target area. The overhead image 1144 may take any suitable form, such as a visible image taken from aerial or satellite imaging, or the service providing the imaging may have previous performed a building footprint extraction in which the building footprints are generated from the overhead imaging, and just the building footprints are provided.

The next step in the example is exporting candidate polygon using a segmentation machine-learning algorithm, such as a neural network, as shown by step 1146. That is, based on the buildings visible in a target area encompassing the approximate geo-location, a plurality of building footprints are identified using any suitable method. In one example, the neural network may be designed and trained to directly determine the footprint of each building in the target area from building footprints previously extracted. In other cases, the neural network may make a rough segmentation, identifying each building in the visible image, and additional steps may be implemented to extract the building footprints, such as converging a snake around the visible image of each building in the target area. Regardless of the precise method, the resultant is a plurality of candidate polygons or candidate building footprints, as shown by 1148.

The next step in the example method is determining how closely each of the candidate building footprints match the floor-level outline or final building outline 766 generated by the floor detection of FIG. 6. In particular, the example method takes the system output 1150, being the final building outline 766 generated by the floor detection of FIG. 6, and the candidate polygons 1148, and for each polygon calculates two or more distance functions. Stated otherwise, the example method calculates a plurality of distance functions that relate the final building outline 766 to each of the plurality of building footprints, and the applying creates a plurality of similarity scores.

Calculating the plurality of distance functions that relate the final building outline 766 to each of the plurality of building footprints may take any suitable form. In the example shown in FIG. 11C, four distance functions are calculated, but greater or fewer are possible. In particular, the example method uses four distance functions: Hausdorff Distance 1152 (regular or Modified); a Procrustes Shape Analysis 1154; a Fréchet distance 1156; and a turning distance 1158. Each is addressed in turn.

The Hausdorff distance is a metric used to quantify the dissimilarity or similarity between two sets of points or two geometrical objects. The Hausdorff distance measures how far apart two sets are by considering the distance between any point in one set to its closest point in the other set. Hausdorff distance is sensitive to outliers or isolated points. A single point far away from the other points in one set can significantly affect the distance. To mitigate this, modified versions of the Hausdorff distance, such as the Modified Hausdorff distance or the Average Hausdorff distance, can be used.

Procrustes distance, also known as Procrustes analysis or Procrustes shape analysis, is a mathematical technique used to compare and analyze geometric shapes or configurations. In the context of shape analysis, Procrustes distance measures the dissimilarity between two shapes by aligning them, scaling them, and then calculating the Euclidean distance between corresponding points.

The Fréchet distance is a measure of similarity between two curves or paths. The Fréchet distance quantifies how similar two curves are by considering the minimum leash length for hypothetical person and a dog to traverse their respective paths without backtracking or removing the leash. More formally, given two curves or paths, the Fréchet distance measures the shortest length of the leash that enables a person and a dog to simultaneously walk along their respective paths from start to end. The person and the dog are not allowed to travel at different speeds, backtrack, or leave the paths. The Fréchet distance takes into account both the geometric shape of the curves and the parameterization of the paths. It provides a notion of similarity that considers the overall shape and spatial relationship between the points on the curves.

Turning distance is a measure of similarity between two polygons that quantifies the difference in their shape and orientation. Turning distance involves calculating the cumulative angular difference between corresponding edges or vertices of the polygons. By summing the absolute values of these angular deviations, the Turning distance captures the overall dissimilarity in the rotational transformations used to align the polygons. A smaller Turning distance indicates a higher degree of similarity, implying that the polygons share similar shapes and orientations, while a larger Turning distance suggests greater dissimilarity in their overall configurations.

Each of the example distance measures, Hausdorff distance 1152, Procrustes Shape Analysis 1154, Fréchet distance 1156, and Turning distance 1158, generates a value indicative of similarity, one each for each proposed building footprint. In this example, and for each proposed building footprint, four values indicative of similarity are created, relating the similarity of the proposed building footprint to the final building outline 766. In the example FIG. 11C, values indicative of similarity for each building footprint are combined, as shown in step 1160, to form a similarity score, one each for each building footprint. Combining the values indicative of similarity to arrive at a similarity score may take any suitable form. In one example, each of the values indicative of similarity are weighted and then summed to arrive at the respective similarity score. In the example weighting, the weight values may be determined empirically based on performing a few thousand to 10,000 or more analyses. In one example implementation, the weight values may be 0.2, 0.3, 0.4, and 0.1 for the Hausdorff distance 1152, Procrustes Shape Analysis 1154, Fréchet distance 1156, and Turning distance 1158, respectively. Inasmuch as there is, in this example, a plurality of proposed building footprints, the overall resultant is a plurality of similarity scores.

Still referring to FIG. 11C, and putting aside for a moment the exception regarding identical building footprints, the next step in the example method is finding the actual polygon or the final building footprint from the plurality of building footprints, as shown by step 1162. In one example, the selection of a final building footprint may be based on the plurality of similarity scores. For example, the building footprint with the highest similarity score may be selected as the final building footprint.

The next step in the example method is computing a geo-reference matrix, as shown in step 1164. In particular, an example satellite image will rarely be from directly above the target area, so the image is likely from an oblique angle. The oblique angle of the image means that the building footprints used and/or extracted may be distorted. Thus, in this example step, a transformation matrix is calculated which corrects the distortion of the selected building footprint, such as caused by the obliqueness in the imaging. And finally, with the distortion-corrected building footprint, a final geo-location may be calculated relative to the approximate geo-location previously provided, as shown in step 1166.

Still referring to FIG. 11C, and returning to combining the values indicative of similarity of step 1160. Many times in the construction of buildings, such as buildings with commercial space, two or more buildings with identical footprints may be constructed side-by-side or in close proximity. In such a situation, the similarity scores for two or more building footprints may be identical, and thus choosing the building footprint with the best similarity score may be indeterminate. Stated otherwise, when two or more building footprints have the same similarity score, or similarity scores within a predetermined range of each other, selecting the building footprint may comprise selecting the building footprint or polygon physically closest to the approximate geo-location, as shown in step 1168. With the selected building footprint, again step 1168, the remaining steps are implemented as discussed above.

Figure 11D:
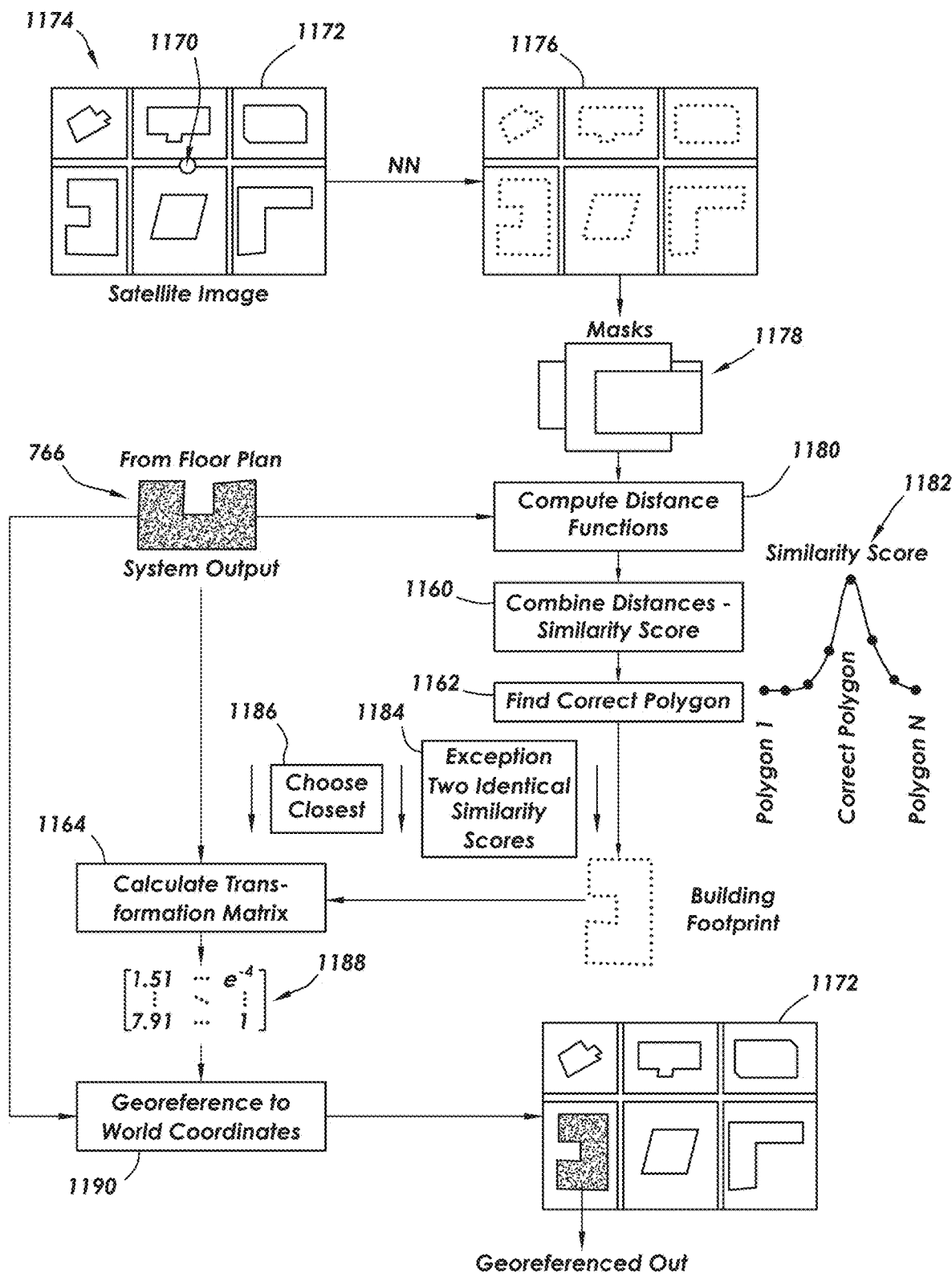
FIG. 11D shows a graphical representation of the geo-locating in accordance with at least some embodiments.

FIG. 11D shows an example graphical representation of the geo-locating. In particular, the example method starts by receiving an approximate geo-location of a building, and obtaining an overhead image of a target area encompassing the approximate geo-location. In FIG. 11D, the approximate geo-location is shown as location 1170 within a target area 1172 of an example satellite image 1174. In the example, a segmentation machine-learning algorithm, such as a neural network, is used to identify each building and extract building footprints, as shown in the modified target area 1176. The resultant is a plurality of candidate building footprints, as abstracted in FIG. 11D by the rectangular polygons 1178.

The next step in the example method is determining how closely each of the candidate building footprints match the floor-level outline or final building outline 766 by computing the distance functions, as shown in block 1180, and combining the distance functions, as shown in step/block 1160, to generate similarity scores. In FIG. 11D, the similarity scores are plotted as a bell curve by plot 1182, with better or higher similarity on the vertical axis, and the building footprint or polygon on the horizontal axis. Based on the similarity scores, the final building footprint is selected, as shown in step 1162 (i.e., finding the correct polygon). FIG. 11D also shows the exception, where two or more building footprints have similarity scores that match or are within a predetermined range of each other, as shown in block 1184, and in which case the building footprint closest to the approximate geo-location is selected, as shown in block 1186.

The next step in the example method is computing a geo-reference matrix, as shown in step 1164, and with a partial matrix 1188 shown. The transformed building footprint is then geo-reference to the world coordinates, as shown by step 1190. The result is a final geo-location of the building, as shown in FIG. 11D by the selected building footprint within the target area 1172 in the lower right corner of the figure.

The specification now turns to furniture detection.

Furniture Detection

Returning briefly to FIG. 1, the next example step in creating indoor maps from CAD drawings is furniture detection 106. The example furniture detection 106 follows the floor detection 104 to imply that furniture detection in example cases is performed on a floor-by-floor basis.

Figure 12:
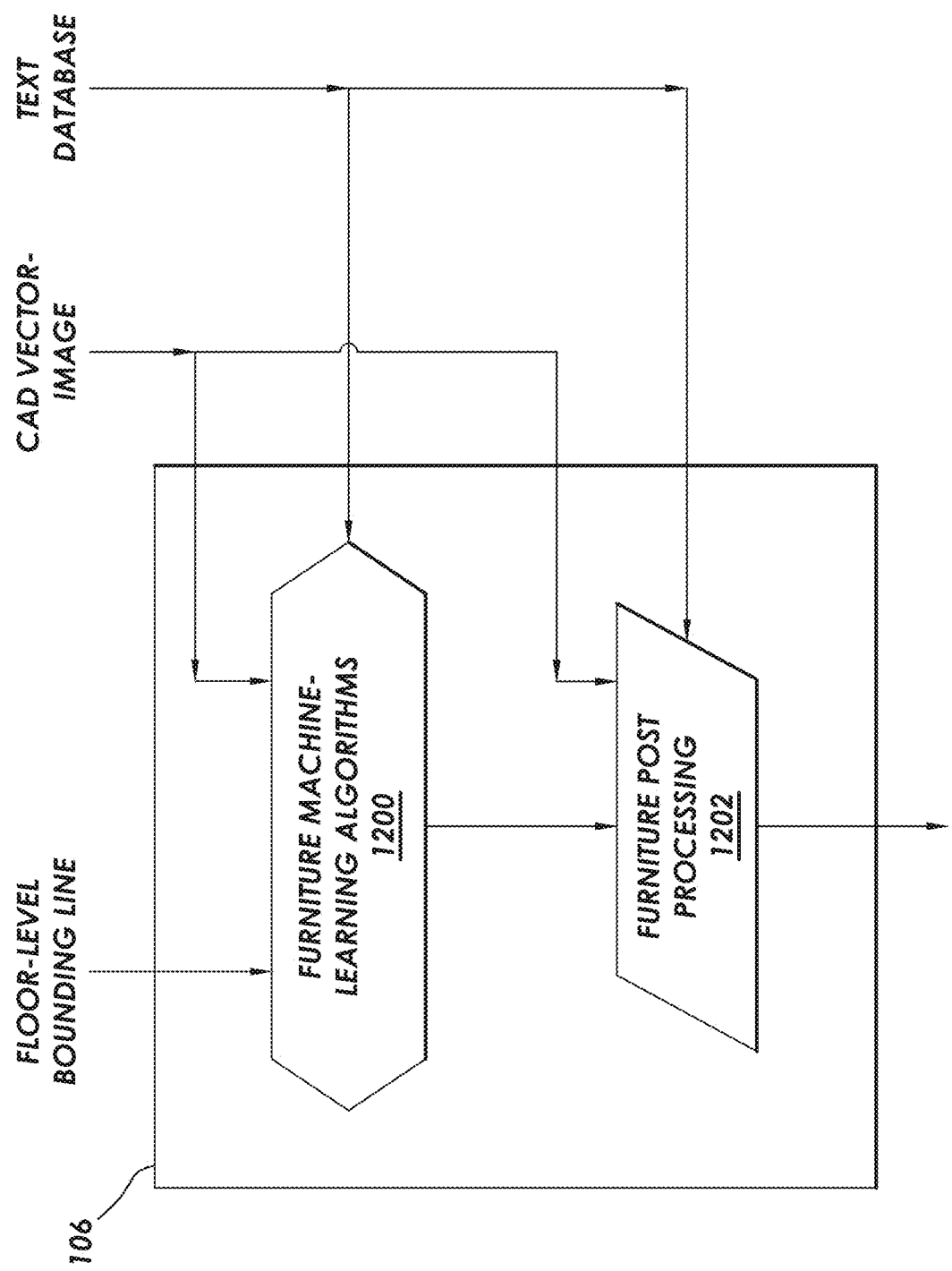
FIG. 12 shows, in block diagram form, the furniture detection in accordance with at least some embodiments.

FIG. 12 shows, in block diagram form, the example furniture detection 106. In particular, the furniture detection 106 may be conceptually, though not necessarily physically, divided into furniture-level machine-learning algorithms 1200 and furniture post processing 1202. In example systems, the furniture-level machine-learning algorithms 1200 may be provided the floor-level bounding line (e.g., raster-image) from the floor detection 104, the CAD vector-image, and the text database. The furniture-level machine-learning algorithms 1200 may be any suitable set of machine algorithms, such as one or more convolution neural networks, trained with one or more respective sets of curated training data. In example systems, the furniture-level machine-learning algorithms 1200 may produce furniture bounding lines or bounding boxes and associated identity information for each piece of furniture identified by the floor-level bounding line. To the extent the CAD drawing shows multiple stories or floors, the furniture machine-learning algorithms may be instantiated multiple times, one each for each floor.

In example systems, each furniture bounding box may be a raster-image that indicates the location of a piece of furniture (e.g., desk, guest chair, conference table, door) on a floor. The furniture bounding box may not "tightly" show the exterior footprint of the piece of furniture. Rather, in some examples the furniture bounding box depicts a polygon (e.g., a square, rectangle) that fully encircles an identified furniture drawing-entity, even though the furniture drawing-entity may have a smaller and more complex exterior footprint. Stated otherwise, in the coordinate space of the CAD drawing, there may be non-zero offsets between the footprint of any particular furniture drawing-entity and an inside dimension of the furniture bounding box.

The furniture-level machine-learning algorithms 1200 are summarized here first, and then described in greater detail below. In summary, example methods utilize a plurality of machine-learning algorithms, and in one example three machine-learning algorithms. In particular, in one example method the floor-level bounding line and the CAD vector-image are applied to a furniture-level machine-learning algorithm. The example furniture-level machine-learning algorithm is designed and trained to produce furniture bounding boxes around each furniture drawing-entity on the floor identified by the floor-level bounding line. The floor-level machine-learning algorithm may also make, for each bounding box, a furniture class prediction (e.g., chair, desk, conference table, door, double door) based on the size and drawing-entities within each bounding box (and keeping in mind that text was removed before creating the CAD vector image). Further in example methods, a parsed text database may be applied to a text-level machine-learning algorithm. In particular, the text database (e.g., generated in the preprocessing 102 of FIG. 1) may be parsed in the sense that the text that has location information placing the text within the floor-level bounding line may be extracted and provided—the parsed text database. Alternatively, the text-level machine-learning algorithm may be designed and trained to take as input the entire text database and the floor-level bounding line, and parse therefrom the pertinent text (e.g., text that has location information placing the text within the floor-level bounding line). Regardless of precisely how the parsed text database is created, the text-level machine-learning algorithm is designed and trained to produce furniture identities with associated location information.

Thus, at this stage the furniture-level machine-learning algorithm has produced the furniture bounding boxes (and possibly furniture class prediction). The text-level machine-learning algorithm has produced furniture identities with associated location information. The output of each of the furniture-level machine-learning algorithm and the text-level machine-learning algorithm may be applied to third machine-learning algorithm, namely an ensemble machine-learning algorithm. The example ensemble machine-learning algorithm may be designed and trained to generate or select a set of final-furniture bounding boxes and associated identity information. The resultant may then be applied to the furniture post processing 1202.

Figure 13:
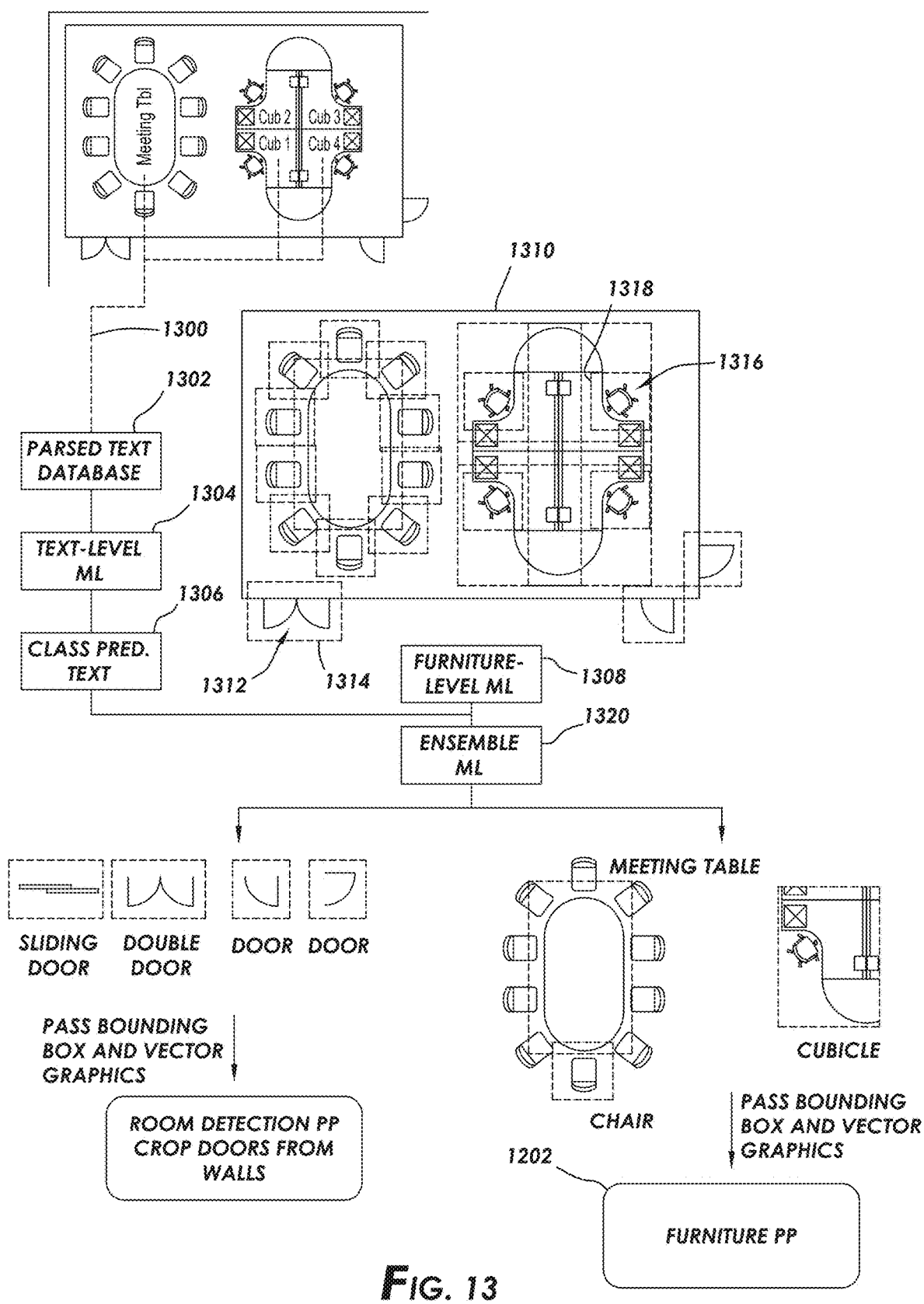
FIG. 13 graphically shows an example of furniture machine-learning algorithms in accordance with at least some embodiments.

FIG. 13 graphically shows an example of the furniture machine-learning algorithms. In particular, the upper-left drawing of the figure shows a partial rendering of a floor from a CAD drawing. The partial rendering includes a conference table and associated chairs on the left, a cubicle arrangement and associated chairs on the right, and several example doors. The partial rendering also includes text; however, the text is there for purposes of discussion regarding the parsed text database, and thus the text is not necessarily present in the computer file provided to the furniture-level machine-learning algorithm. As shown by dashed line 1300 the text is parsed to create parsed text database 1302. In the context of the example of FIG. 13, the parsed text database includes the text "Meeting Tbl" and the cubicle designations (e.g., "Cub1", "Cub2") along with associated location information. The location information may include direct location coordinates within the coordinate space of the CAD drawings, or the location information may include associations with other drawing-entities. For example, the "Meeting Tbl" wording may be associated with the drawing-entity representing the meeting table. The parsed text database is applied to a text-level machine-learning algorithm 1304. The example text-level machine-learning algorithm 1304 is designed and trained to generate a set of furniture identities and associated location information (shown in the figure as class prediction text 1306).

Now considering the furniture-level machine-learning algorithm. In example cases, the furniture-level machine-learning algorithm 1308 is provided the floor-level bounding line (not specifically shown) and the CAD vector image (partially shown). The furniture-level machine-learning algorithm is designed and trained to generate furniture bounding boxes around each drawing-entity representative of furniture. In FIG. 13, block 1310 graphically shows the resultant or output of the furniture-level machine-learning algorithm 1308. In particular, each furniture drawing-entity (including doors) has a bounding box associated therewith. For example, the double doors 1312 in the lower left are associated with the bounding line 1314. As yet another example, the desk chair 1316 associated with the upper-right cubicle is associated with the bounding box 1318.

In example methods, the resultants or outputs of the text-level machine-learning algorithm 1304 and the furniture-level machine-learning algorithm 1308 are both applied to a third machine-learning algorithm, the ensemble machine-learning algorithm 1320. As alluded to above, the ensemble machine-learning algorithm 1320 is designed and trained to generate and/or select final-furniture bounding boxes and identity information regarding the furniture within each bounding box. In example cases, and as shown in the figure, the ensemble machine-learning algorithm 1320 produces two classes of outputs: 1) a set of bounding boxes for doors and associated door identity information (e.g., single door swing left, single door swing right, double door, sliding door); and 2) furniture bounding boxes and associated identity information. As shown in FIG. 13, the bounding boxes for doors (e.g., raster-images) and associated door identity information may be passed to the room detection post processing (discussed in greater detail below). The bounding boxes for the remaining furniture (e.g., raster-images) and associated identity information may be passed to the furniture post processing 1202.

Before turning to furniture post processing 1202, however, the specification turns to a gridding technique associated with the CAD drawings applied to the furniture-level machine-learning algorithm 1308. The scale of CAD drawings may vary significantly. For example, a CAD drawing of a relatively small office space having only two or three offices may be vastly different than the scale of a CAD drawing showing the office layout for an entire floor of a multiple-story building. The difference in scale may complicate detection by the furniture-level machine-learning algorithm. For example, if the furniture-level machine-learning algorithm is trained with training data having a different scale than a CAD drawing applied for analysis, the furniture-level machine-learning algorithm may be unable to correctly find and identify the furniture drawing-entities. Issues associated with the scale of the underlying training data and applied CAD drawings is addressed, in at least some cases, by gridding technique.

In particular, in preprocessing 102 (FIG. 1) the original CAD drawing is parsed to determine scale information 204 (FIG. 2). In example cases, the scale information 204 from the preprocessing 102 is used to, conceptually, divide the CAD vector-image into grids of predetermined size. More particularly, each floor (e.g., identified by floor-level bounding lines) is divided into a plurality of grids having predetermined size, the dividing based on the scale information. In example methods, each grid has a size of 25 square meters, but the grid size may be arbitrarily chosen at the discretion of the system designer. For reasons that will become clear based on the further discussion, dividing to create grids does not necessarily require separating the CAD vector-image into separate files each representing 25 square meter grids; rather, in example methods each grid is extracted or copied from CAD vector-image and supplied to the furniture-level machine-learning algorithm 1308. Thus, the furniture-level machine-learning algorithm 1308 may be instantiated multiple times, one each for each grid covering the floor identified by the floor-level bounding line.

Gridding has the positive consequence that the furniture-level machine-learning algorithm 1308, in being provided data of consistent scale, is more likely to correctly identify bounding boxes for furniture drawing-entities. However, non-overlapped gridding (i.e., each grid defines an area that is not duplicated in any adjacent grid) creates a difficulty in that some furniture drawing-entities may span two or more grids. Inasmuch as the furniture-level machine-learning algorithm 1308 may have difficulty identifying partial furniture drawing-entities, in example methods the grids are overlapped a predetermined amount (e.g., 5% of grid width, 10% of grid width) sufficient to address the divided furniture issue. In example cases, the overlap may be 2.5 meters, which in most cases is sufficient to ensure that a furniture entity partially shown on one grid will be fully shown on the adjacent grid. While gridding addresses the divided furniture issue, gridding also may create a duplicate furniture detection issue. Identifying duplicate furniture detections, and removing duplicate detections, takes place in furniture post processing 1202.

In summary, in the example furniture post processing 1202, the final-furniture bounding boxes created by the ensemble machine-learning algorithm are converted from raster-image form to CAD drawing form, and with overlapping bounding lines removed, the furniture bounding boxes are used in conjunction with the CAD vector image to create a set of filtered entities residing within each furniture bounding box. For directly recognized furniture drawing-entities (e.g., chair), the recognized drawing-entities may be replaced with predefined entities (e.g., drawing-entities showing a high-back chair replaced with a circle) for use on the indoor map. For filtered entities that are not directly identifiable (e.g., non-standard furniture items), the non-standard drawing-entities are reduced in complexity. Finally, the example furniture post processing may remove any duplicate entities created based the overlaps of the gridding.

Figure 14:
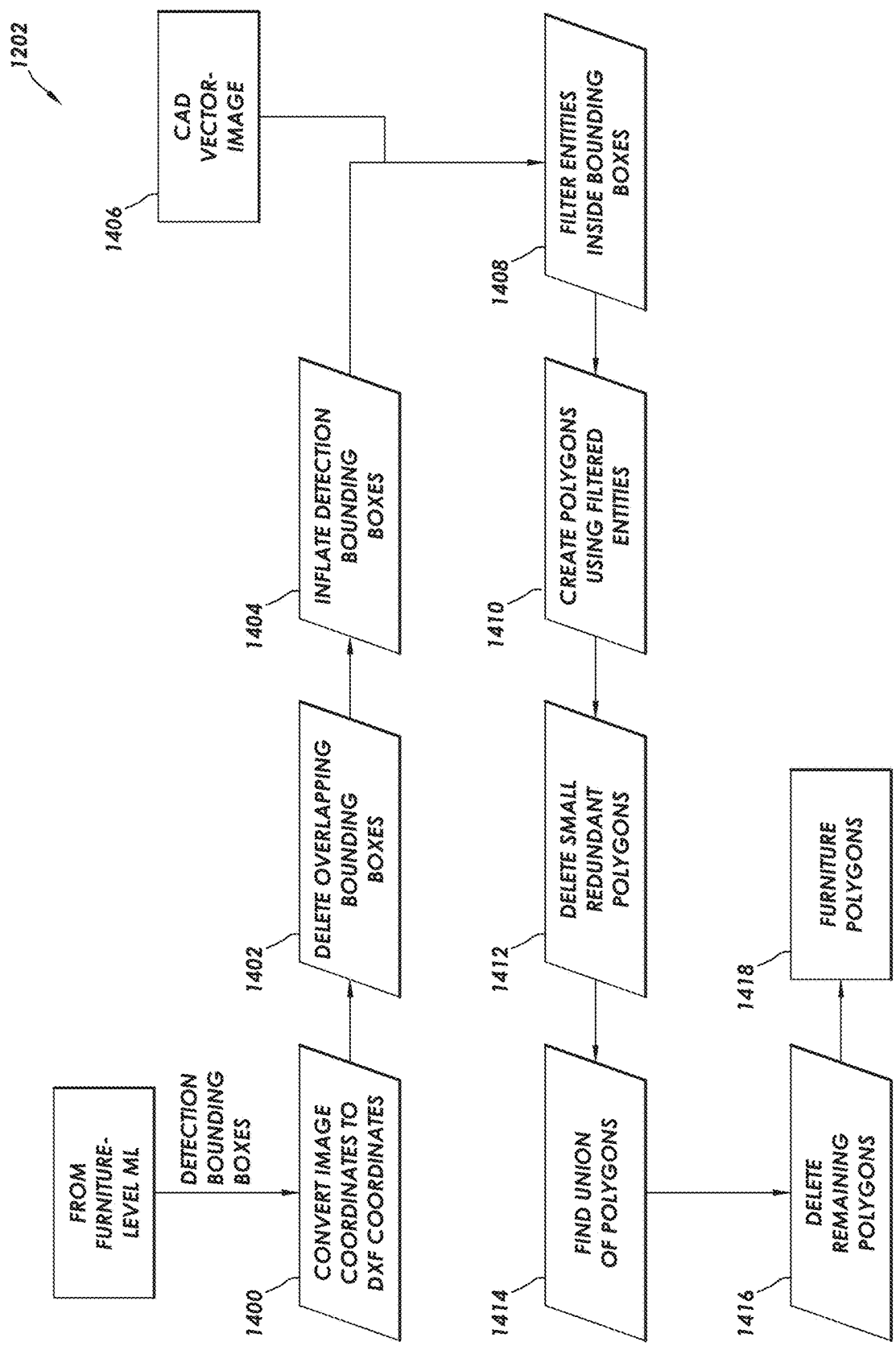
FIG. 14 shows a flow diagram of the furniture post processing in accordance with at least some embodiments.

FIG. 14 shows a flow diagram of an example furniture post processing 1202. In particular, the furniture post processing 1202 is provided the outputs of the furniture-level machine-learning algorithms 1200 (FIG. 12), in the example form of bounding boxes. The example furniture post processing 1202 may then convert the coordinate space of the bounding boxes (e.g., vector-images) into the coordinate space of the CAD drawings (e.g., DXF), as shown by process 1400. With the bounding boxes in the coordinate space of the CAD drawings, overlapping bounding boxes are deleted, leaving one bounding box in the formerly overlapping space, as shown by process 1402. Each of the remaining bounding boxes is inflated by a predetermined inflation increment, as shown by process 1404. The inflated boxes are then applied to the CAD vector-image 1406, and entities in the CAD vector-image that reside within the bounding boxes are filtered, as shown by process 1408. The resultant of the filtering may be multiple sets of remaining entities, each set of remaining entities being the drawing-entities that reside in the inflated bounding boxes. In other words, in the context of FIG. 14, filtered entities should be read to refer to entities that remain after all the other drawing-entities, residing outside the inflated bounding boxes, are removed.

The example furniture post processing conceptually takes two parallel paths at this point based on the furniture drawing-entities that reside in each inflated bounding box. If a furniture drawing-entity within an inflated bounding box is recognized as a "standard" entity (e.g., chair, rectangular office desk), then the example method replaces the "standard" entity with a predefined shape for use within an indoor map (e.g., complex drawing of a chair replaced with an opaque circle), and the method proceeds directly to the final furniture polygon 1418 for that furniture drawing-entity. On the other hand, if a furniture drawing-entity within an inflated bounding box is a "non-standard" entity (e.g., odd-shaped conference table, or a desk with internal boxes showing power and data connections), then the example method continues as shown by FIG. 14. In particular, the next step in the example method is creating polygons using the filtered entities, as shown by process 1410. That is, the filtered entities, prior to the process 1410, represent vector-image drawing-entities. The example process 1410 converts the vector-image entities into polygons (e.g., in CAD drawing format). The next step in the example method is deletion of small redundant polygons, as shown by process 1412. With the remaining polygons, the unary union is found, as shown by process 1414. Remaining polygons are deleted, as shown by process 1416, and the resultant is the final furniture polygon 1418 for that inflated bounding box. Though not specifically delineated in FIG. 14, the example method is repeated for each inflated bounding box.

Figure 15:
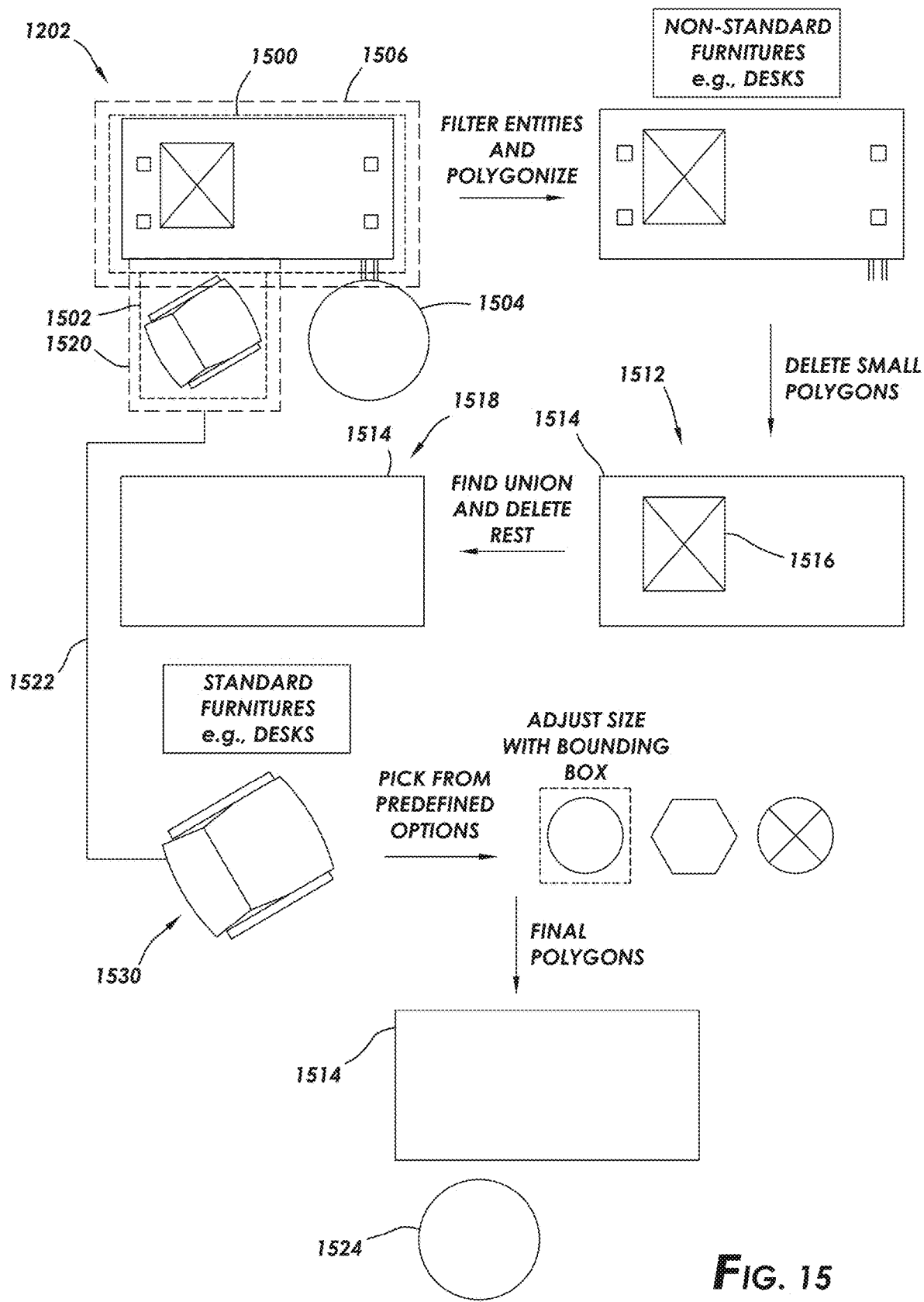
FIG. 15 graphically shows an example of a first portion of furniture post processing in accordance with at least some embodiments.

FIG. 15 graphically shows an example of a first portion of furniture post processing 1202. In particular, the upper-left drawing shows a rendering of two example bounding boxes. Bounding box 1500 encircles an example desk, and also encircles additional drawing-entities that make the drawing "non-standard." By contrast, bounding box 1502 encircles an example chair in a "standard" form. The upper-left drawing also shows a desk extension or return 1504 in the example form of a circular return. Not shown in FIG. 15 is an example of overlapping bounding boxes, though FIG. 13 does show several examples (e.g., the bounding box 1318 for desk chair 1316 is fully overlapped by the bounding box for the cubicle desk (not specifically numbered)).

Referring initially to bounding box 1500, in example cases the bounding box is inflated by a predetermined inflation increment, with the resultant shown as inflated bounding box 1506. The inflated bounding box 1506 thus encircles the desk, the associated internal drawing-entities of the desk, and a connecting entity associated with the return 1504, but not the return 1504 itself. The drawing-entities within the inflated bounding box 1506 are kept, while the drawing-entities not contained within the inflated bounding box, in this example the return 1504, are deleted. The desk and associated internal drawing-entities of the desk are an example of a "non-standard" furniture entity, and thus the example method continues with filtering the entities and creation of polygons using the filtered entities (processes 1408 and 1410).

Still referring to FIG. 15, the upper-right drawing shows the example filtered entities. From there, polygons are created from the filtered entities (process 1410) and the small polygons are deleted (process 1412), resulting in the rendering 1512. Next, the unary union is created and some union shapes may be deleted (process 1416). The unary union process, in this example, results in two entities: 1) the outline 1514 of the desk; and 2) the outline 1516 of the square with the internal "X." In other words, in this example two union shapes exist, comprising an outer shape (i.e., the outline 1514) and the inner shape (i.e., outline 1516). In example methods, any union shape that resides within another union shape may be deleted, and the resultant is the outline 1514 of the desk as shown in the rendering 1518. Thus, the outline 1514 becomes the furniture polygon for the example desk used in the indoor map.

Returning to the upper-left drawing, and particularly the bounding box 1502. Again, in example cases the bounding box 1502 is inflated by the predetermined inflation increment, with the resultant being inflated bounding box 1520. The inflated bounding box 1520 encircles the chair. The drawing-entities within the inflated bounding box 1520 are kept. The chair is an example of a recognized "standard" furniture entity, and thus the example method skips the various steps of the example method (the skipping shown by line 1522) to replacing the chair drawing-entity 1530 with a predefined shape for use within an indoor map. For example, the chair drawing-entity 1530 may be replaced with an opaque circle or a polygon. Thus, the method proceeds directly to the final furniture polygon 1524 for that furniture drawing-entity.

A few points to consider regarding "standard" furniture drawing-entities before proceeding. As mentioned above, there are no universally accepted standards for furniture drawing-entities in CAD drawings. Nevertheless, there may be duplicate uses of drawing-entities within a CAD drawing (e.g., each floor may use the same "chair" drawing-entity), there may be duplicate uses by the same architect across different CAD drawings, and there may be duplicate uses based on many architects having access to the same predefined sets of furniture drawing-entities (akin to clipart). Thus, the furniture-level machine-learning algorithms may be able to detect with high confidence, based on the training data set as well as later incremental training with furniture post processing results, that a particular furniture drawing-entity is a known entity (e.g., chair, desk, door, water fountain). In those situations then, the floor post processing may skip the processes 1408 through 1416, and proceed directly to the replacing the known furniture drawing-entity with a reduced complexity drawing-entity, such as in FIG. 15 replacing the chair drawing-entity 1530 with final furniture polygon 1524 in the example form of an opaque circle.

Still considering furniture post processing. In order to address scale issues, in example cases the CAD drawings are divided into a plurality of grids having predetermined size. In example methods, each grid has a size of 25 square meters, and to address the divided furniture issue each grid may be overlapped a predetermined amount. While gridding addresses the divided furniture issue, gridding also may create a duplicate furniture detection issue. That is, the furniture-level machine-learning algorithms may detect the same piece of furniture in two adjacent grids because of the overlap. Thus, in accordance with example embodiments, another function of the furniture post processing is to remove duplicate furniture detection from the final furniture entities.

Figure 16:
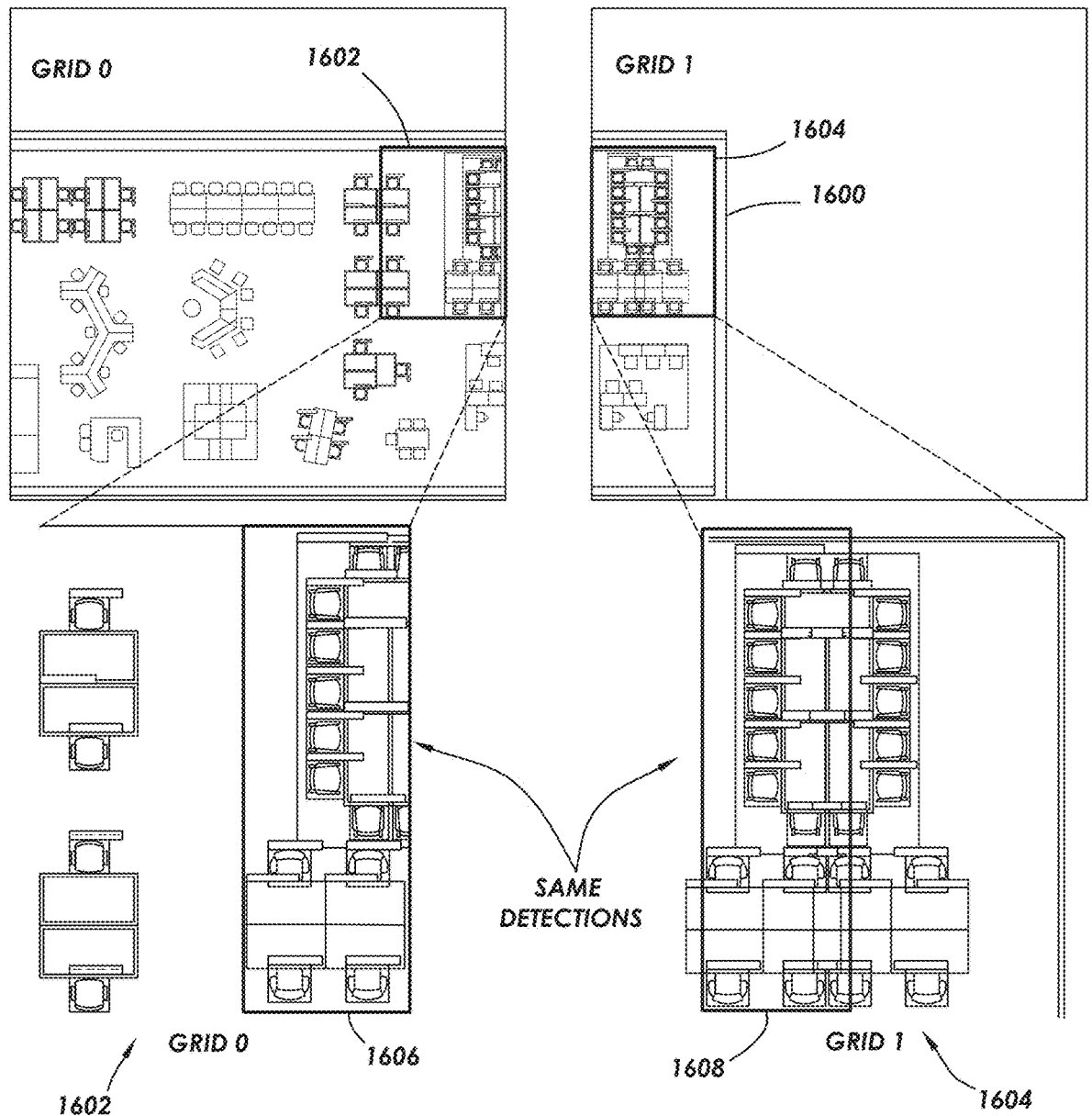
FIG. 16 graphically shows an example of a second portion of furniture post processing in accordance with at least some embodiments.

FIG. 16 graphically shows an example of a second portion of furniture post processing. In particular, FIG. 16 shows two grids—Grid 0 and Grid 1. In this example, Grid 0 shows a portion of the floor, and Grid 1 shows an overlapping portion that also includes the exterior wall 1600. In order to discuss duplicate furniture detection, Grid 0 delineates a zone 1602 that defines a portion of the overlapping region that resides within Grid 0. Similarly, Grid 1 delineates a zone 1604 that defines a portion of the overlapping region that resides within Grid 1. Below each of Grid 0 and Grid 1 are the respective zones of the overlapping regions shown in magnified form, and thus in greater detail. In example cases, the furniture post processing does not necessary create or establish the zones 1602 and 1604; rather, those zones are identified for purposes of explanation.

In the lower-left portion of FIG. 16, zone 1602 of Grid 0 shows a duplicate detection area 1606. The duplicate detection area 1606 contains a plurality of desks and chairs. In the lower-right portion of FIG. 16, zone 1604 of Grid 1 shows a duplicate detection area 1608. The duplicate detection area 1608 contains a plurality of desks and chairs that are duplicated in the detection area 1606. Here again, in example cases the furniture post processing does not necessary create or establish the duplicate detection areas 1606 and 1608; rather, those areas are identified for purposes of explanation. Thus, because of the gridding, and particularly the overlap of the gridding, some furniture drawing-entities will be detected in two or more grids. In the example of FIG. 16, the furniture drawing-entities that reside the duplicate detection areas 1606 and 1608 may be detected by the furniture-level machine-learning algorithms to reside in both in the example Grid 0 and Grid 1. Thus, in example case an additional function of the furniture post processing is to identity and remove duplicate furniture entities from the final list of furniture entities.

Identifying and removing duplicate furniture entities from the final list of furniture entities may take any suitable form. For example, each furniture entity is associated with location information. The furniture post processing may thus analyze the furniture entities and respective location information from each grid, and based on two furniture entities having the same location, or being within a predetermined distance of each other given slight processing differences (e.g., within 5 centimeters (cm), within 10 cm), remove duplicate furniture detections or duplicate furniture entities from the final furniture entities. The final furniture entities (one set each for each detected floor) are passed to the room detection 108 (FIG. 1).

Room Detection

Returning briefly to FIG. 1, the next example step in creating indoor maps from CAD drawings is room detection 108. The example room detection 108 follows the floor detection 104 to imply that room detection in example cases is performed on a floor-by-floor basis. The example room detection 108 also follows furniture detection 106 to imply room detection in example cases is performed using the detected furniture entities and associated location information.

Figure 17:
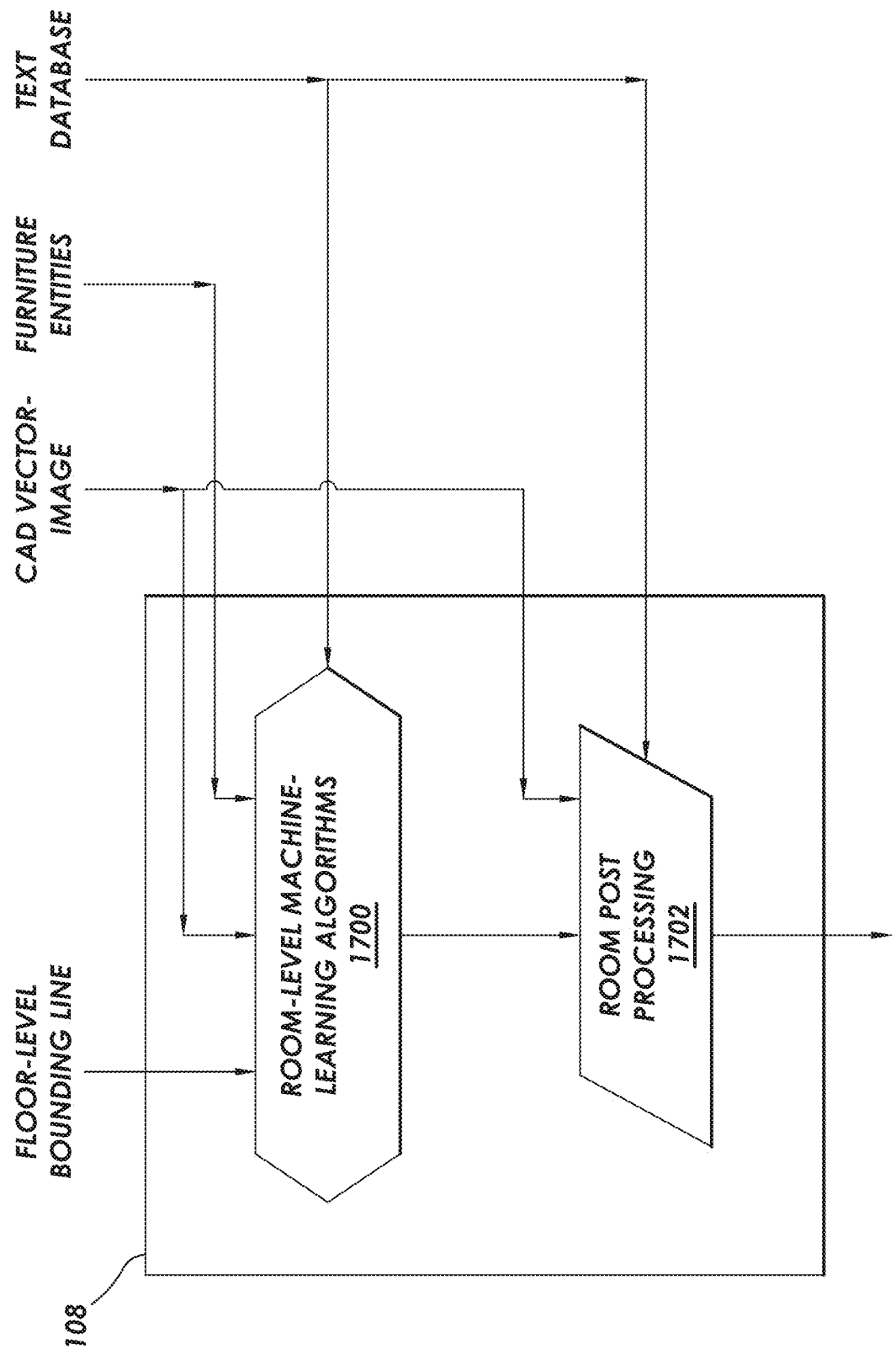
FIG. 17 shows, in block diagram form, the furniture detection in accordance with at least some embodiments.

FIG. 17 shows, in block diagram form, the example room detection 108. In particular, the room detection 108 may be conceptually, though not necessarily physically, divided into room-level machine-learning algorithms 1700 and room post processing 1702. In example systems, the room-level machine-learning algorithms 1700 may be provided the floor-level bounding line from the floor detection 104, the CAD vector-image, the furniture entities and associated location information from the furniture detection 106, and the text database. The room-level machine-learning algorithms 1700 may be any suitable set of machine algorithms, such as one or more convolution neural networks, trained with one or more respective sets of curated training data. In example systems, the room-level machine-learning algorithms 1700 may produce room bounding lines and associated identity information for each room identified on a floor. To the extent the CAD drawing shows multiple stories or floors, the room-level machine-learning algorithms may be instantiated multiple times, one each for each floor.

In example methods, each room bounding line may be a raster-image that indicates the location of a room on a floor. The room bounding line may not "tightly" show the exterior footprint of the room. Rather, in some examples the room bounding line depicts a polygon (e.g., a square, rectangle) that fully encircles an identified room, even though the room may have a more complex footprint. Stated otherwise, in the coordinate space of the CAD drawing, there may be non-zero offsets between the footprint of any particular room and an inside dimension of the room bounding line.

Room-Level Machine Learning Algorithms

The room-level machine-learning algorithms 1700 are summarized here first, and then described in greater detail below. In summary, example methods utilize a plurality of machine-learning algorithms, and in one example three machine-learning algorithms. In particular, in one example method the floor-level bounding line and the CAD vector-image are applied to a room-level machine-learning algorithm. The example room-level machine-learning algorithm is designed and trained to produce room bounding lines around each room on the floor. The room-level machine-learning algorithm may also create, for each bounding line, a class probability distribution regarding identity of the room (e.g., office, conference room, water closet). Given that the text was removed from CAD drawing that formed the basis of the CAD vector-image, the class probability distributions created by the room-level machine-learning algorithm may be referred to as the graphics-based probability distributions.

Further in example methods, a parsed text database may be applied to a text-level machine-learning algorithm. In particular, the text database 214 (FIG. 2) may be parsed in the sense that the text that has location information placing the text on the floor (i.e., within the floor-level bounding line) may be extracted and provided—the parsed text database. Alternatively, the text-level machine-learning algorithm may be designed and trained to take as input the entire text database 214 and the floor-level bounding line, and parse therefrom the pertinent text (e.g., text that has location information placing the text within the floor-level bounding line). Regardless of precisely how the parsed text database is created, the text-level machine-learning algorithm is designed and trained to produce a plurality of text-based probably distributions regarding room identities.

Thus, at this stage the room-level machine-learning algorithm produced the room bounding lines and graphics-based probably distributions. The text-level machine-learning algorithm produced text-based probability distributions regarding room identities. The output of the room-level machine-learning algorithm and the output of the text-level machine-learning algorithm, along with the furniture entities and associated location information (from the furniture detection 106 (FIG. 1)), may be applied to third machine-learning algorithm, namely an ensemble machine-learning algorithm. The example ensemble machine-learning algorithm may be designed and trained to generate or select a plurality of final room identities associated one each with each room bounding line. The resultant may then be applied to the room post processing 1702.

Figure 18:
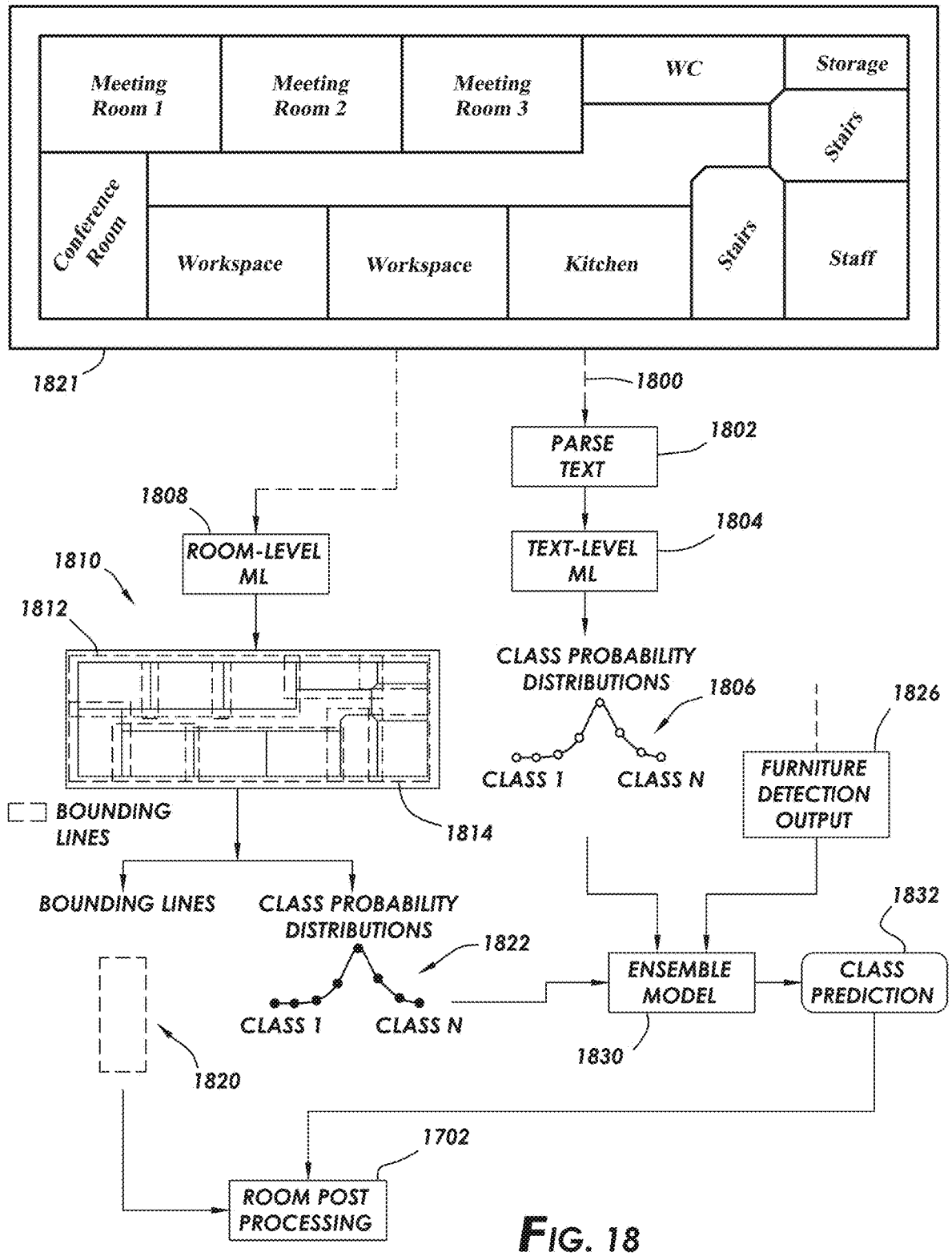
FIG. 18 graphically shows an example of room-level machine-learning algorithms in accordance with at least some embodiments.

FIG. 18 graphically shows an example of the room-level machine-learning algorithms. In particular, the upper left drawing of the figure shows a partial rendering of a floor from a CAD drawing. The partial rendering includes various rooms and text; however, the text is shown for purposes of discussion regarding the parsed text database, and thus the text is not necessarily present in the CAD vector-image provided to the room-level machine-learning algorithm. As implied by dashed line 1800, the text is parsed to create parsed text database 1802. In the context of the example of FIG. 18, the parsed text database includes all the text shown (e.g., "Meeting Room 1", "Meeting Room 2", "Staff") along with associated location information. The location information may include direct location coordinates within the coordinate space of the CAD vector-image, or the location information may include associations with other drawing-entities. For example, the "Meeting Room 1" wording may be associated with the drawing-entity being one of the walls of the meeting room. The parsed text database is applied to text-level machine-learning algorithm 1804. The example text-level machine-learning algorithm 1804 is designed and trained to generate a set of text-based probability distributions (shown in the figure as class probability distribution 1806). That is, each text-based probability distribution may comprise a set of possible room identities, with each member of the set of possible room identities associated with a probability that member represents the correct identity. For example, considering the room associated with the text "Meeting Room 1", the text-based probability distribution may assign a relatively high probability to the room being a conference room (e.g., greater than 0.90), and relatively low probability to the room being a water closest (e.g., less than 0.10). It is noted that the class probability distributions, in one example, provide room identity probabilities, not necessarily room names that could be reflected in the original CAD drawings. An algorithmic method of determining or selecting room name is discussed in greater detail below.

Now considering the room-level machine-learning algorithm. In example cases, the room-level machine-learning algorithm 1808 is provided the floor-level bounding line (not specifically shown) and the CAD vector-image 1821 (not including the text). The room-level machine-learning algorithm 1808 is designed and trained to generate room bounding lines around each room depicted on the floor identified by the floor-level bounding line. In FIG. 18, block 1810 graphically shows the resultant or output of the room-level machine-learning algorithm 1808. In particular, each room has a bounding line associated therewith. For example, the room shown as "Meeting Room 1" in the upper rendering has a bounding line 1812 associated therewith. As yet another example, the room shown as "Staff" in the upper rendering has a bounding line 1814 associated therewith.

In example methods, the resultant of the room-level machine-learning algorithm 1808 produces not only a plurality of room bounding lines, one each for each room, but also produces a plurality of graphics-based probability distributions, one each for each room bounding line. FIG. 18 graphically illustrates one matched set of a bounding line 1820 and corresponding graphics-based probability distribution 1822. Again, however, the output or resultant from the room-level machine-learning algorithm 1808 is a plurality of room bounding lines and respective plurality of graphics-based probability distributions for the room function or identity, not necessarily the name of the room as designated in the original CAD drawings.

In example methods, the resultants or outputs of the text-level machine-learning algorithm 1804 and the room-level machine-learning algorithm 1808 are applied, along with the furniture detection output 1826 (i.e., the furniture entities and associated location information from the furniture detection 106 (FIG. 1)), to a third machine-learning algorithm, the ensemble machine-learning algorithm 1830. In example cases, the ensemble machine-learning algorithm 1830 is a gradient boosting algorithm, such as the Light-GBM gradient boosting framework available from Microsoft Corporation. As alluded to above, the ensemble machine-learning algorithm 1830 is designed and trained to generate final room identity for each room bounding line (shown as class prediction 1832 in the figure). The final room identities, along the room bounding lines (e.g., room bounding line 1820) are then applied to the room post processing 1702.

Room Post Processing

The specification now turns to room post processing 1702. In example methods, the resultants from the room-level machine-learning algorithms 1700 are applied in parallel to various post processing algorithms. More particularly still, in example methods the resultants from the room-level machine-learning algorithms 1700 are applied to: 1) entity-based post processing algorithms; 2) graph-based post processing algorithms; and 3) generative adversarial network (GAN) post processing algorithms. Each of the example three post processing algorithms may be particularly suited for finding final room outlines, each in their own particular situation. The example entity-based post processing algorithm generates a set of entity-based bounding lines, one entity-based bounding line for each room on the floor. The example graph-based post processing algorithm generates a set of graph-based bounding lines, one graph-based bounding line for each room on the floor. The example GAN-based post processing algorithm generates a set of GAN-based bounding lines, one GAN-based bounding line for each room on the floor.

The resultants from the example three post processing algorithms are then applied to a rule-based evaluator that selects, for each room and from all the bounding lines generated with respect to the room, a ruled-based selection. The resultants from the example three post processing algorithms are also applied to a selection machine-learning algorithm that selects, for each room and from all the bounding lines generated with respect to the room, a ML-based selection. At this stage then, each room on the floor is associated with a rule-based selection of the room outline and a ML-based selection of the room outline. For each room, the two room outlines (i.e., the rule-based selection and the ML-based selection) are applied to a room decisions engine that selects between the two, resulting in a final room outline. The final room outline may then be the basis for further processing to identify or extract the walls for each room. Finally, the extracted walls for each room on the floor are merged to create the indoor map.

Figure 19:
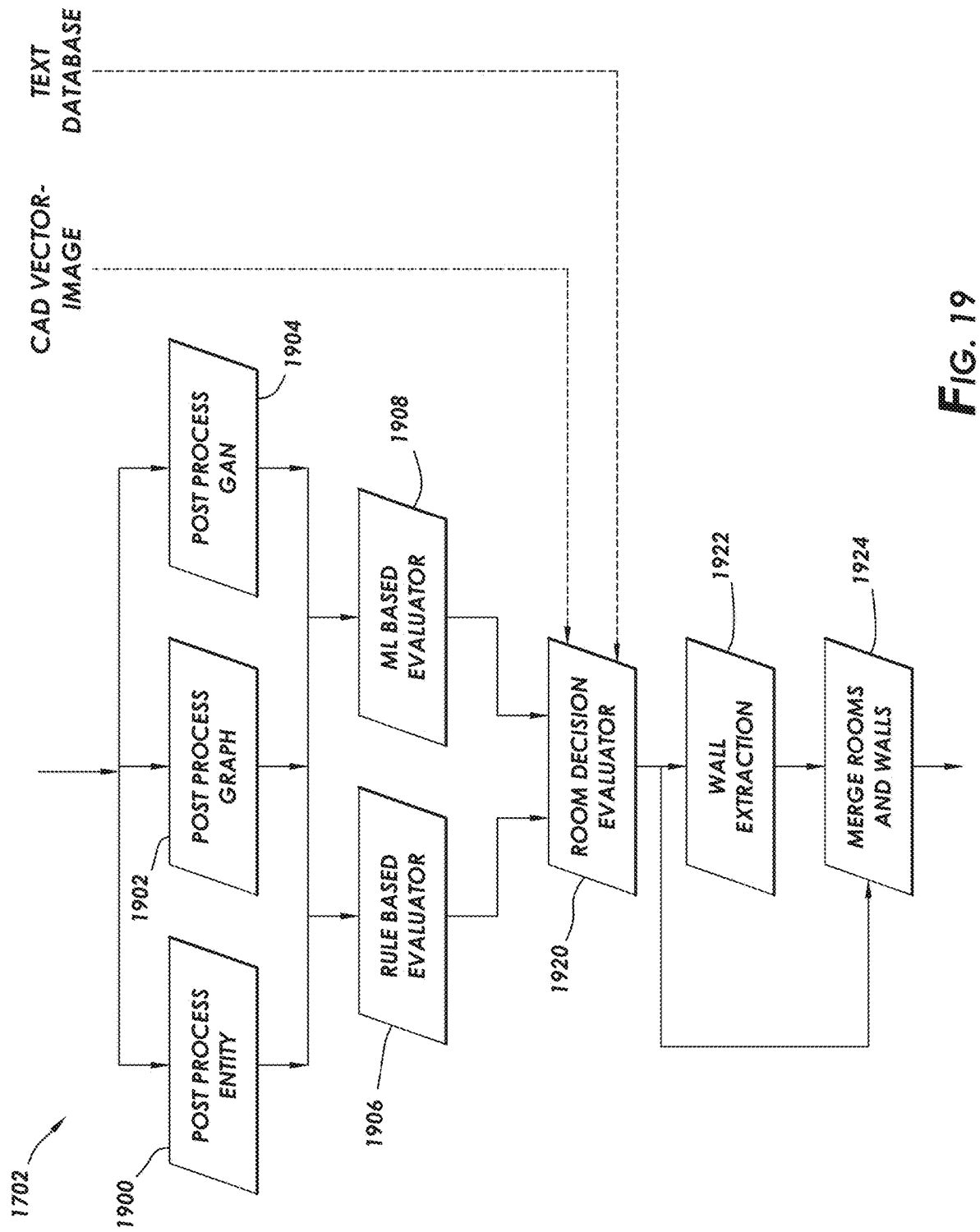
FIG. 19 shows a flow diagram of the room post processing in accordance with at least some embodiments.

FIG. 19 shows a flow diagram of the example room post processing 1702. In particular, the resultants from the room-level machine-learning algorithms 1700 are applied to entity-based post processing 1900 algorithms, graph-based post processing 1902 algorithms, and GAN-based post processing 1904 algorithms. The resultants from the example three post processing 1900, 1902, and 1904 are then applied in parallel to a rule-based evaluator 1906 and a selection machine-learning algorithm (shown in the flow diagram as a ML-Based Evaluator 1908, and hereafter selection machine-learning algorithm 1908). As between the respective selections of the rule-based evaluator 1906 and the selection machine-learning algorithm 1908, a room decision engine 1920 selects a final room outline based on the CAD vector-image and the text database. The final room outlines are then used to as the basis for wall extraction 1922. The final room outlines, and extracted walls, are then merged (process 1924) to create the indoor map for the floor. Each illustrative step is addressed in turn.

Entity-Based Post Processing Algorithms

Figure 20A:
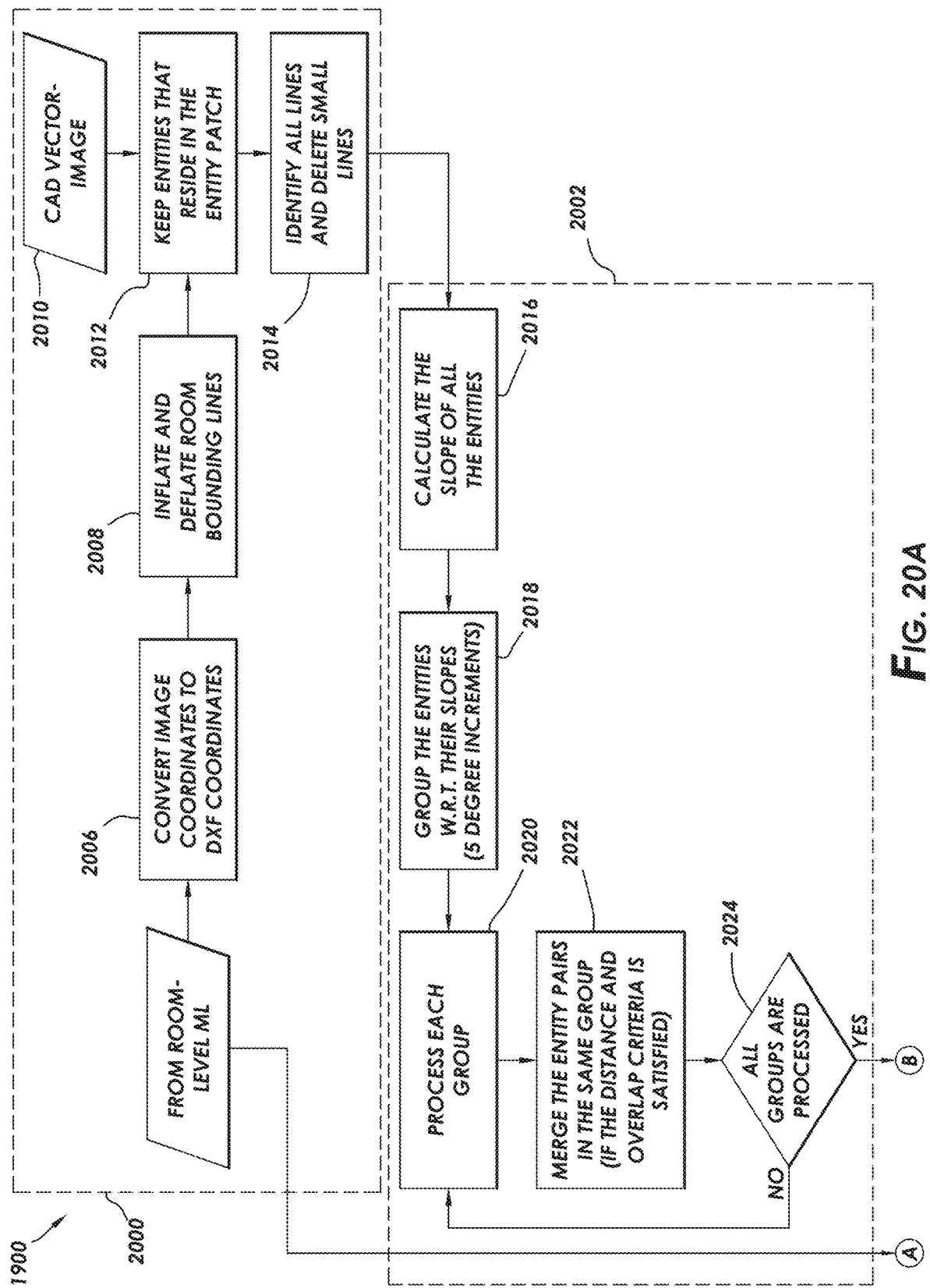
FIGS. 20A and 20B show a flow diagram of the entity-based room post processing in accordance with at least some embodiments.
Figure 20B:
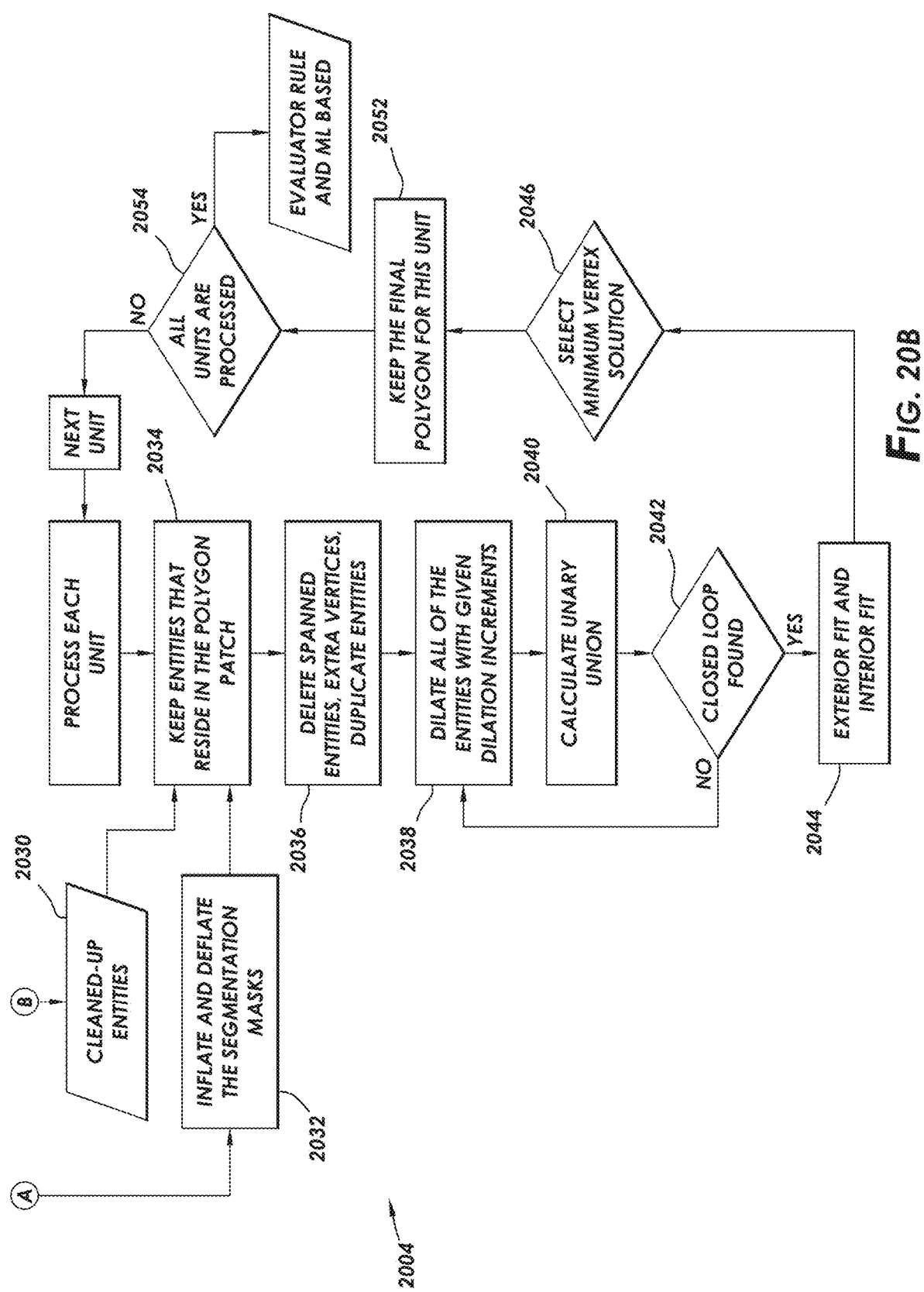

FIGS. 20A and 20B show a flow diagram of the entity-based post processing algorithm of the room post processing 1702. Referring initially to FIG. 20A, the entity-based post processing algorithm of the room post processing 1702 can be conceptually divided into drawing-entity selection 2000 and merging close lines 2002. Referring to FIG. 20B, the entity-based post processing algorithm can be further conceptually divided into finding polygons 2004. Each will be addressed in turn.

Drawing Entity Selection—Entity Based

Referring again to FIG. 20A. The example drawing-entity selection 2000 is provided the outputs of the room-level machine-learning algorithms 1700 (FIG. 17), in the example form of room bounding lines. The example drawing-entity selection 2000 may then convert the coordinate space of the bounding lines (e.g., vector-images) into the coordinate space of the CAD drawings (e.g., DXF), as shown by process 2006. With the bounding lines in the coordinate space of the CAD drawings, each of the room bounding lines is inflated to create an inflated bounding line and deflated to create a deflated bounding line, the inflation and deflation as shown by process 2008. The area between the inflated bounding line and the deflated bounding line defines an entity patch. The inflated and deflated bounding lines are then applied to the CAD vector-image 2010, and entities in the CAD vector-image that reside within the entity patch are filtered or extracted for further processing, the extraction as shown by process 2012. All the drawing-entities within the entity segmentation patch are identified, and small lines (e.g., line segments with lengths below a predetermined length) within the entity patch are removed or deleted, as shown by process 2014. The resultant may be multiple sets of remaining drawing-entities, each set of remaining drawing-entities being the drawing-entities that reside in the respective entity patches. The method then proceeds to merging close lines 2002.

Merging Close Lines

Still referring to FIG. 20A, the next step in the example method is merging of close lines 2002. In particular, for each entity patch, the slope of the drawing-entities (e.g., mostly, if not exclusively at this stage, line segments) are calculated, as shown by process 2016. The drawing-entities are then grouped with respect to their slopes, as shown by process 2018. In example cases, the grouping takes place in five degree increments. For example: lines that have a slope between −2.5 degrees and +2.5 degrees are grouped; lines that have a slope between +2.5 degrees and +7.5 degrees are grouped; and so on. The resultant is a plurality of groups of drawing-entities, with the members of each group having similar slopes. For each group (process 2020), drawing-entities are merged if distance and overlap criteria are satisfied, as shown by process 2022. A determination 2024 is made as to whether further groups are to be processed. If so, the example method retreats to processing the next group (processes 2020 and 2022). If all the groups are processed, the example method moves to finding polygons 2004

Finding Polygons

Referring to FIG. 20B. The next steps in the example method are the steps summarized as finding polygons 2004. The example method takes as input the room bounding lines from the room-level machine-learning algorithms 1700 and the cleaned-up entities 2030 from the immediately previous merging of close lines 2002. Starting with the room bounding lines, once again each of the room bounding lines is inflated to create an inflated bounding line and deflated to create a deflated bounding line, the inflation and deflation as shown by process 2032. The area between the inflated bounding line and the deflated bounding line defines a polygon patch. The inflated and deflated bounding lines are applied to the cleaned-up entities 2030, and drawing-entities of the cleaned-up entities that reside within the polygon patch are filtered or extracted for further processing, as shown by process 2034. The polygon patch associated with finding polygons 2004 is smaller or defines less area than the entity patch associated with the drawing-entity selection 2000, further focusing on finding the actual room outline.

In summary, the example method removes from the polygon patch: spanned entities whose size is below a predetermined size; duplicate entities; and extra vertices. For the drawing-entities remaining in each polygon patch, the example method: dilates the remaining entities; performs a unary union of the dilated entities to create a union shape; and attempts to find closed-loop path within the union shape. When a closed loop is found, the example method determines an internal and external outline of the union shape, deflates the exterior outline, and inflates in interior outline, as discussed with respect finding the floor-level outlines. The example method selects either the deflated external outline or the inflated internal outline, in example methods the selection based on which outline has the lowest number of vertices. From there, various further simplifications are performed to arrive a final room outline passed to the further processing, and the method continues for each room bounding line.

More precisely then, the example method deletes short spanned entities, extra vertices, and duplicate entities, as shown by process 2036. The remaining drawing-entities are dilated with a given dilation increment, as shown by process 2038. Thereafter, a unary union of the dilated entities is calculated, as shown by process 2040, to create a unary entity or union shape. A determination 2042 is made as to whether the union shape defines a closed-loop path. If no closed-loop path is found, this means the dilation was insufficient to make contiguous or "connect up" the drawing-entities, and the example method takes the "No" path out of the determination 2042. Along the "No" path, the dilation increment is increased, and the dilation, calculation of the unary union, and closed-loop determination are repeated until a closed-loop path is found.

With the closed-loop path found (i.e., the "Yes" path out of determination 2042), an exterior and interior fit is performed, as shown by process 2044. In particular, in example methods the exterior and interior fit process 2044 involves extracting interior and exterior outlines or polygons of the union shape created by process 2040. The exterior and interior polygons may be found using any suitable method, such as a converging active contour model or an expanding active contour model. The exterior polygon is deflated to create a deflated exterior polygon, while the interior polygon is inflated to create an inflated interior polygon, and from the deflated exterior polygon and the inflated interior polygon a minimum or reduced vertex solution is selected, as shown by determination 2046. From there, the reduced vertex solution may be the final room outline for the room under consideration, as implied by process 2052. If there are further rooms to process, determination 2054, the example method retreats to processing the further rooms, otherwise the results are passed to the next stage of room post processing (e.g., rule-based evaluator 1906 and selection machine-learning algorithm 1908 (both FIG. 19)).

Figure 21A:
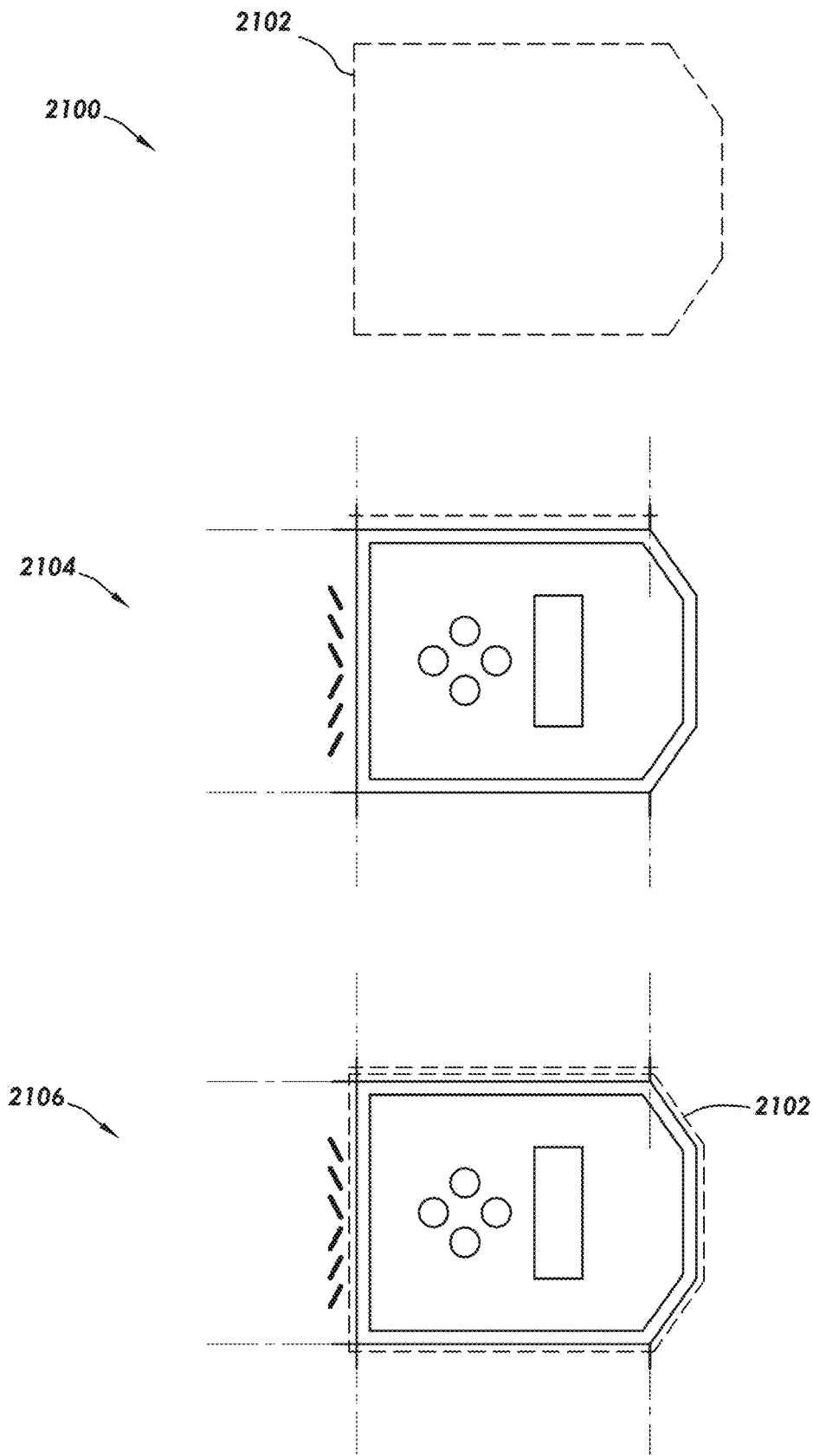
FIG. 21A graphically shows an example of entity-based room post processing in accordance with at least some embodiments.

FIG. 21A graphically shows an example of entity-based room post processing. In particular, consider that upper drawing 2100 represents an example room bounding line 2102 of a room on the floor, the room bounding line 2102 as found by the example steps of FIG. 18. Further, consider that the middle drawing 2104 is a portion of the modified CAD drawing showing a room on a floor along with various extraneous drawing-entities. In accordance with example methods, the room bounding line 2102 may be overlaid on the middle drawing 2104 as shown by the lower drawing 2106. In some examples, the overlaying may be performed with both the room bounding line 2102 and CAD drawing in a CAD drawing format, but combining in other file formats, including mixed formats, is possible.

Figure 21B:
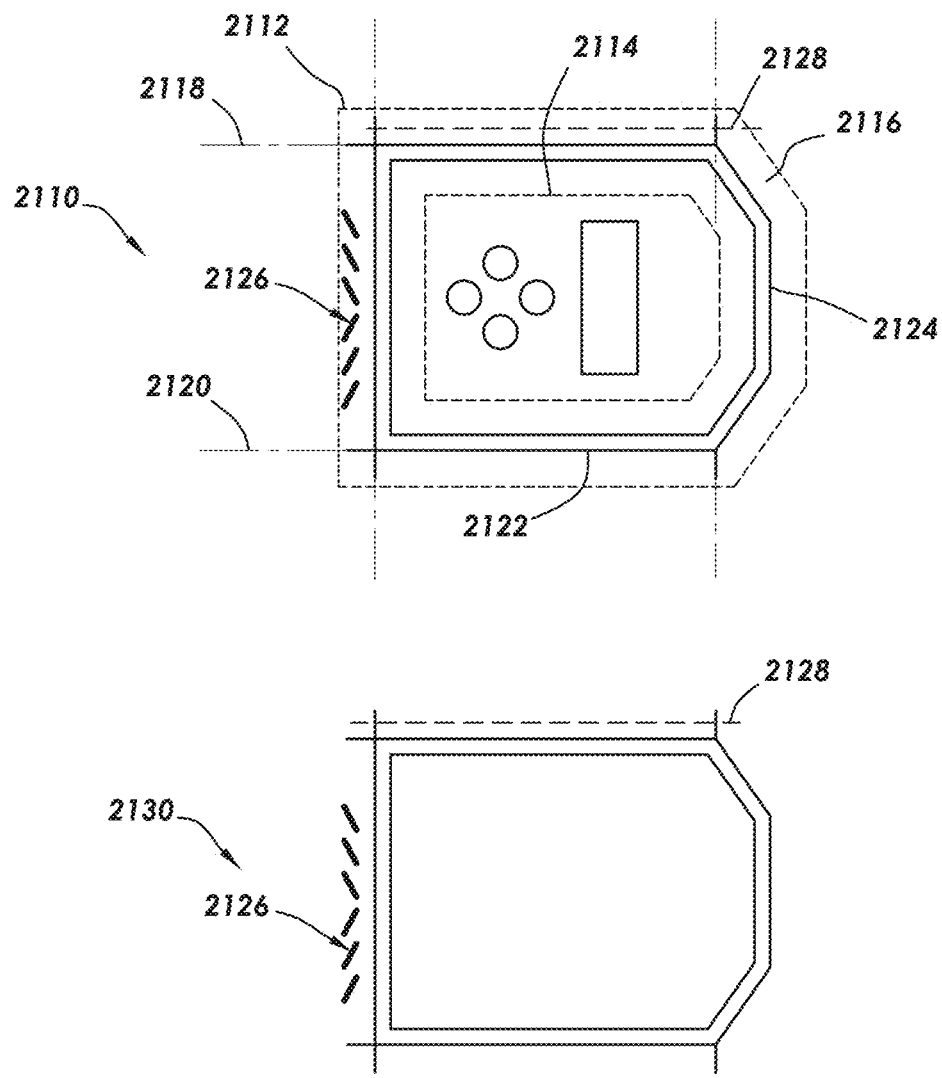
FIG. 21B graphically shows converging remaining entities, continuing from FIG. 21A.

FIG. 21B graphically shows the entity-based post processing of the example method, continuing from FIG. 21A. As shown by upper drawing 2110, the room bounding line (not specifically shown) may be inflated to create an inflated bounding line 2112, and the room bounding line may be deflated to create the deflated bounding line 2114. The inflation and deflation of FIG. 21B are exaggerated for purposes of clarity, but may be about +/−5% to 10% of the wall lengths. Moreover, the inflated bounding line 2112 and the deflated bounding line 2114 create a zone or area between them (i.e., the entity patch 2116).

The inflated bounding line 2112 and deflated bounding line 2114 delineate several categories of drawing-entities. For example, lines 2118 and 2120 cross the inflated bounding line 2112. Within the entity patch 2116 resides various drawing-entities, such as outer walls of the room (e.g., walls 2122 and 2124), short spanned entities 2126, and duplicate entity 2128 (i.e., a duplicate wall line). In practice, the duplicate entity 2128 may be hidden by being directly "behind" a line or set of lines showing the wall at that location, but duplicate entity 2128 is offset for clarity of the drawing. Inside the deflated bounding line 2114 resides various drawing-entities, likely defining furniture within the room. In the example method, the drawing-entities that reside wholly outside the inflated bounding line 2112 (none specifically shown), and portions of drawing-entities that cross the inflated bounding line 2112, such as portions of the lines 2118 that cross the inflated bounding line 2112, may be extracted or removed. Moreover, drawing-entities that reside wholly inside the deflated bounding line 2114 may be extracted or removed. For example, all the drawing-entities representing furniture within the room, may be removed.

Still referring to FIG. 21B, the lower drawing 2130 shows the remaining drawing-entities after having various entities outside the inflated bounding line 2112 removed, and having the various entities inside the deflated bounding line 2114 removed. Thus, the lower drawing 2130 shows a set of entities that may be passed to the next step in the example method.

Figure 22A:
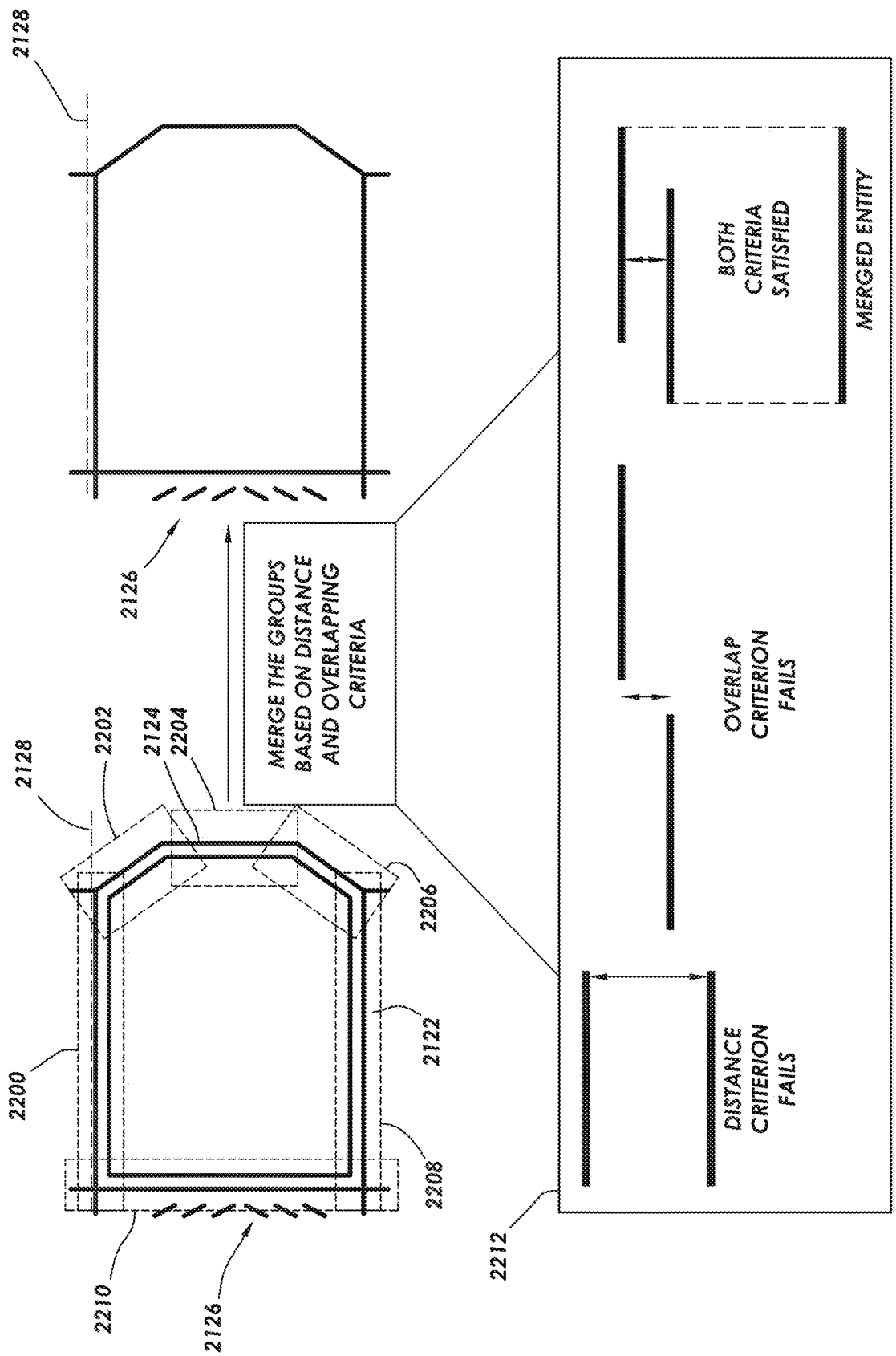
FIG. 22A graphically shows an example merging close lines in accordance with at least some embodiments.

FIG. 22A graphically shows an example of merging close lines. In particular, the upper-left drawing shows the remaining entities from the previous processing, including the various walls (e.g., walls 2122 and 2124), the short spanned entities 2126, and the duplicate entity 2128. The upper-left drawing also shows several groups of lines, with the grouping based on their respective slopes (and initial proximity). For example, the upper-left drawing shows groups 2200, 2202, 2204, 2206, 2208, and 2210. For each group, the drawing-entities are merged if distance and overlap criteria are met. Graphical examples of the distance and overlap criteria are shown in the lower box 2212. In particular, in example cases grouped drawing-entities are merged if two criteria are met: 1) a distance criteria; and 2) and overlap criteria. More particularly still, grouped drawing-entities are merged if the distance between the drawing-entities is less than a predetermined distance, and the overlap of the grouped drawing-entities meet a predetermined overlap criteria. The left figure within lower box 2212 graphically shows an example situation in which two lines are not merged for having too great a distance between them. The middle figure within the lower box 2212 graphically shows an example situation in which two lines are not merged for having too little overlap. The right figure within the lower box 2212 graphically shows an example situation in which two lines meet both the distance criteria and the overlap criteria, and thus the two lines are merged into a single merged entity. Within the lower box 2212 the distance and overlap are exaggerated for purposes of discussion. In practice, the distance criteria may be about 20 centimeters. Likewise in practice, the overlap criteria may be as little as 10%.

The upper-right drawing of FIG. 22A shows a set of remaining drawing-entities after the merging of drawing-entities based on the distance and overlap criteria. Notice how the groups containing parallel lines (e.g., likely defining two sides of the same wall) are merged to form single lines defining walls. Notice also, however, how the short spanned entities 2126 and the duplicate entity 2128 remain. The upper-right drawing of FIG. 22A thus represents cleaned-up entities 2030.

Figure 22B:
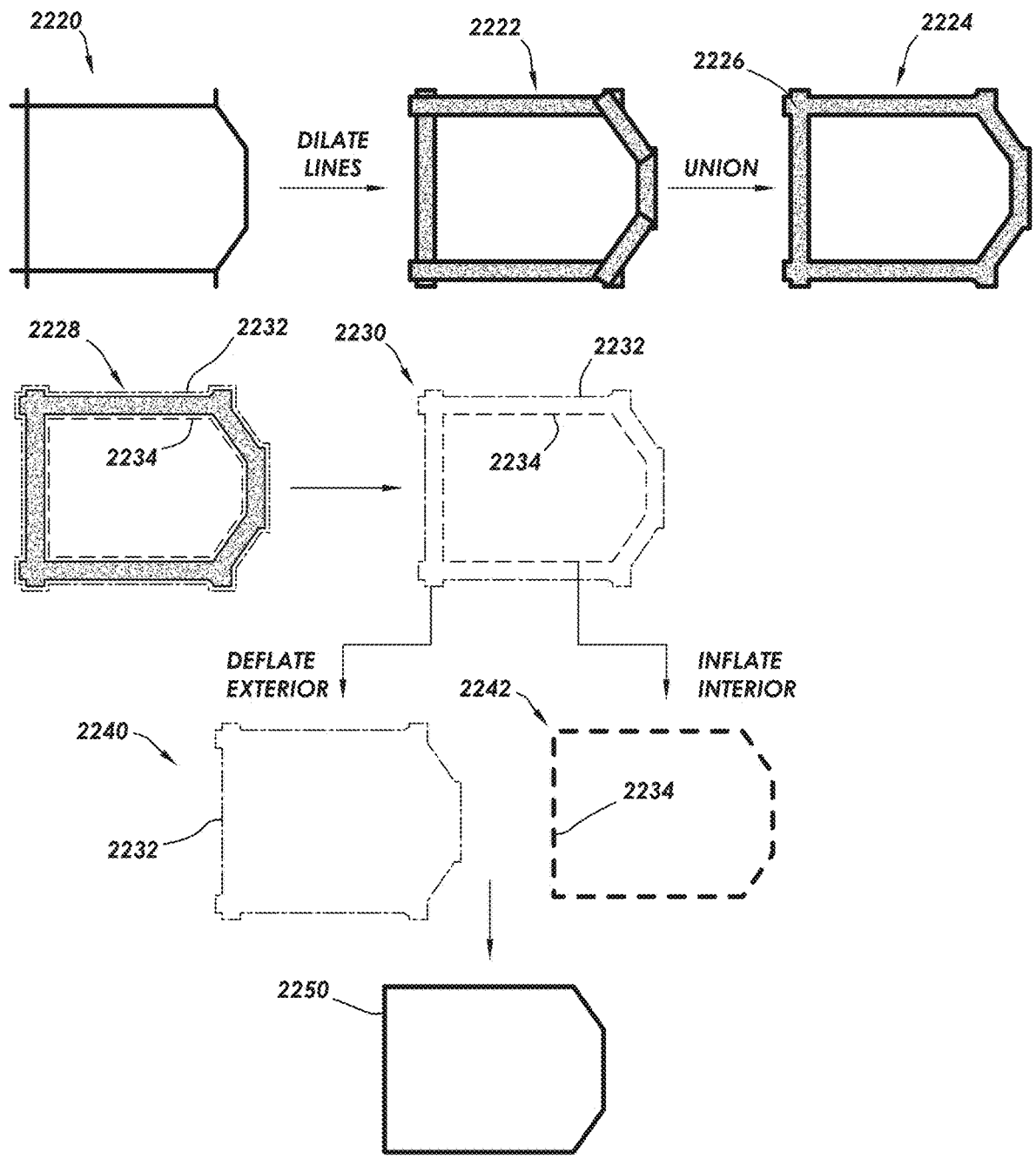
FIG. 22B graphically shows merging close lines, continuing from FIG. 21A.

FIG. 22B graphically shows merging close lines, continuing from FIG. 22A. So as not to unduly lengthen the specification, not specifically shown in the graphical representations are the pre- and post-versions of deletion of the short spanned entities 2126, duplicate entities 2128, and extra vertices. Thus, the upper-left drawing 2220 shows a set of remaining drawing-entities. In some cases, the upper-left drawing 2220 may be represented and be operated on in a vector-image format, but the operations may be performed in any suitable file format (e.g., CAD drawing format). In example methods, the various lines are dilated with a dilation increment, and a resultant is shown as the upper-middle drawing 2222. The upper-middle drawing 2222 shows a case in which the dilation increment is sufficient to have all the lines become contiguous, overlap, or "connect up." The next step in the example method is to perform a unary union or unioning operation, which combines all the dilated entities into a single polyline or union shape, as shown by upper-right drawing 2224 comprising union shape 2226.

In the example method, the interior and exterior outlines or polygons of the union shape 2226 are extracted, as shown by the middle-left drawing 2228. The resultant interior and exterior outlines are shown as the middle drawing 2230. That is, the middle-left drawing 2228 shows the union shape 1116, along with an exterior outline 2232 and an interior outline 2234. Finding the exterior outline 2232 and interior outline 2234 may take any suitable form. For example, the union shape 2226 may be in, or converted to, a raster-image. A shrinking active contour model may be initialized outside the union shape 2226, and thus may be used to find the exterior outline 2232. An expanding active contour model may initialized within the union shape 2226, and thus may be used to find the interior outline 2234. In any event, the exterior outline 2232 and the interior outline 2234 are determined.

Still referring to FIG. 22B, in the example method the exterior outline 2232 is deflated by a predetermined percentage and the interior outline 2234 is inflated by the predetermined percentage, and a minimum or reduced vertex solution is determined as between the two. In some example cases, the predetermined percentage used for the deflating the exterior outline 2232 and for inflating the interior outline 2234 is same as the dilation increment used to dilate the drawing-entities, but such is not strictly required. In words then, the dilation at the prior step is used to expand the drawing-entities (i.e., mostly drawing-entities showing room walls at this point) so that all the drawing-entities become contiguous, overlap, or otherwise "connect up." The exterior outline 2232 and interior outline 2234 of the union shape 2226 are thus expanded and contracted representations, respectively, of the footprint of the outer walls of the room. Deflating the exterior outline 2232 brings the exterior outline 2232 closer to the actual position of the walls of the room, and likewise inflating the interior outline 2234 brings the interior outline 2234 closer to the actual position of the walls of the room. Of the two outlines, the outline with the minimum or reduced number of vertices is selected.

Drawing 2240 shows the example exterior outline 2232 after deflation, and drawing 2242 shows the example interior outline 2234 after inflation. In accordance with example methods, either the exterior outline 2232 or the interior outline 2234 is selected as the candidate for the room outline. Here, the exterior floor outline 2232 has more vertices than the interior outline 2234, and thus the interior outline 2234 is selected as the entity-based room outline 2250 for further processing. The specification now turns to the graph-based post processing 1902 (FIG. 19).

Graph-Based Machine Post Processing

Returning briefly to FIG. 19. Another room post processing step in the example method is the graph-based post processing 1902. As implied by FIG. 19, the graph-based post processing 1902 takes as input the room-level bounding line from the room-level machine-learning algorithms 1700 (FIG. 17). The graph-based post processing 1902 generates a graph-based bounding line for the room under consideration. FIG. 19 shows the processing with respect to one room-level bounding line. The example method may be repeated for each room-level bounding line provided by the room-level machine-learning algorithms 1700.

Figure 23:
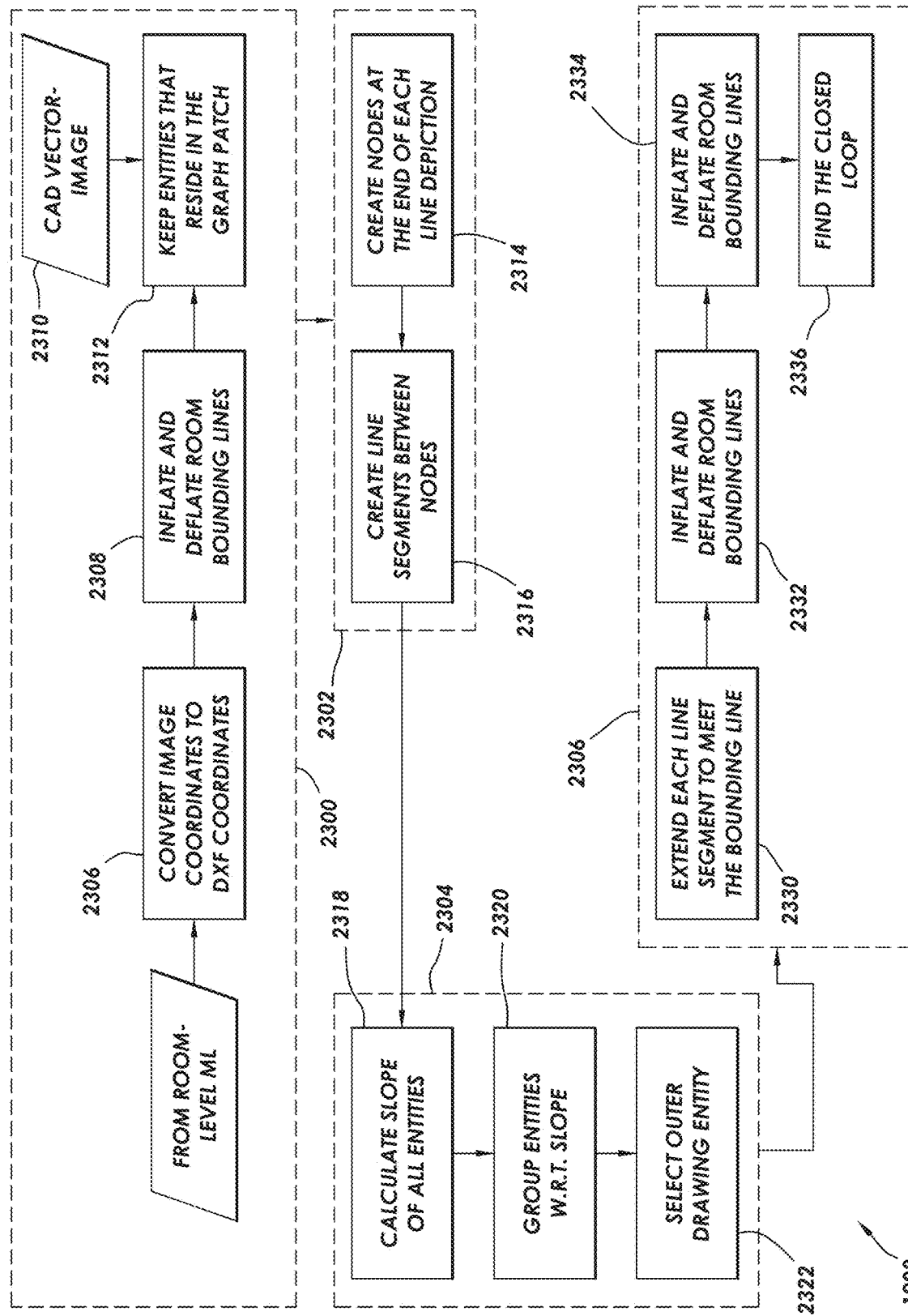
FIG. 23 shows a flow diagram of the graph-based room post processing in accordance with at least some embodiments.

FIG. 23 shows a flow diagram of the example graph-based post processing. The graph-based post processing 1902 can be conceptually divided into drawing-entity selection 2300, graph conversion 2302, parallel line elimination 2304, and extending line segments 2306. Each will be addressed in turn.

Drawing Entity Selection—Graph Based

The example drawing-entity selection 2300 is provided the outputs of the room-level machine-learning algorithms 1700 (FIG. 17), in the example form of room bounding lines. The example drawing-entity selection 2300 may then convert the coordinate space of the bounding lines (e.g., vector-images) into the coordinate space of the CAD drawings (e.g., DXF), as shown by the process. With the bounding lines in the coordinate space of the CAD drawings, each room bounding line is inflated to create an inflated bounding line and deflated to create a deflated bounding line, the inflation and deflation as shown by process 2308. The area between the inflated bounding line and the deflated bounding line defines a graph patch. The inflated and deflated bounding lines are then applied to the CAD vector-image 2310, and entities in the CAD vector-image that reside within the graph patch are filtered or extracted for further processing, the extraction as shown by process 2312. The resultant may be multiple a set of remaining drawing-entities that reside in the graph patch. The method then proceeds to graph conversion 2302.

Graph Conversion

Still referring to FIG. 23, the example graph conversion 2302 receives a set of remaining entities from the drawing-entity selection 2300 process. In example cases, the set of drawing-entities passed to the graph conversion 2302 are drawing-entities in the vector-image format, and most if not all the drawing-entities depict lines. For example, a line in the vector-image format may be defined by a plurality of polygons (e.g., triangles) stacked or abutting each other in such a way as to as to form, in the aggregate, the line. It follows that the end points of each line are not defined directly. Thus, the example method creates vertices, end nodes, or just nodes at the end of each line depicted in the set of drawing-entities, and as shown by processes 2314. From the nodes, line segments are created between corresponding nodes, as shown by process 2316. The resultant of the example process is a set of remaining drawing-entities comprising lines segments defined by end nodes in a two- or three-dimensional drawing space.

Parallel Line Elimination

In example cases, the set of line segments created by the graph conversion 2302 is passed to the parallel line elimination 2304 process. In particular, the slopes of the line segments in the graph patch are calculated, as shown by process 2318. The drawing-entities within each graph patch are then grouped with respect to their slopes, as shown by process 2320. Much like the grouping with respect to slope discussed in reference to FIG. 20A, in example cases the grouping takes place in five degree increments. The resultant is a plurality of groups of drawing-entities (e.g., line segments), with the members of each group having similar slopes. For each group, the example method comprises selecting an outer drawing-entity closest to the room-level bounding line, as shown by process 2322. The resultant is a set of outer line segments.

Extending Line Segments

Still referring to FIG. 23, the next step in the example method is the extending line segments 2306 process. In particular, each outer line segment is extended to meet or intersect the room-level bounding line on each end of the line, as shown by process 2330. Because each line segment of the set of line segments is extended, it follows that each line segment will likely, at least after extension (if not before), intersect other line segments. The next step in the example method is identifying or adding a plurality of nodes, vertices, or intersections one each at each location where line segments intersect, as shown by process 2332. Further line segments are then added or identified between the newly created intersections, as shown by process 2334. In some cases the further line segments are newly added and the other line segments (e.g., those extended) are deleted or removed. In other cases, the further line segments are portions of the line segments between intersections, and portions of the line segments outside the intersections are removed. Regardless of the precise mechanism of arriving at the further line segments, in some, but not necessarily all, cases the further line segments create a closed-loop path 2336 that should closely match the actual room outline. Stated otherwise, the simplified polygon defined by the closed-loop path 2336 is the final room outline for the room under consideration. The closed-loop path 2336 or final room outline is passed to the next stage of room post processing (e.g., rule-based evaluator 1906 and selection machine-learning algorithm 1908 (both FIG. 19)).

The specification now turns to a graphical explanation of the example graph-based room post processing 1902. In order not to unduly lengthen the specification, the drawing-entity selection 2300, which utilizes the inflation and deflation of the room-level bounding line procedure with respect to the graph-based room post processing, is not specifically shown. Several prior discussions in this specification graphically show several example processes in which a room-level bounding line is inflated and deflated to create a patch, and where entities within the patch are kept and entities outside the patch are discarded or removed from further consideration with the respect that particular process (e.g., FIGS. 21A and 21B).

Figure 24:
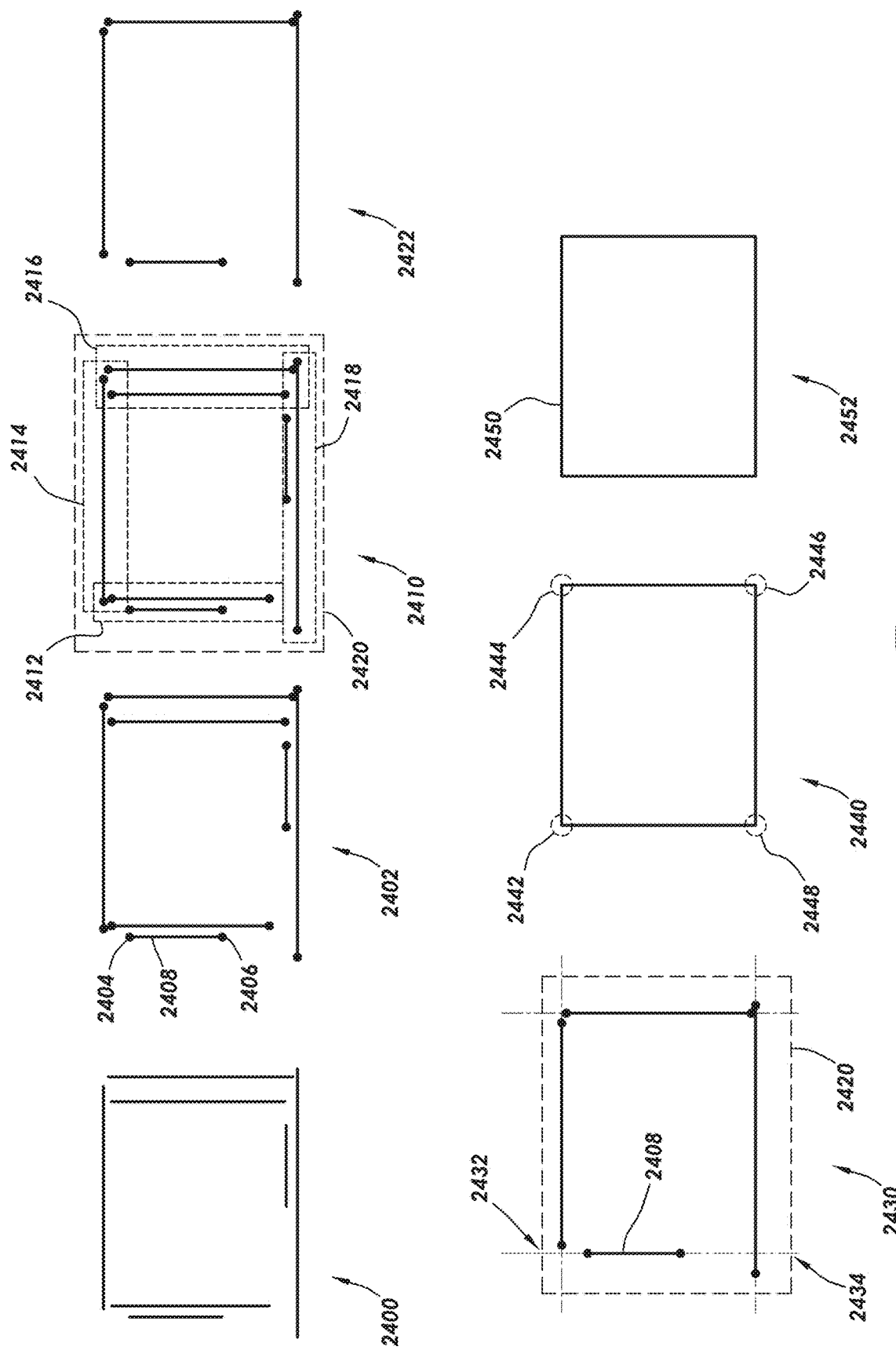
FIG. 24 graphically shows an example of graph-based room post processing in accordance with at least some embodiments.

FIG. 24 graphically shows an example of graph-based room post processing. In particular, consider that the upper-left drawing 2400 shows a set of drawing-entities that resided in the graph patch defined by inflating and deflating the room-level bounding line. In the example method, nodes are created at the ends of each line, as shown in drawing 2402, such as nodes 2404 and 2406 associated with example line segment 2408. Once the nodes are found, line segments are added between the nodes, but that step is not separately shown in FIG. 24. Drawing 2410 shows an example of grouping of lines according to slope (and a proximity criterion). In particular, drawing 2410 shows four example groups 2412, 2414, 2416, and 2418. For each group, the example method comprises selecting an outer drawing-entity closest to the room-level bounding line, the bounding line illustratively shown as room-level bounding line 2420 encircling the drawing 2410. Drawing 2422 shows a resulting set of outer line segments after the selection of line segments closest to the room-level bounding line 2420 and removal of the remaining drawing-entities.

The next step in the example method is the extending line segments. Still referring to FIG. 24, each outer line segment is extended to meet or intersect the room-level bounding line 2420 on each end of the line, as shown by lower-left drawing 2430. For example, line segment 2408 is extended to cross the room-level bounding line 2420 at location 2432 and 2434. Because each line segment of the set of line segments is extended, each extended line segment intersects other line segments, whether in the original or extended length. The next step in the example method is adding intersections, one each at each location where line segments intersect, as shown by drawing 2440. In this particular example, four intersections are created, being intersections 2442, 2444, 2446, and 2448. Further line segments are then added between the newly created intersections, but that step not separately shown in FIG. 24. In the example of FIG. 24, a closed-loop path is formed or defined by the further line segments between the intersections. Thus, the closed-loop path is the final graph-based room outline 2450 for the room under consideration, as shown by drawing 2452. The graph-based room outline 2450 is passed to the next stage of room post processing (e.g., rule-based evaluator 1906 and selection machine-learning algorithm 1908 (both FIG. 19)). The specification now turns to the GAN-based post processing.

GAN-Based Post Processing

Returning briefly to FIG. 19. Another room post processing step in the example method is the GAN-based post processing 1904. As implied by FIG. 19, the GAN-based post processing 1904 takes as input the room-level bounding line from the room-level machine-learning algorithms 1700 (FIG. 17). The GAN-based post processing 1904 generates a GAN-based bounding line for the room under consideration. FIG. 19 shows the processing with respect to one room-level bounding line provided by the room-level machine-learning algorithms 1700; however, the example method may be repeated for each room-level bounding line provided by the room-level machine-learning algorithms 1700.

Figure 25A:
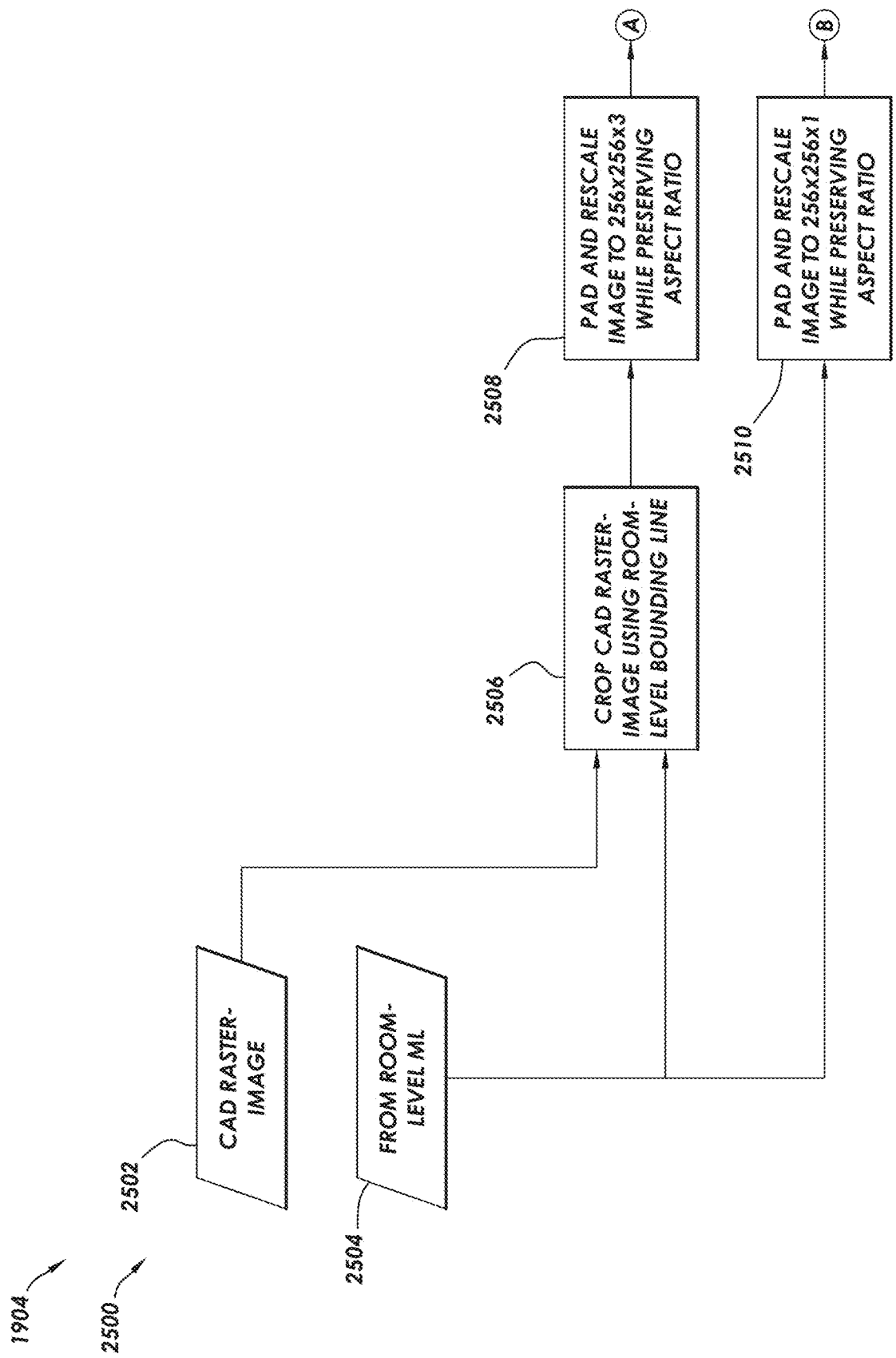
FIGS. 25A and 25B show a flow diagram of the entity-based room post processing in accordance with at least some embodiments.
Figure 25B:
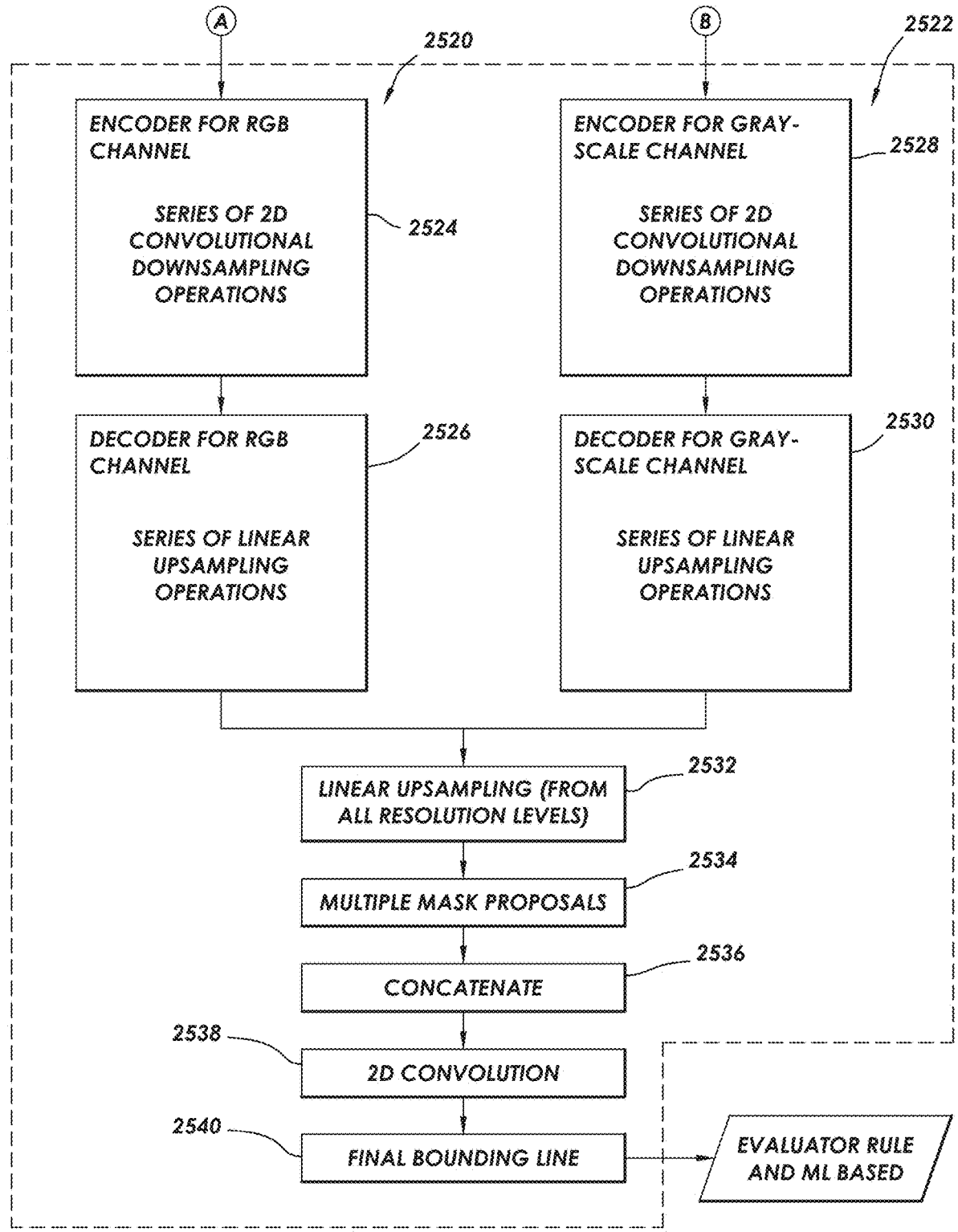

FIGS. 25A and 25B show a flow diagram of the example GAN-based post processing. The GAN-based post processing can be conceptually divided into dataset creation 2500 as shown in FIG. 25A, and GAN-processing as shown in FIG. 25B. Each will be addressed in turn.

In example methods, the GAN-based post processing 1904 starts with dataset creation 2500. The example GAN-based post processing 1904 is provided the CAD raster-image 2502 (e.g., CAD raster-image 222 of FIG. 2) as well as the room-level bounding line 2504 from the room-level machine-learning algorithms 1700 (FIG. 17), the room-level bounding line also in the example form of a raster-image. The CAD raster-image 2502 is cropped using the room-level bounding line, as shown by process 2506, to create a cropped image. More particularly still, though not specifically shown in the flow diagram of FIG. 25A, the room-level bounding line is converted to the coordinate space of the CAD drawings (e.g., DXF). With the room-level bounding line in the coordinate space of the CAD drawings, the room-level bounding line is used to crop the CAD raster-image (also or already in the coordinate space of the CAD drawing) to create the cropped image. The cropped image may then be padded and rescaled (while preserving aspect ratio) to a predetermined image size (e.g., 256×256 pixels), one for each image color of the CAD raster-image (e.g., red, green, blue), hence the reference to "256×256×3" and as shown by process 2508. Moreover, the room-level bounding line 2504 from the room-level machine-learning algorithms may also be padded and rescaled (while preserving aspect ratio) to a predetermined image size (e.g., 256×256 pixels), as shown by process 2510.

Turning now to FIG. 25B, the GAN-processing in example methods implements two GANs, an RGB GAN 2520 and a grayscale GAN 2522. As the name implies, the example RGB GAN 2520 is designed and trained to operate on the cropped image of the CAD raster-image, which may be a color image (e.g. red, green, and blue). The RGB GAN 2520 may perform a series of two-dimensional (2D) convolutions as part of a down-sampling procedure, as shown by process 2524. With the resultants of the down sampling the example method may perform a series of linear up-sampling operations, as shown by process 2526. The example RGB GAN 2520 may create a plurality of intermediate bounding lines (e.g., three intermediate bounding lines). Each of the intermediate bounding lines may be considered a proposal, by the RGB GAN 2520, regarding the outline of the room at issue.

Similarly, and again as the name implies, the example grayscale GAN 2522 is designed and trained to operate on the room-level bounding line in the form of a grayscale raster-image. The example grayscale GAN 2522 may perform a series of 2D convolutions as part of a down-sampling procedure, as shown by process 2528. With the resultants from the down sampling, the example method may perform a series of linear up-sampling operations, as shown by process 2530. The example grayscale GAN 2522 may create a plurality of intermediate bounding lines (e.g., three intermediate bounding lines). Each of the plurality of intermediate bounding lines may also be considered a proposal, by the grayscale GAN 2522, regarding the outline of the room at issue.

Still referring to FIG. 25B, the next step in the example method is linear up sampling, as shown by process 2532, with the resultant being multiple mask proposals 2534 (e.g., multiple raster-images showing proposed bounding lines for the room at issue). The multiple mask proposals are concatenated, as shown by process 2536, resulting in a set of mask proposals comprising members provided by each of the RGB GAN 2520 and the grayscale GAN 2522. The members of the set of mask proposals are subject to 2D convolution, as shown by process 2538, resulting in final bounding line 2540 (e.g., black and white or grayscale raster-image) having the predetermined size (e.g., 256×256 pixels). The final bounding line, being the GAN-based bounding line, is passed to the next stage of room post processing (e.g., rule-based evaluator 1906 and selection machine-learning algorithm 1908 (both FIG. 19)).

Figure 26:
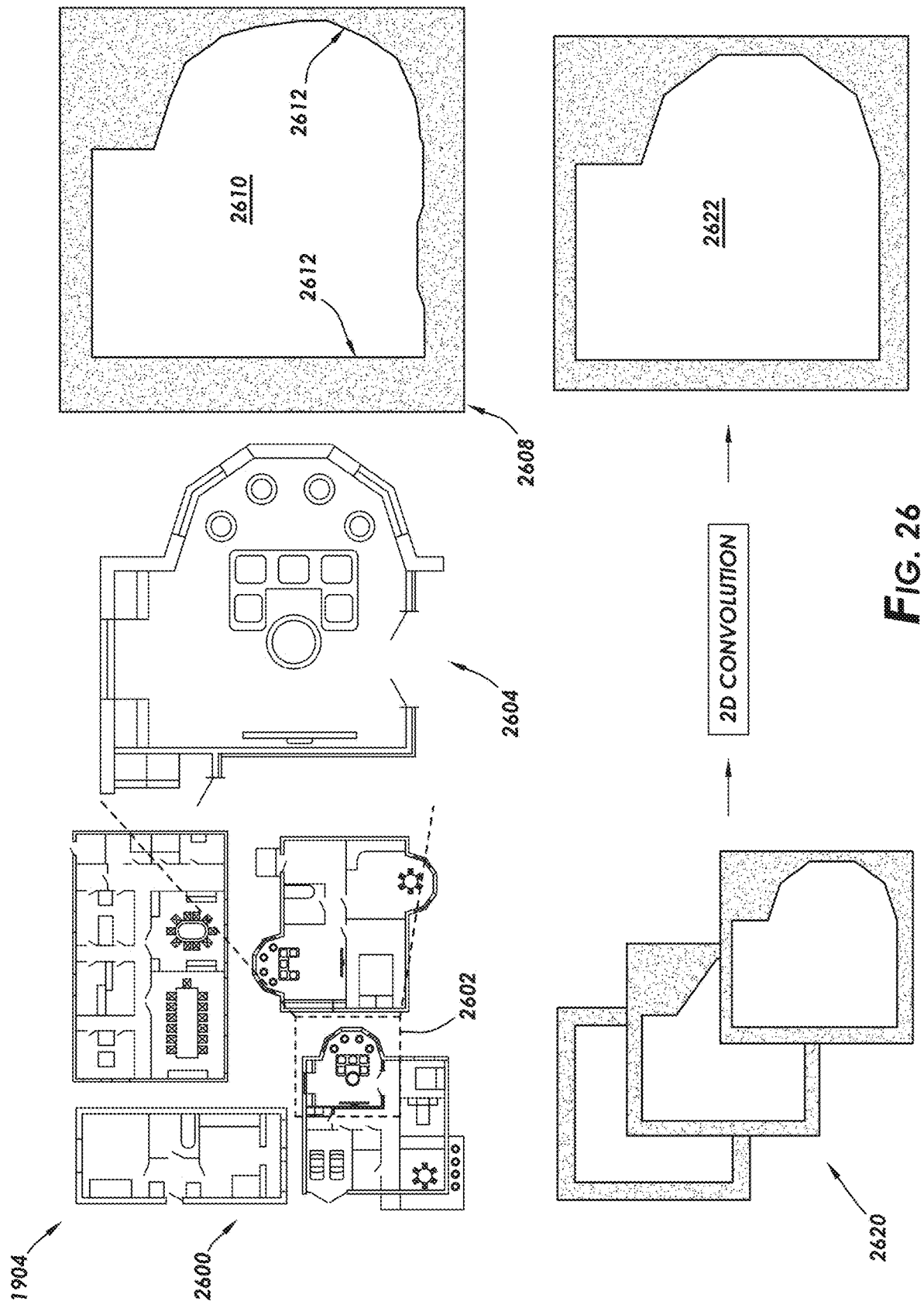
FIG. 26 graphically shows an example of GAN-based room post processing in accordance with at least some embodiments.

FIG. 26 graphically shows an example of GAN-based post processing 1904. In particular, the upper-left drawing 2600 shows a portion of a rendering of a CAD vector-image showing several rooms on a floor. Dashed box 2602 shows a room under consideration, with the understanding that eventually most if not all the rooms will be subject to room detection, including the GAN-based room post processing. The upper-middle drawing 2604 shows an example of the cropped image. The cropped image of the upper-middle drawing 2604 is shown in grayscale, but again in practice the cropped image may be a color image. The upper-right drawing 2608 shows a room-level bounding line 2610 in the form of inside area or inside surface 2612 of the black region, with the outer edges of the black region representing the padded region to fit the predetermined size (e.g., 256× 256 pixels). The patch between the inside surface 2612 and the outer edges is filled in to make the room-level bounding line 2610 more clear in the context of the images of predetermined size.

In example methods, the upper-middle drawing 2604 is applied to the RGB GAN 2520 while the room-level bounding line 2610 is applied to the grayscale GAN 2522. The result, after upscaling and concatenation, is a set of mask proposals, as shown by the lower-left drawing 2620. The members of the set of mask proposals are subject to 2D convolution, resulting in a final bounding line, being the GAN-based bounding line 2622. The GAN-based bounding line 2622, and particularly the inside surface, is the GAN-based post processing's proposal for the actual room outline; however, additional rule-based and machine-learning evaluators select from among the bounding lines from graph-based post processing, the entity-based post processing, and the GAN-based post processing to arrive at the room outline.

Rule-Based and ML-Based Evaluators

Returning to FIG. 19, and summarizing before continuing. The entity-based post processing 1900 generates an entity-based bounding line, the graph-based post processing 1902 generates a graph-based bounding line, and the GAN-based post processing 1904 generates a GAN-based bounding line. The three bounding lines are then applied to both the rule-based evaluator 1906 and the selection machine-learning algorithm 1908.

The example rule-based evaluator 1906 receives as input the three bounding lines—the entity-based bounding line, the graph-based bounding line, and the GAN-based bounding line. The rule-based evaluator 1906 is designed and constructed to choose among the three using any suitable method. For example, in some cases each of the entity-based post processing 1900, the graph-based post processing 1902, and the GAN-based post processing 1904 generate a respective confidence factor (e.g., value between 0.0 (i.e., no confidence) and 1.0 (complete confidence)) regarding their respective bounding lines. In one example case, the rule-based evaluator 1906 may thus select a bounding line based, at least in part, by choosing the bounding line with the highest confidence factor. Regardless of the precise method, the rule-based evaluator 1906 produces a rule-based selection being a bounding line that the rule-based evaluator 1906 considers to be the bounding line closest to the actual room outline of the room under consideration. In some cases, the rule-based evaluator 1906 also produces a rule-based confidence factor, indicating a confidence of the rule-based evaluator 1906 that the rule-based selection matches the actual room outline of the room under consideration.

The example selection machine-learning algorithm 1908 also receives as input the three bounding lines—the entity-based bounding line, the graph-based bounding line, and the GAN-based bounding line. The selection machine-learning algorithm 1908 may be machine-learning algorithm (e.g., convolution neural network) designed and trained to choose among the three bounding lines. For example, in some cases each of the entity-based post processing 1900, the graph-based post processing 1902, and the GAN-based post processing 1904 generate a respective confidence factor regarding their produced bounding lines. In one example case, the selection machine-learning algorithm 1908 may thus select a bounding line based, at least in part, on the confidence factors and any other suitable criteria. Regardless of the precise method, the selection machine-learning algorithm 1908 produces a ML-based selection being a bounding line that the selection machine-learning algorithm 1908 considers to be the bounding line that closest to the actual room outline of the room under consideration. In some cases, the selection machine-learning algorithm 1908 also produces a ML-based confidence factor, indicating a confidence of the selection machine-learning algorithm 1908 that the selection machine-learning algorithm matches the actual room outline of the room under consideration.

Room Decision Engine

Still referring to FIG. 19, the next step in the example method is selection of the room outline by the room decision engine 1920. In particular, in example cases the room decision engine 1920 receives as input: the rule-based selection for the room outline (and in some cases the rule-based confidence factor); the ML-based selection for the room outline (and in some cases the ML-based confidence factor); the CAD vector-image; and the text database. The room decision engine 1920 is designed and constructed to choose between the rule-based selection and the ML-based selection, the choice based on CAD vector-image 218 (FIG. 2), the text database 214 (FIG. 2), and in some cases the rule-based and ML-based confidence factors. The resultant of the example room decision engine 1920 may be the selection of a final room outline (e.g., a raster-image), from which a polygon may be created to represent the final room outline. The specification now turns to wall extraction 1922.

Wall Extraction

Still referring to FIG. 19. The next step in the example method is wall extraction 1922. In summary, the method associated with the wall extraction 1922 takes a plurality of final room outlines, one for each room on the floor, and extracts or determines from the final room outlines the locations of walls between the rooms. Stated otherwise, each final room outline may be conceptually described as the footprint of the room where the walls defining the room meet the floor. Inasmuch as walls between rooms have a thickness, the final room outlines for otherwise contiguous rooms may have a space or distance between them. The wall extraction 1922 thus finds the thickness of the walls, and helps form the basis for the walls shown in the indoor map created for the floor. It follows that the example wall extraction 1922 is provided the final room outlines for the rooms on the floor.

The portions of FIG. 19 discussed to this point have assumed operation on a single room on a designated floor. That is, the three parallel post processing steps are provided a room-level bounding line (from the room-level machine-learning algorithms 1700 (FIG. 17)) for a single room on the floor. By contrast, the wall extraction 1922 operates using a plurality of final room outlines. It follows that the example post processing steps, and follow-on evaluators and room decision engine, are instantiated or run separately for each room on the floor. So as not to unduly complicate the figure, FIG. 19 does expressly show the providing all the final room outlines to the wall extraction 1922; however, one having ordinary skill, with the benefit of this disclosure, now understands that wall extraction 1922 (as well as the merging rooms and walls algorithms 1924) operate after a plurality of final room outlines are created by the preceding steps.

Figure 27A:
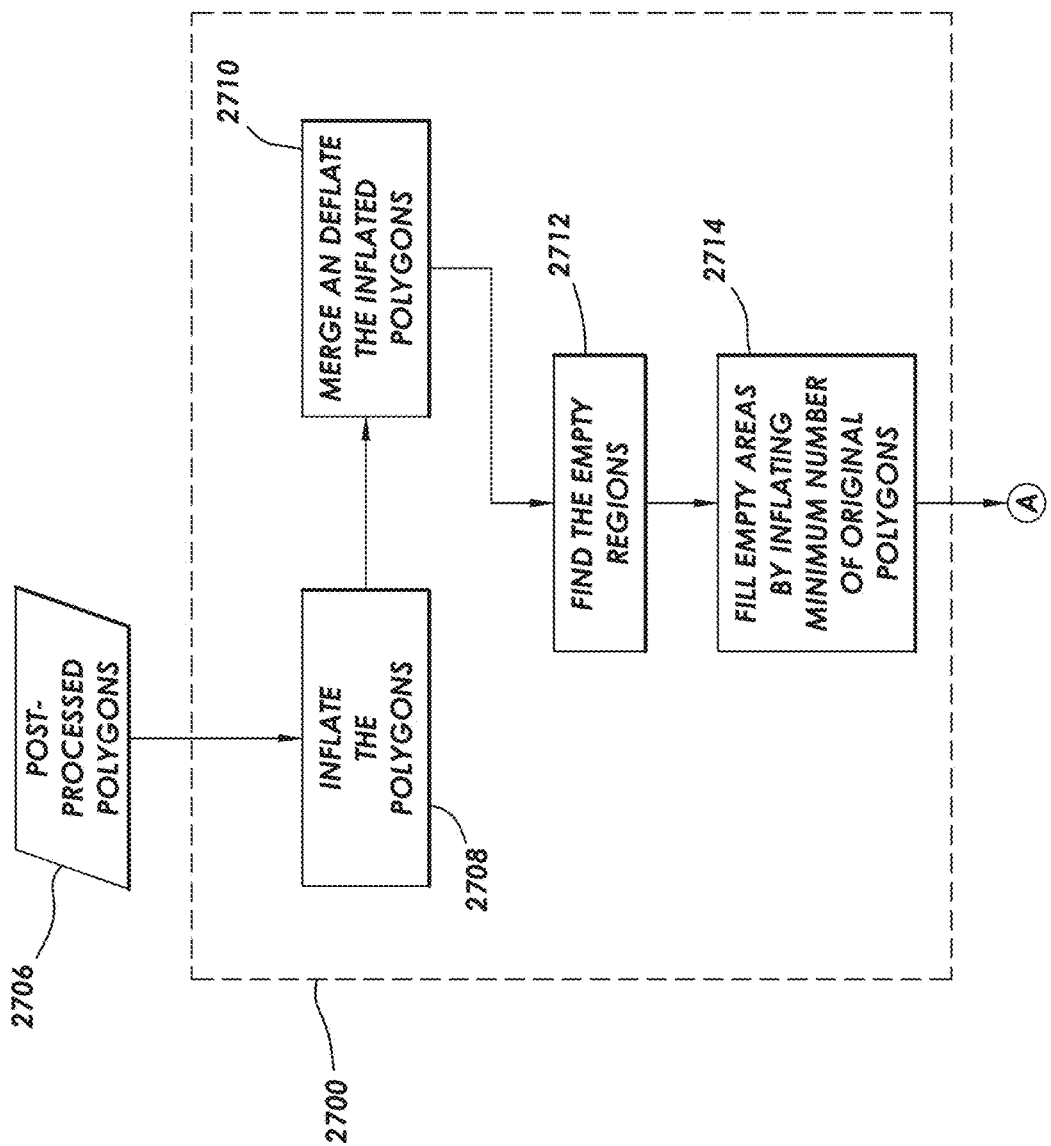
FIGS. 27A and 27B show a flow diagram of the wall extraction in accordance with at least some embodiments.
Figure 27B:
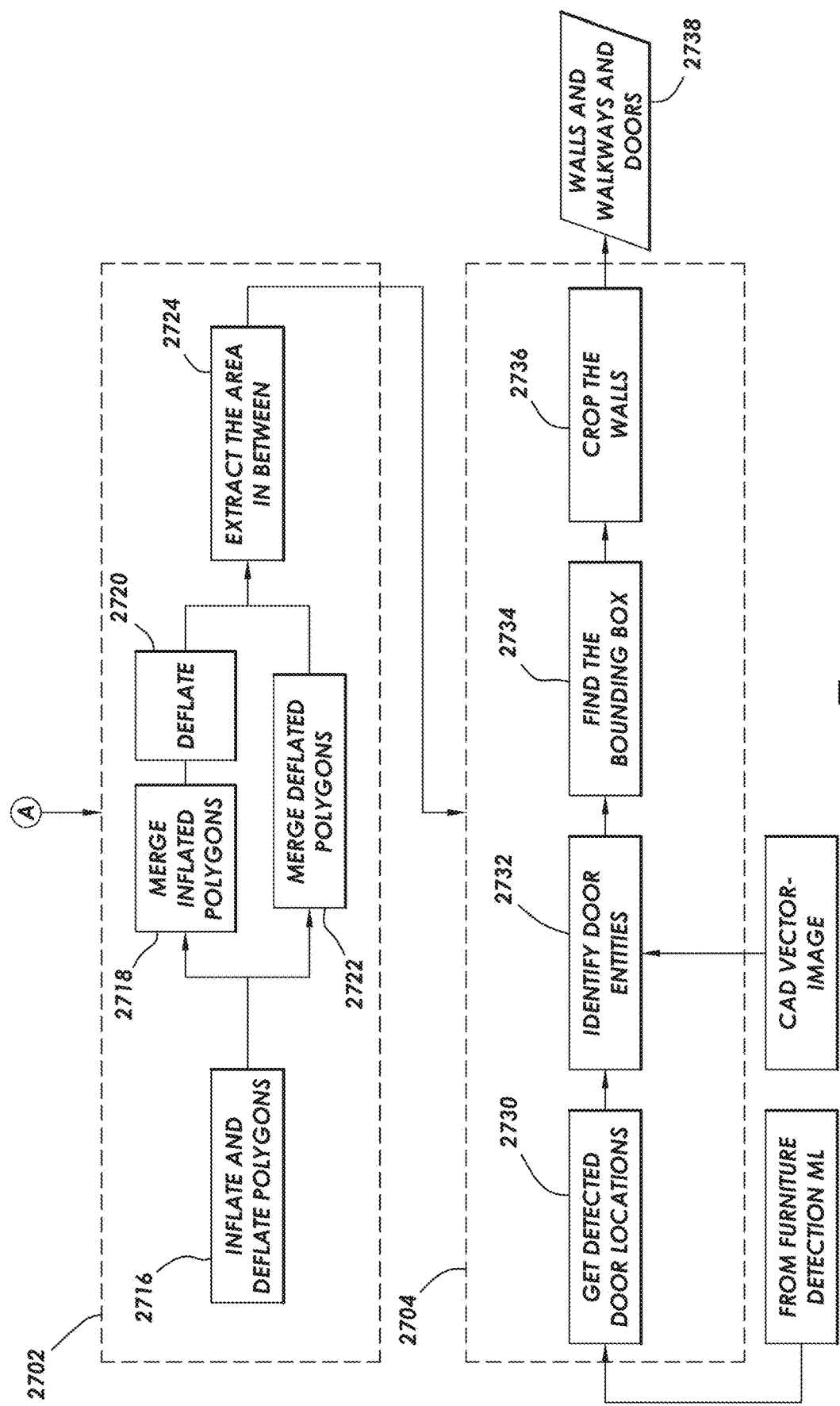

FIGS. 27A and 27B show a flow diagram of the example wall extraction 1922. The wall extraction 1922 can be conceptually divided into identifying and filling wall spaces 2700, identifying walls 2702, and door cropping 2704. Each will be addressed in turn.

Identifying and Filling Wall Spaces

Referring initially to FIG. 27A, in the example method the first step is identifying and filling wall spaces 2700. The example method takes as input the plurality of final room outlines from the previous steps. In example cases, each of the final room outlines may be converted from a raster-image to a vector-image or a CAD drawing, such that each final room outline is provided in the form a polygon. Considering then the plurality of final room outlines, the example identifying and filling wall spaces 2700 receives a plurality of polygons from the post processing, as shown by block 2706. In example cases, the polygons are inflated by a predetermined inflation percentage, as shown by process 2708. As discussed with respect to other inflation processes, the inflation may cause at least some of the inflated structures to touch, merge, overlap, or otherwise "connect up." In some cases, all the polygons are inflated. In other example cases, the inflation may be more targeted. For example, in some cases the inflation of the polygons may only be toward empty spaces. If two or more polygons can be used to expand into empty space, the polygon that that can fill the most area may be selected for inflation.

Regardless of the precise mechanism for the inflation, the next step in the example method may be merging polygons to find an outer polygon, and then deflating the merged entity, as shown by processing 2710. The input polygons may then be combined with the deflated outer polygons to find the empty regions, as shown by process 2712. Conceptually here, the empty regions may be wall spaces or wall areas between rooms. The empty regions may then be filled by inflating certain of the polygons into the empty regions, as shown by process 2714. In some cases, a solution is found in which a reduced number polygons, less than all the polygons, are inflated to fill the empty spaces, and in some cases a solution is selected in which a minimum number of polygons are inflated. Regardless of the precise method of inflation to fill the empty spaces, the resultant is a set of final wall polygons (e.g. a vector-image, or a CAD drawing) that depicts the walls on the floor.

Identifying Walls

Referring to FIG. 27B, the next step in the example method is identifying the walls 2702. In particular, the example method receives the set of final wall polygons, and both inflates and deflates the each member of the set of final wall polygons, as shown by process 2716. The inflated polygons are merged, as shown by process 2718, and then the merged polygons are deflated, as shown by process 2720. The resultant may be an outer polygon defining a bounding line of the rooms as a group. The deflated polygons are then merged with the outer polygon, as shown by process 2722. From the merged entities, the areas between polygons are extracted or identified as walls between and surround the rooms, as shown by process 2724. Any areas within the floor-level outline and the walls may thus be identified as hallways or walkways. The resultant is a set of walls defined within the floor-level outline, the resultant in any suitable form (e.g., vector-image, CAD drawing).

Door Cropping

The next step in the example method is door cropping 2704. The example door cropping 2704 procedure takes as input: the set of walls within the floor-level outline from the identifying walls 2702 procedure; the furniture entities from the furniture detection 106 (FIG. 1); and the CAD vector-image 218 (FIG. 2). As mentioned with respect to furniture detection, the example furniture detection 106 identifies not only furniture entities (e.g., tables, desks, chairs), but also identifies door entities and associated location. The example door cropping 2704 thus gets door entity and associated location information, as shown by process 2730. The example process then identifies the door entities from the CAD vector-image, as shown by process 2732. Bounding boxes or bounding lines are found for each door, as shown by process 2734, and using the bounding lines the walls are removed or cropped to show doorways between each room, as shown by process 2736. The resultant 2738 is a vector-image or CAD drawing showing rooms, doorways, and walkways on the floor.

Merging Rooms and Walls

Returning to FIG. 19, the next step in the example method is merging the rooms and walls 1924. In particular, the example merging may combine resultant 2738 FIG. 27 with room identity information to label each room with its intended purpose according to the original CAD drawings.

Figure 28A:
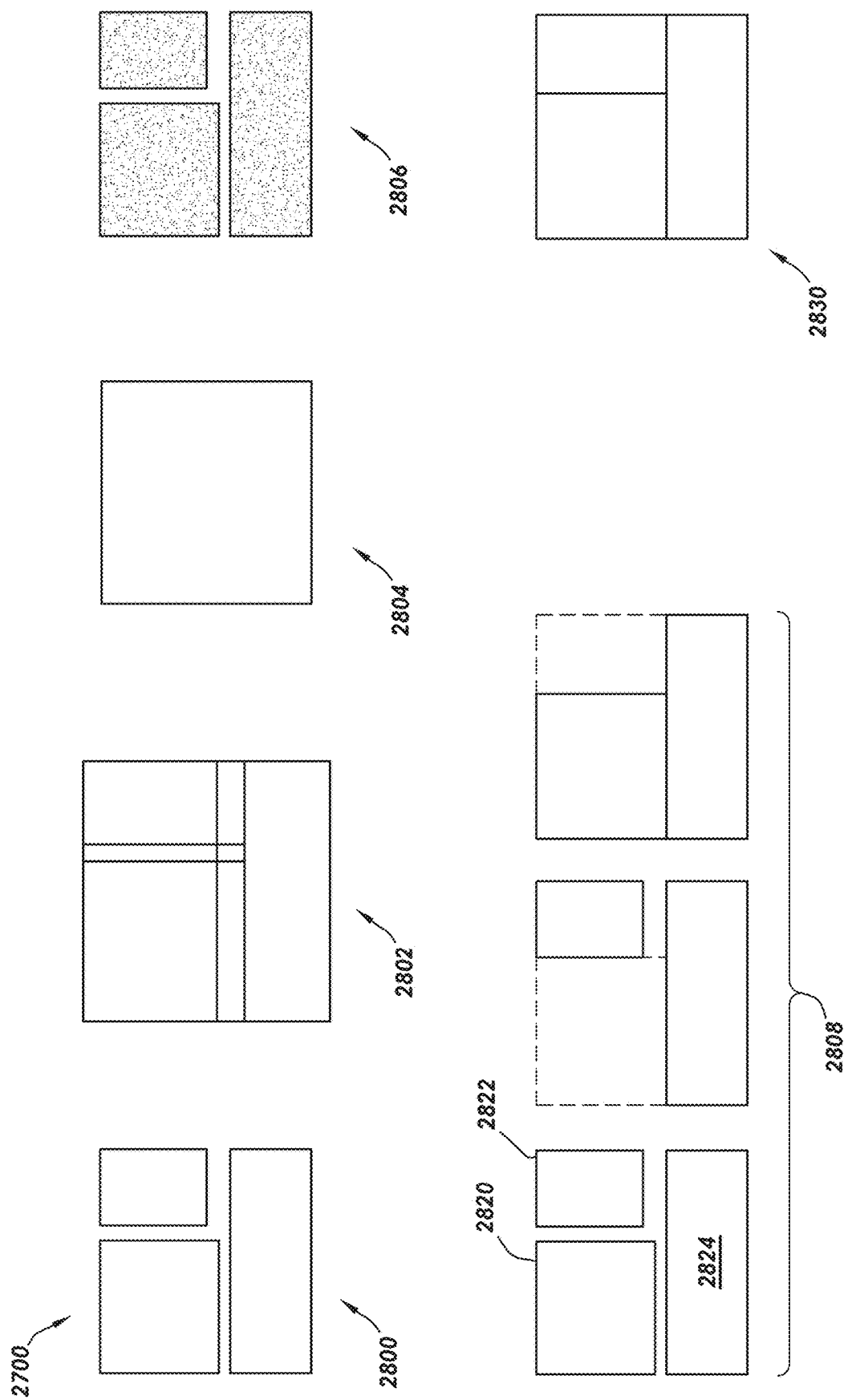
FIGS. 28A, 28B, 28C, and 28D graphically show an example of wall extraction and merging of rooms and walls in accordance with at least some embodiments.

FIGS. 28A, 28B, 28C, and 28D graphically show an example of the wall extraction 1922. Referring initially to FIG. 28A, the upper-left drawing 2800 shows an example plurality of final room outlines from the previous steps. In example cases, the polygons are inflated by a predetermined inflation percentage, as shown drawing 2802. The example inflation causes not only the outer boundary to increase in size, but also may cause at least some of the inflated polygons to touch, merge, overlap, or otherwise "connect up." The inflated polygons are merged and deflated, as shown by drawing 2804. The input polygons may then be combined with the deflated outer polygon to find the empty regions, as shown by the white spaces in the upper-right drawing 2806. Again, conceptually here the empty regions may be wall spaces or wall areas between rooms. The empty regions may then be "filled" by inflating certain of the polygons into the empty regions, such as finding a solution in which a reduced number of polygons is inflated to fill the empty spaces. The three lower-left drawings 2808 show a visual example of selective inflation to fill the empty regions. In particular, polygons 2820 and 2822 are inflated to fill the wall spaces with respect to each other and polygon 2824. The resultant is a set of final wall polygons as shown by the lower-right drawing 2830.

Figure 28B:
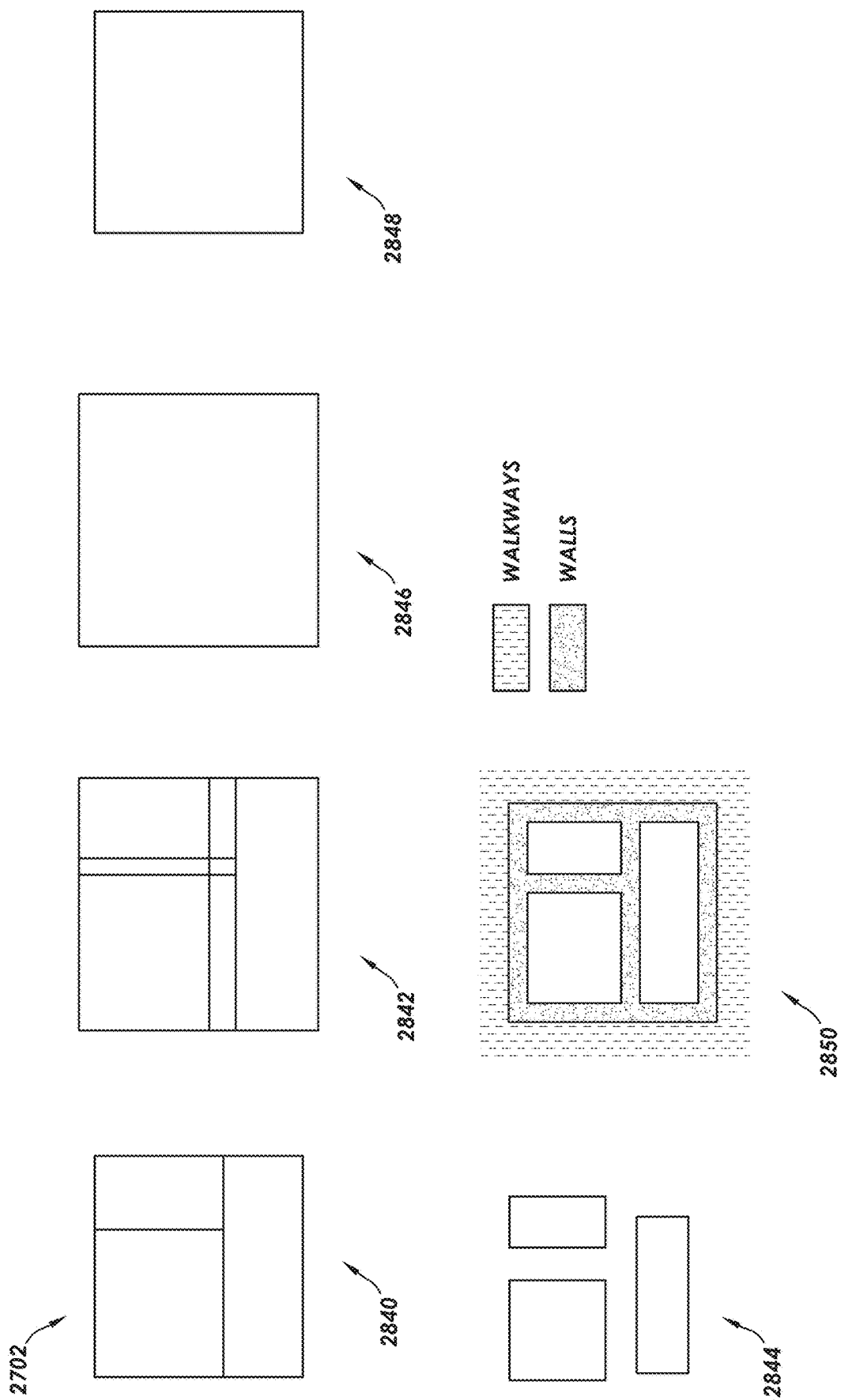

Now referring to FIG. 28B. The next step in the example method is identifying the walls 2702. The example method receives the set of final wall polygons, as shown by upper-left drawing 2840, and both inflates (drawing 2842) and deflates (lower-left drawing 2844) each member of the set of final wall polygons. The inflated polygons are merged with the resultant being outer polygon as shown by drawing 2846, and then the outer polygon is deflated as shown by upper-right drawing 2848. The deflated polygons shown by the lower-left drawing 2844 are then merged with the outer polygon, as shown drawing 2850. From the merged entities, the areas between polygons are extracted or identified as walls between and surround the rooms, and any areas within the floor-level outline (not specifically shown) and the walls may thus be identified as hallways or walkways.

Figure 28C:
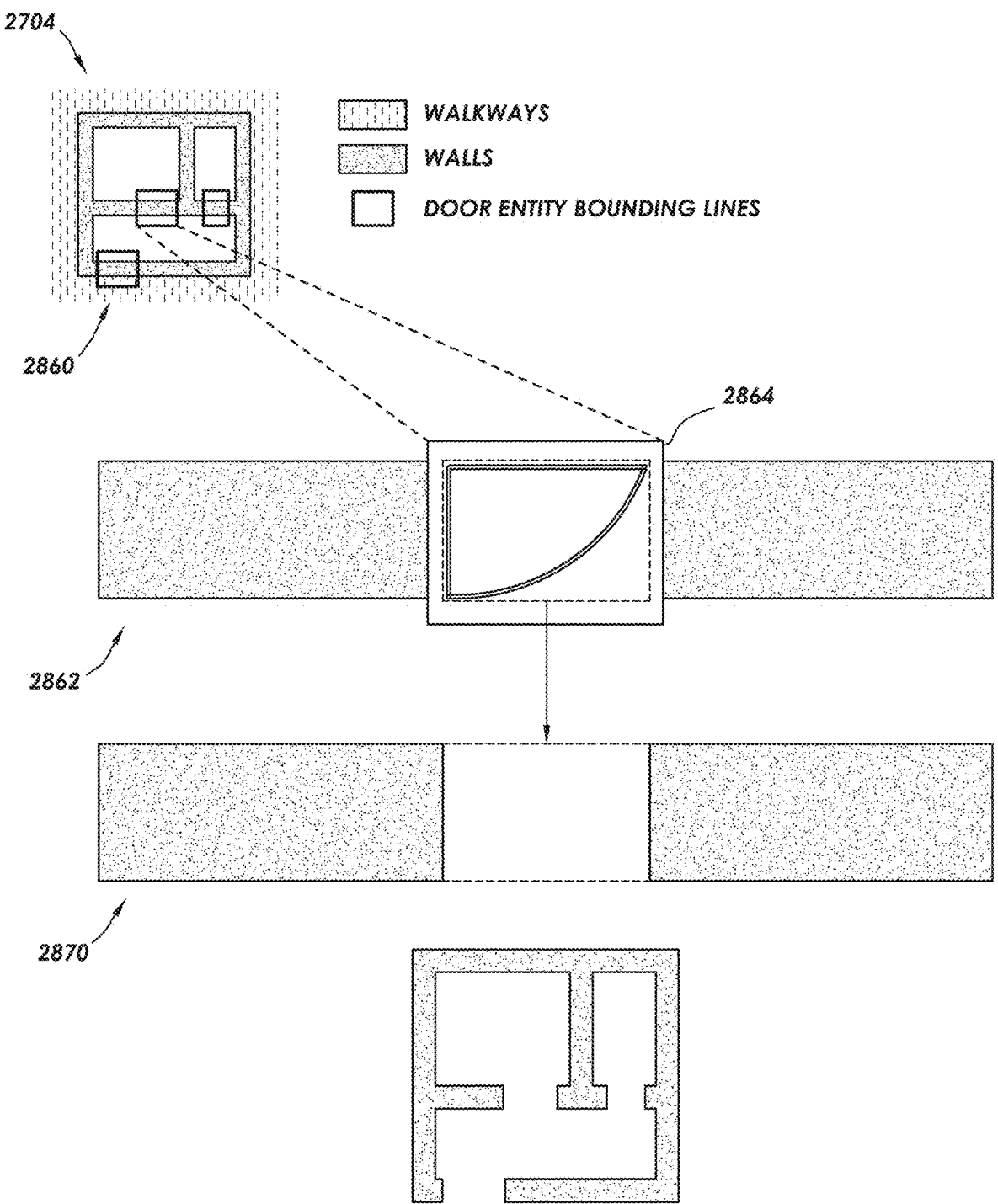

Now referring to FIG. 28C. The next step in the example method is door cropping 2704. The example door cropping 2704 procedure starts with the set of walls within the floor-level outline from the identifying walls 2702 procedure, as shown by the upper-left drawing 2860. From the furniture entities a set of door entity bounding boxes or bounding lines are determined, including location of the door entity bounding lines relative to the identified walls. In the example upper-left drawing 2860, three example door entity bounding lines are shown. The example door cropping 2704 procedure crops the walls based on location of the door entity bounding boxes. For example, the middle drawing 2862 shows an example bounding line 2864 for a door entity, and also shows the CAD vector-image of the door within the bounding line 2864. Using the bounding lines the walls are removed or cropped to show doorways between each room, as shown by lower-drawing 2870. The resultant is an image, in any suitable file format, showing the rooms on the floor, including the doorways into the various rooms and hallways on the floor.

Figure 28D:
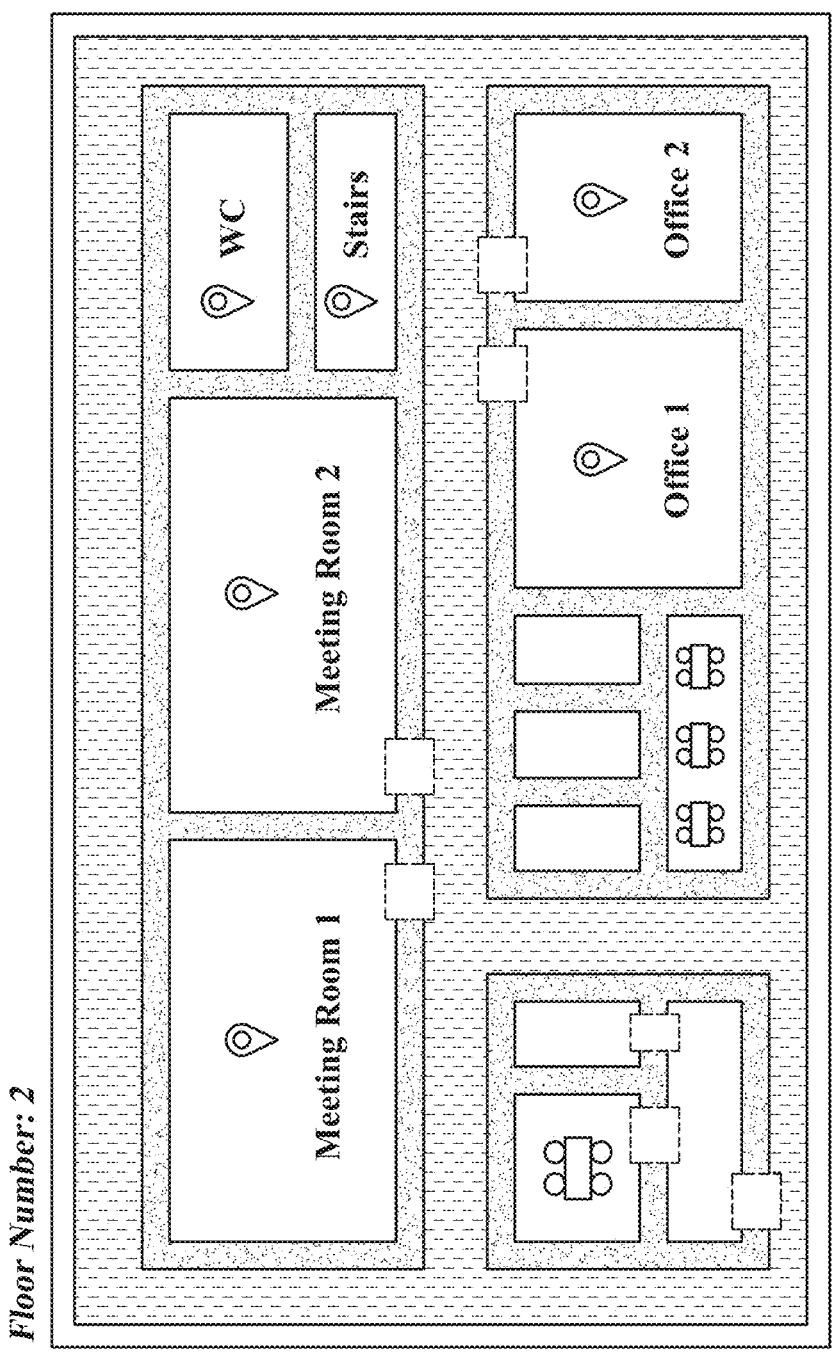

Now referring to FIG. 28D. The next step in the example method is merging the rooms and walls 1924. In particular, the example merging may combine resultant 2738 (FIG. 27) with room identity information to label each room with its intended purpose according to the original CAD drawings. Thus, the example image shows an example floor (e.g., floor 2) with several meeting rooms, offices, and stairs. Notice the doorways, room identity labels, and furniture placement.

Auto-Naming of Rooms

In the examples discussed to this point, the text in the text database 214 (FIG. 2) is used to generate the class probability distributions. That is, the text database 214 is used to provide room identity probabilities, not necessarily room names. In further examples, the room post processing 1702 (FIG. 17) may include algorithmic methods of determining or selecting room names. In particular, in some cases the original CAD drawings include the names of the rooms in text form (e.g., San Jose Meeting Room). During the preprocessing 102 (FIG. 1), the text and formatting characters are removed and placed text database 214. The additional post-processing may algorithmically determine the room names; however, the same issues apply to room names as to other aspects of the CAD drawings—there are no universal standards as to the font, font size, location, or placement of room names in the CAD drawings.

Thus, examples of the extraction of room names from the CAD drawings utilize the various methods described above. For example, the CAD drawing is preprocessing to create the text database 214 containing text from the CAD drawing and associations of the text with locations within the CAD drawing; a floor depicted in the CAD drawing is determined, resulting in a floor-level outline; and a plurality of room-level outlines are identified within the floor-level outline, the plurality of room-level outlines corresponds to a respective plurality of rooms. The further examples may include selecting a name of a room from the plurality of rooms, the selecting based on text within the text database. An example of the selecting is discussed below. The selecting names may continue for each room found in the floor-level outline. Thereafter, an indoor map may be created, the indoor map including the name of the room, and the name of the room may be associated with a location of the room within the floor-level outline.

FIG. 29 shows an example flow diagram of selecting room names. In particular, the method starts with text information from the text database 214. Reserved characters are removed, as shown in step 2900. Removing reserved characters may include removing formatting characters, font identification characters, color identification characters, and various non-alphabetic characters (e.g., slashes, percent symbols, question marks, hyphens). The next step in the example is grouping text in the text database associated with the rooms, as shown in step 2902. In particular, the grouping takes as input the text with the reserved characters removed, and the room-level outlines after the aforementioned portions of the post-processing, delineated as "Post Processed Unit Polygons" 2904 in the figure. The grouping creates, for each room, an indication of text associated with or inside the rooms, referred to as grouped text 2906.

With respect the grouped text for each room, the example method separates the numbers and words, as shown in step 2908. In particular, in some cases the text of the grouped text may lack spaces between words, or between words and numbers. The example separation separates or delineates the words and text. With the separated words and text of the grouped text, the example method may perform lemmatization to form a plurality of lemmas, as shown in step 2910. Lemmatization may be considered finding a root of a word in cases in which the word may be presented in two more inflected forms. Examples of lemmatization, and the resultant lemmas, are discussed in greater detail below. Each lemma of the plurality of lemmas is assigned a member probability, as shown in step 2912. Each member probability represents the likelihood of a lemma being a member of the name of the room. In one example, assignment of the member probabilities is performed by a machine-learning algorithm, such as a neural network. The example then generates a combination using each lemma having probability above a predetermined threshold, as shown in step 2914, and the generating creates a moniker. That is, for lemmas having member probability above a predetermined threshold, the lemmas are combined in various ways to generate a list of possible names or monikers for the room.

In various examples, a machine-learning algorithm, such as a neural network, may be used to check the combinations of lemmas, as shown in step 2916. In one example, the neural network used to assign the member probabilities at step 2912 may also be trained and used to check the combinations. In particular, each moniker is assigned a moniker probability, with each moniker probability representing the likelihood of a moniker being the name of the room.

The next example step may be a comparison of the combinations in the form of the monikers and the individual words in the form of the lemmas, as shown in step 2918. In particular, the additional checking may be performed by an analysis of the monikers and respective moniker probabilities, and the individual words or lemmas and their respective probabilities. Checking the combinations at step 2916 may be considered an analysis of the functioning of the machine-learning algorithm at generating monikers as candidates for room names. If the machine-learning algorithm is consistently generating probabilities that result in monikers with incoherent names, the check at step 2916 may trigger updated training or retraining machine-learning algorithms, as shown in step 2930. For example, if a lemma has a very high probability of being part of a room name, but the moniker with the highest moniker probability does not include the lemma with the highest probability, additional training may be needed.

Thereafter, name of the room is selected from the monikers with the highest moniker probability, as illustrated by step 2920. In one example, selecting the name of the room may be by selecting the moniker with the highest moniker probability, but any suitable selection from the monikers with moniker probability above a predetermined threshold may be used.

Figure 30:
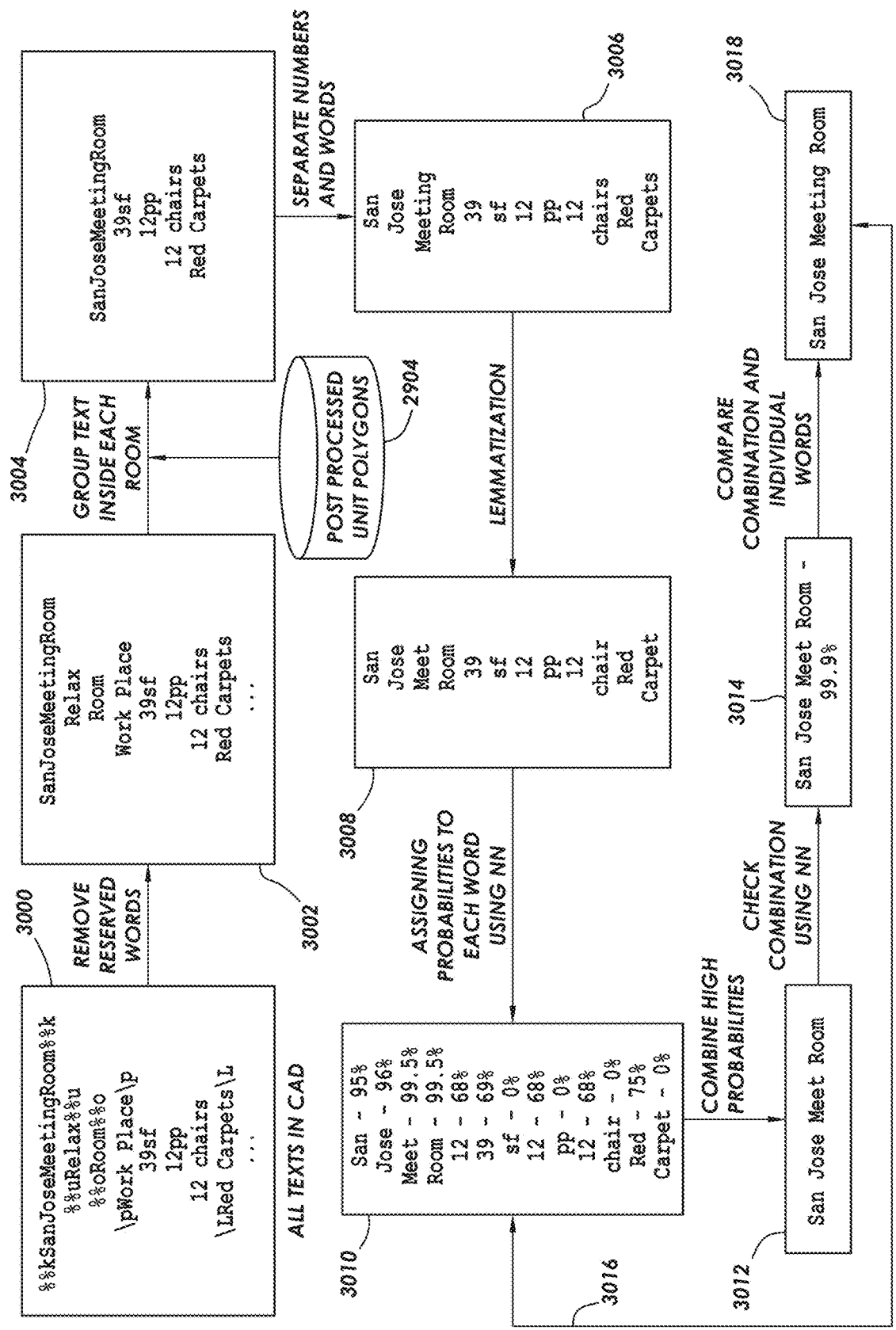
FIG. 30 shows a graphical representation of the extraction or selection of room names in accordance with at least some embodiments.

FIG. 30 shows a graphical representation of extracting or selecting a room name in conformance with the computer-implemented method above. In particular, the example starts with text in a text database, as illustrated in block 3000. Though in practice there may be a significant amount text in the text database, for purposes of discussion a representative sample of text is shown. The text shown in block 3000 spans not only a room of interest (e.g., a meeting room), but also at least one other room on the floor (e.g., relax room). The example text has all the formatting characters and reserved characters included at the stage illustrated by block 3000.

In the next example step, formatting characters and reserved words are removed from the text, with the resultant shown in block 3002. For example, in the character set "%%kSanJoseMeetingRoom%%k", both instances of the formatting characters "%%k" are removed from the sequence. Again, the resultant shown in block 3002 includes words and numbers associated with the room of interest, as well as words and numbers not associated with the room of interest.

In the next example step, the words and numbers are grouped based on each respective word's or number's location association. In particular, the grouping takes as input the text with the reserved characters removed (e.g., block 3002) and the room-level outlines (e.g., "Post Processed Unit Polygons" 2904 in the figure). The grouping creates, for each room, an indication of text associated with or inside the rooms. In the example of FIG. 30, the words and numbers associated with or inside a meeting room of interest are shown as grouped text in block 3004. Couple of points before proceeding. First, the room name is included in the grouped text, along with additional words and numbers that provide information about the room, such as the number of people the room is designed to hold, the number of chairs, and the color of the carpet. While a human can quickly extract the room name from the information provided, for a computer algorithm the extraction is not intuitive. Second, the grouping may not be a fully determinative process. For example, the indication of 39 square feet ("39sf") is likely not the true square footage of a conference room made for 12 people and 12 chairs. Nevertheless, the example step results in a set of grouped text.

In the next example step, words and numbers are separated, with the resultant as shown in block 3006. For example, the single string of characters "SanJoseMeetingRoom" is separated into four distinct words. As another example, the indication of 12 people ("12pp") is separated into the number 12 and the abbreviation for people ("pp").

The next step in the example may be lemmatization to form a plurality of lemmas, with the resultant as shown in block 3008. Lemmatization may be considered finding a root for a word, where prior to lemmatization the word may be presented in two more inflected forms. For example, the word "walk" may be presented in several inflected forms depending on the part of speech and usage, such as "walks", "walked", or "walking." Lemmatizing, or lemmatization, may thus be finding the root word, such as "walk" for any of the usages "walks", "walked", or "walking." In the context of the separated words as shown in block 3006, several of the words are already in lemma form, such as "San", "Room", and "Red." However, other words may be reduced to their lemma form, such as "Meet" for "Meeting," "chair" for "chairs," and "Carpet" for "Carpets."

The next step in the example is assigning member probabilities to each lemma, each member probability represents the likelihood of a lemma being a member of the name of the room of interest, as shown in block 3010. That is, a machine-learning algorithm, such as a neural network, is designed and trained to produce probabilities of each word or lemma being a member of the name of the room of interest. For example, the word "room" has a very high probability of being part of the room name, 99.5%; whereas, the word "carpet" has a very low probability of being part of the room name, 0%.

The next step in the example method is generating combinations of the lemmas having probability above a predetermined threshold, the generating creates a plurality of monikers. For example, lemmas having member probabilities of 95% and above may be combined. The example of FIG. 30 shows only a single proposed moniker, "San Jose Meet Room," but other monikers could be created, such as "Jose San Meet Room."

For each moniker created, a machine-learning algorithm, such as a neural network, checks each combination and assigns a moniker probability to each moniker. In FIG. 30, the example of "San Jose Meet Room" is assigned a moniker probability of 99.9%, as shown in block 3014. Again, while FIG. 30 shows only a single moniker and its respective moniker probability, in other examples several proposed monikers may be created, and each moniker may be assigned a moniker probability.

The next step in the example method is comparing the monikers and the lemmas to determine whether issues exist in the training, as implied by line 3016. The example representation of FIG. 30 does not show a case where further training is triggered. Assuming no issues in the training of the one or more neural networks, the name of the room may be selected to be the moniker with the highest moniker probability, such as "San Jose Meet Room" having a moniker probability of 99.9% of block 3014. The final example step is de-lemmatizing the name of the room, such as shown in block 3018, in this example arriving at "San Jose Meeting Room" as the final room name.

Export

Returning to FIG. 1, the final step in the example method is export 110. In example methods is taking the final floor image, one for each floor, and creating indoor maps suitable for indoor navigation. In one example case, each final floor image is exported into a GeoJSON format, though any suitable indoor map format may be used. The various examples discussed may be implemented with little or no human interaction, and thus greatly improves the speed and quality of creating indoor maps from CAD drawings.

Automated Training

Figure 31:
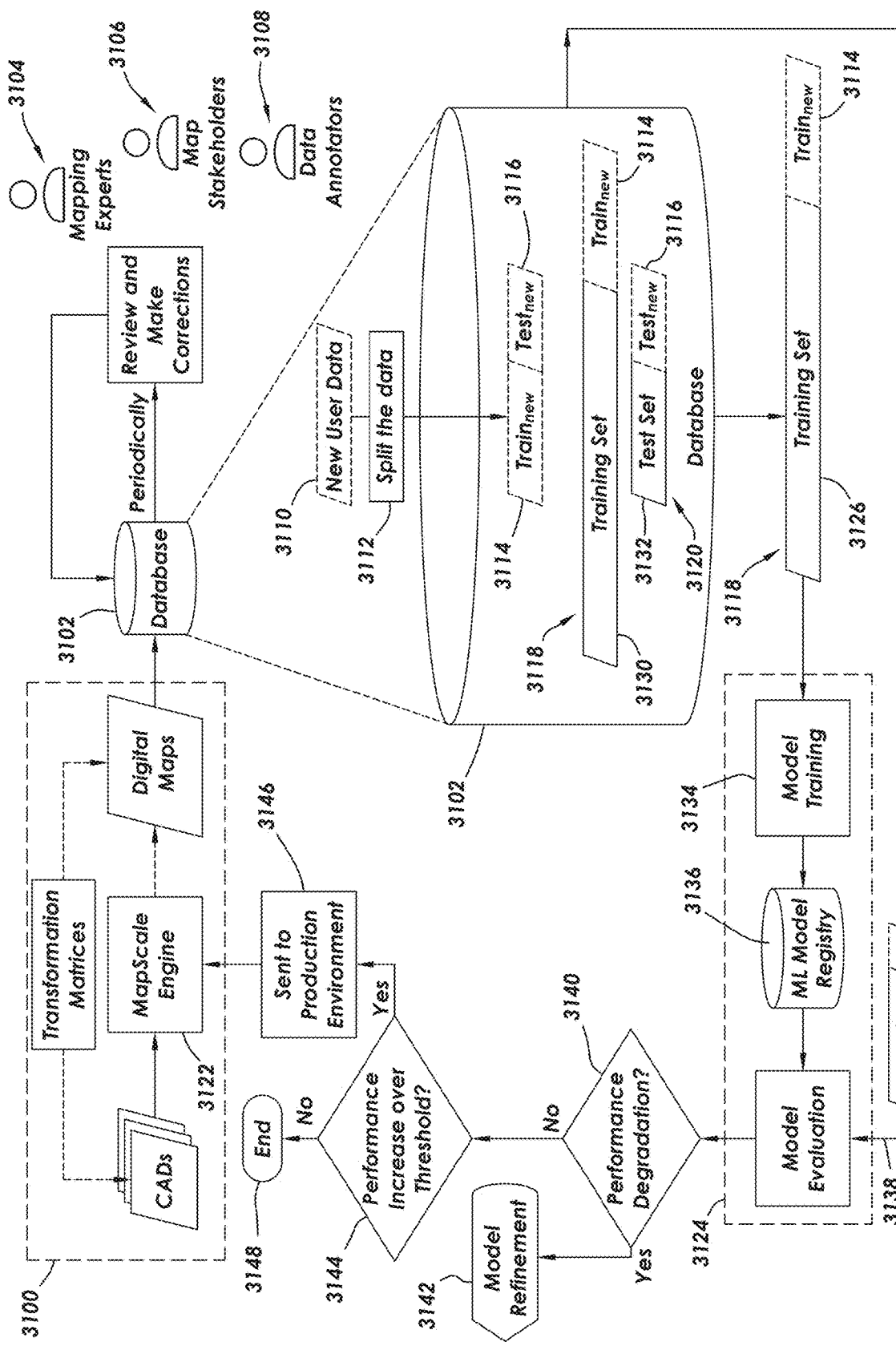
FIG. 31 shows a partial flow diagram, partial graphical representation, of automated training in accordance with at least some embodiments.

FIG. 31 shows a partial flow diagram, partial graphical representation, of automated training in accordance with at least some embodiments. In particular, the actions illustrated within the dashed box 3100 represent creating indoor maps from CAD drawings, in conformance with this specification. The resultant is one more indoor maps, which are placed in a database 3102. In accordance with example implementations, the indoor maps may be reviewed after creation by any number of reviewers in a periodic and asynchronous fashion. FIG. 31 shows three example reviewers in the form of mapping experts 3104, map stakeholders 3106 (e.g., building owners), and data annotators 3108. Moreover, the reviews may be based solely on the indoor maps themselves, the reviews may analyze the indoor maps in reference to the CAD drawings from which the indoor maps were formed, and/or the reviews may be based on "ground truth" in which an indoor map is compared to the physical space. Regardless of the reviewer identity, and the data (if any) against which the review is performed, updates or new user data 3110 are created and placed in the database 3102.

The updates or new user data may then be divided or split, as shown by block 3112. A portion of the new user data is used to create a training data set 3114, and another portion of the new user data is used to create a test data set 3116. In one example, the training data set 3114 is combined with existing training data 3130 to create an updated training data set 3118, and the test data set 3116 is combined with existing test data 3132 to create an updated test data set 3120. Stated otherwise, the example implementation generates the updated training data set 3118 by combining prior training data with a first portion of the new user data, and generates an updated test data set 3120 by combining prior test data with a second portion of the new user data.

The example implementation has two machine-learning systems. One machine-learning system is the production machine-learning system 3122 that generates the indoor maps from the CAD drawings, designated as the MapScale™ engine within the dashed box 3100. The second machine-learning system is an offline or supporting machine-learning system, generally shown within dashed box 3124, and hereafter just supporting machine-learning system. The supporting machine-learning system 3124 is used to evaluate how the new user data 3110 affects the one or more machine-learning models of the production machine-learning system 3122 before implementing the changes in the in the production machine-learning system 3122.

In various examples then, the supporting machine-learning system 3124 is trained using the updates to the indoor maps. More particularly, in various examples the supporting machine-learning system 3124 is trained, as illustrated by block 3134, with updated training data set 3118 comprising previously existing training data 3130 and the training data set 3114 derived from the new user data 3110. The training results in a machine-learning model registry 3136, having the parameters used to implement the machine-learning system, such as the weights and parameters of the nodes of a neural network. Once the supporting machine-learning system 3124 is trained, the updated test data set 3120 is applied to the supporting the machine-learning system 3124, as implied by line 3138. The resultant will be one more indoor maps. More particularly, when the updated test data set 3120 is applied to the supporting machine-learning system 3124, an evaluation indoor map is created along with an evaluation map accuracy.

The next step in the example method is a determination as to whether the newly trained supporting machine-learning system 3124 experienced a performance degradation, as shown in step 3140. Performance improvements and/or degradation may be determined by comparing the resultant indoor map to Ground Truth (e.g., comparing the map to the physical space). That is, if the updated training data set 3118 decreases the performance and accuracy of the supporting machine-learning system 3124, then of course the updated should not be transferred to the production machine-learning system 3122. If the updates result in degradation, then the example implementation moves to model refinement, as shown in block 3142, and as discussed in greater detail below. However, if the updates increase performance and/or accuracy of the supporting machine-learning system 3124, then those updates may be rolled out to the production machine-learning system 3122.

In some implementations, any update that results in increased performance and/or better map accuracy is automatically rolled out to the production machine-learning system 3112. For example, the machine-learning model registry 3136 may be copied to the production machine-learning system 3122. Alternatively, the production machine-learning system 3122 may be retrained with the updated training data set 3118. However, in other cases, the system may refrain from rolling out updates that result in minor improvements over the existing performance. In particular, in the example implementation a determination is made as to whether evaluation map accuracy is above predetermined threshold, as shown by block 3144. If the evaluation map accuracy is above a predetermined threshold (e.g., greater than 2% improvement), then the example method sends the updates to the production machine-learning system 3122, as shown by block 3146. If, on the other hand, the evaluation map accuracy is within a predetermined window above the production map accuracy (e.g., between 0.0% and 2.0%), then the example implementation may refrain from updating the production machine-learning system 3122, as shown by block 3148. It is noted, however, that the new user data is retained within the database 3102, and becomes part of the existing training data 3130 and the existing test data 3132 when second and subsequent updates are received from the example reviewers 3104, 3106, and 3108.

Still referring to FIG. 31, if the performance of the supporting machine-learning system 3124 is degraded based on the updated training data set 3118, as evaluated at block 3140, then the example method may proceed to model refinement. The reasons for a performance degradation in a situation where performance would be expected to increase are many. For example, it may be that the system experiences model drift attributable to statistical properties of the data (e.g., the CAD drawings) changing over time. As another related example, when new user data is applied to the production machine-learning system 3122, and where that new user data has significant statistical differences (e.g., CAD drawings produced by US architects versus CAD drawings produced by European architects). Whatever the case, a performance degradation may result model refinement, possibly in the form of manual intervention.

The model refinement may take any suitable form. For example, the various machine-learning models, such as neural networks, may have the registry weights manually and significantly altered based on the new user data 3110. In addition to or in place of the adjustments to the registry weights, the architecture of the machine-learning models, again such as neural networks, may be manually altered to account for statistically significant change in the data. If the model refined ultimately results in increased map accuracy, the updated machine-learning system may be rolled out the production environment. In some exceptional cases, one or more user's data may significantly differ from all other data. This may be due to geographical and/or architectural preferences. In such cases, a new user or new user group may be assigned to a more suitable machine-learning model. In such cases, when new user or new user group's data arrives, systems automatically switch and deploy in newly architected and trained machine-learning models.

Example Computer Environment

Figure 32:
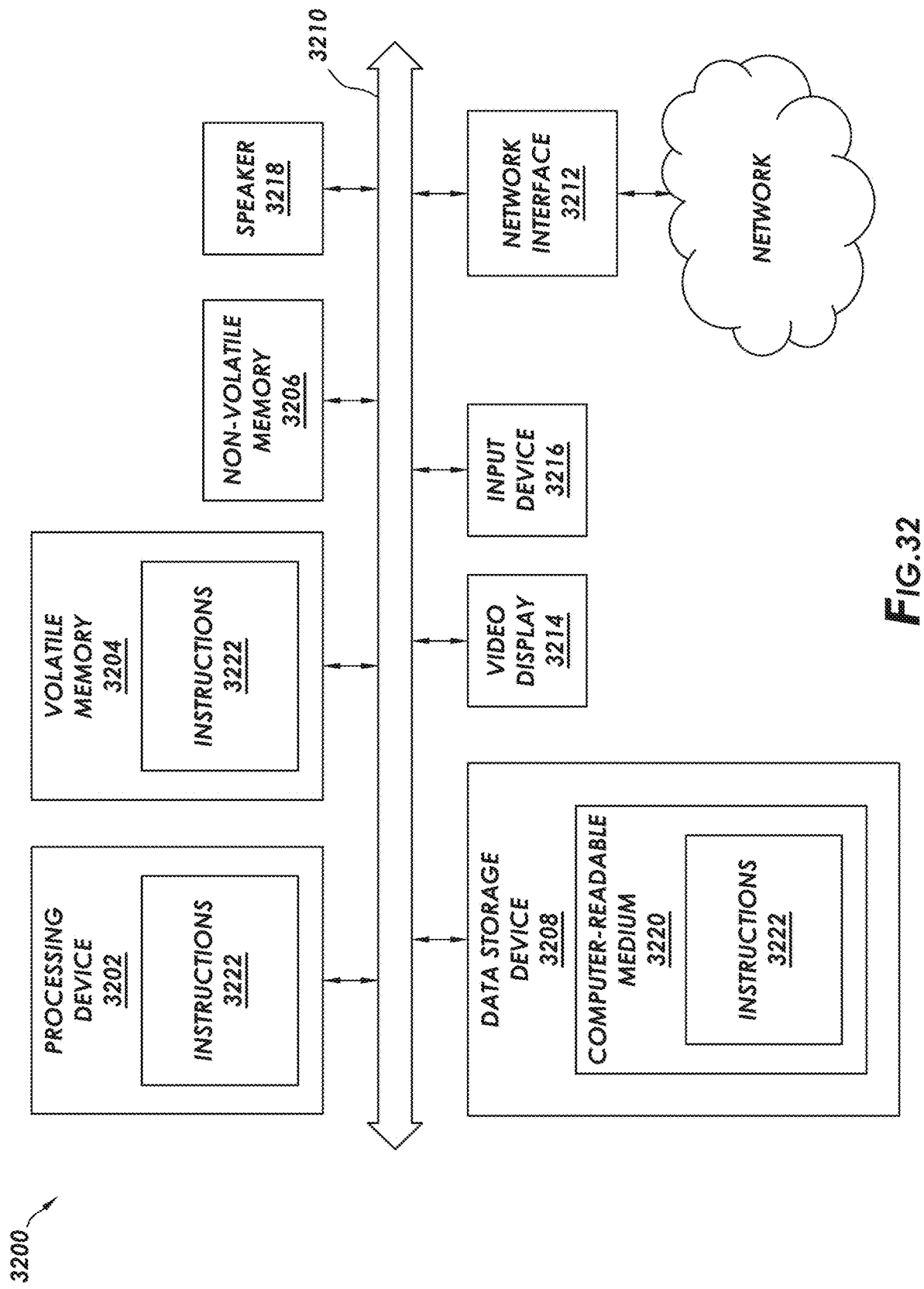
FIG. 32 shows a computer system in accordance with at least some embodiments.

FIG. 32 shows an example computer system 3200 which can perform any one or more of the methods described herein, in accordance with one or more aspects of the present disclosure. The computer system 3200 may be capable of executing any or all of the processes, machine-learning models, machine-learning systems, post processes, evaluators, and decision engines embodied in FIG. 1 and the remaining figures. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 3200 includes a processing device 3202, a volatile memory 3204 (e.g., random access memory (RAM)), a non-volatile memory 3206 (e.g., read-only memory (ROM), flash memory, solid state drives (SSDs), and a data storage device 3208, the foregoing of which are enabled to communicate with each other via a bus 3210.

Processing device 3202 represents one or more general-purpose processing devices such as a microprocessor, central processing unit, or the like. More particularly, the processing device 3202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 3202 may also be one or more special-purpose processing devices such as an application specific integrated circuit (ASIC), a system on a chip, a field programmable gate array (FPGA), a digital signal processor (DSP), network processor, or the like. The processing device 3202 may include more than one processing device, and each of the processing devices may be the same or different types. The processing device 3202 is configured to execute instructions for performing any of the operations and steps discussed herein.

The computer system 3200 may further include a network interface device 3212. The network interface device 3212 may be configured to communicate data (e.g., original CAD drawings, final indoor maps) via any suitable communication protocol. In some embodiments, the network interface devices 3212 may enable wireless (e.g., WiFi, Bluetooth, ZigBee, etc.) or wired (e.g., Ethernet, etc.) communications. The computer system 3200 also may include a video display 3214 (e.g., a liquid crystal display (LCD), a light-emitting diode (LED), an organic light-emitting diode (OLED), a quantum LED, a cathode ray tube (CRT), a shadow mask CRT, an aperture grille CRT, or a monochrome CRT), one or more input devices 3216 (e.g., a keyboard or a mouse), and one or more speakers 3218 (e.g., a speaker). In one illustrative example, the video display 3214 and the input device(s) 3216 may be combined into a single component or device (e.g., an LCD touch screen).

The network interface 3212 may transmit and receive data from a computer system application programming interface (API). The data may pertain to any suitable information described herein, such as a remaining useful life of floor outlines, room outlines, furniture identities and location, and indoor maps, among other information.

The data storage device 3208 may include a computer-readable storage medium 3220 on which the instructions 3222 embodying any one or more of the methods, operations, or functions described herein is stored. The instructions 3222 may also reside, completely or at least partially, within the volatile memory 3204 or within the processing device 3202 during execution thereof by the computer system 3200. As such, the volatile memory 3204 and the processing device 3202 also constitute computer-readable media. The instructions 3222 may further be transmitted or received over a network via the network interface device 3212.

While the computer-readable storage medium 3220 is shown in the illustrative examples to be a single medium, the term "computer-readable storage medium" should be taken to include a single medium or multiple media (e.g., a centralized or distributed database, or associated caches and servers) that store the one or more sets of instructions. The term "computer-readable storage medium" shall also be taken to include any medium capable of storing, encoding, or carrying a set of instructions for execution by the machine, where such set of instructions cause the machine to perform any one or more of the methodologies of the present disclosure. The term "computer-readable storage medium" shall accordingly be taken to include, but not be limited to, solid-state memories, optical media, and magnetic media.

The following clauses define various examples. The clauses are presented as computer-implemented method claims, but such clauses may be equivalently stated as non-transitory computer-readable medium claims and/or computer system claims:

Clause 1. A computer-implemented method of extracting room names from CAD drawings, the method comprising: preprocessing, by a device, a CAD drawing to create a text database containing text from the CAD drawing and associations of the text with locations within the CAD drawing; determining, by a device, a floor depicted in the CAD drawing, the determining results in a floor-level outline; identifying, by a device, a plurality of room-level outlines within the floor-level outline, the plurality of room-level outlines corresponds to a respective plurality of rooms; selecting, by a device, a name of a first room from the plurality of rooms, the selecting based on text within the text database; and creating, by a device, an indoor map including the name of the first room, the name of the first room associated with a location of the first room within the floor-level outline.

Clause 2. The computer-implemented method of clause 1 wherein selecting the name for the first room further comprises: grouping text in the text database associated with the first room, the grouping creates a first grouped text; lemmatizing words of the first grouped text to form a first plurality of lemmas; assigning a member probability to each lemma of the first plurality of lemmas, each member probability representing likelihood of a lemma being a member of the name of the first room; generating combinations of the first plurality of lemmas having probability above a predetermined threshold, the generating creates a first plurality of monikers; assigning a moniker probability to each moniker of the first plurality of monikers, each moniker probability representing likelihood of a moniker being the name of the first room; and selecting the name of the first room based on the first plurality of monikers and the moniker probabilities.

Clause 3. The computer-implemented method of clause 2 further comprising, after grouping but before lemmatizing, separating words and numbers of the first grouped text.

Clause 4. The computer-implemented method of clause 2 further comprising, after selecting the name of the first room, de-lemmatizing the name of the first room.

Clause 5. The computer-implemented method of clause 2 further comprising, before selecting the name of the first room: determining that the first plurality of monikers each lack a lemma having member probability above a predetermined threshold; and retraining a machine-learning model configured to generate the combinations of the first plurality of lemmas.

Clause 6. The computer-implemented method of clause 2 further comprising selecting a name for a second room, distinct from the first room, the selecting by: grouping text in the text database associated with the second room, the grouping creates a second grouped text; lemmatizing words of the second grouped text to form a second plurality of lemmas; assigning a member probability to each lemma of the second plurality of lemmas, each member probability of the second plurality of lemmas representing likelihood of a lemma being a member of the name of the second room; generating combinations of the second plurality of lemmas having probability above a predetermined threshold, the generating creates a second plurality of monikers; assigning a moniker probability to each moniker of the second plurality of monikers, each moniker probability of the second plurality of monikers representing likelihood of a moniker being the name of the second room; and selecting the name of the second room based on the second plurality of monikers and the moniker probabilities of the second plurality of monikers.

Clause 7. The computer-implemented method of clause 6 further comprising, after selecting the name of the second room, de-lemmatizing the name of the second room.

Clause 8. The computer-implemented method of clause 2 further comprising, prior to grouping text, removing predetermined characters.

Clause 9. The computer-implemented method of clause 8 wherein removing predetermined characters further comprises removing characters associated with formatting of the text.

Clause 10. The computer-implemented method of any preceding clause wherein determining the floor depicted in the CAD drawing further comprises receiving the floor-level outline from a user.

Clause 11. A computer system comprising: a processor; and a memory coupled to the processor. The memory storing instructions that, when executed by the processor, cause the processor to: preprocess a CAD drawing to create a text database containing text from the CAD drawing and associations of the text with locations within the CAD drawing; determine a floor depicted in the CAD drawing, the determining results in a floor-level outline; identify a plurality of room-level outlines within the floor-level outline, the plurality of room-level outlines corresponds to a respective plurality of rooms; select a name of a first room from the plurality of rooms, the selection based on text within the text database; and create an indoor map including the name of the first room, the name of the first room associated with a location of the first room within the floor-level outline.

Clause 12. The computer system of clause 11 wherein when the processor selects the name for the first room, the instructions further cause the processor to: group text in the text database associated with the first room, the grouping creates a first grouped text; lemmatize words of the first grouped text to form a first plurality of lemmas; assign a member probability to each lemma of the first plurality of lemmas, each member probability representing likelihood of a lemma being a member of the name of the first room; generate combinations of the first plurality of lemmas having probability above a predetermined threshold, the generating creates a first plurality of monikers; assign a moniker probability to each moniker of the first plurality of monikers, each moniker probability representing likelihood of a moniker being the name of the first room; and select the name of the first room based on the first plurality of monikers and the moniker probabilities.

Clause 13. The computer system of clause 12 wherein the instructions further cause the processor to, after grouping but before lemmatizing, separate words and numbers of the first grouped text.

Clause 14. The computer system of clause 12 wherein the instructions further cause the processor to, after select the name of the first room, de-lemmatize the name of the first room.

Clause 15. The computer system of clause 12 wherein the instructions further cause the processor to, before selecting the name of the first room: determine that the first plurality of monikers each lack a lemma having member probability above a predetermined threshold; and trigger retraining of a machine-learning model configured to generate the combinations of the first plurality of lemmas.

Clause 16. The computer system of clause 12 wherein the instructions further cause the processor to select a name for a second room, distinct from the first room, by causing the processor to: group text in the text database associated with the second room, the grouping creates a second grouped text; lemmatize words of the second grouped text to form a second plurality of lemmas; assign a member probability to each lemma of the second plurality of lemmas, each member probability of the second plurality of lemmas representing likelihood of a lemma being a member of the name of the second room; generate combinations of the first plurality of lemmas having probability above a predetermined threshold, the generating creates a second plurality of monikers; assign a moniker probability to each moniker of the second plurality of monikers, each moniker probability of the second plurality of monikers representing likelihood of a moniker being the name of the second room; and select the name of the second room based on the first plurality of monikers and the moniker probabilities of the second plurality of monikers.

Clause 17. The computer system of clause 16 wherein when the instructions further cause the processor to, after selecting the name of the second room, de-lemmatize the name of the second room.

Clause 18. The computer system of clause 12 wherein the instructions further cause the processor to, prior to grouping text, remove predetermined characters.

Clause 19. The computer system of clause 18 wherein when the processor removes predetermined characters, the instructions cause the processor to remove characters associated with formatting of the text.

Clause 20. The computer system of any of clauses 11-19 wherein when the processor determines the floor depicted in the CAD drawing, the instructions further cause the processor to receiving the floor-level outline from a user.

Clause 21. A computer-implemented method of determining a geo-location, the method comprising: determining, by a device, a floor-level outline of a floor depicted in a CAD drawing; receiving, by a device, an approximate geo-location of a building to which the CAD drawing applies; obtaining, by a device, an overhead image of a target area encompassing the approximate geo-location, the overhead image comprising a plurality of buildings within the target area; identifying, by a device, a plurality of building footprints within the target area; calculating, by a device, a plurality of distance functions that relate the floor-level outline to the each of the plurality of building footprints, the calculating creates a plurality of similarity scores; selecting, by a device, a building footprint from plurality of building footprints, the selecting based on the plurality of similarity scores; and calculating, by a device, a final geo-location of the building corresponding to the building footprint.

Clause 22. The computer-implemented method of clause 21 wherein calculating the plurality of distance functions further comprises calculating at least two selected from a group consisting of: a Hausdorf distance; a Modified Hausdorff distance; a Procrustes Shape Analysis; a Fréchet distance; and a turning distance.

Clause 23. The computer-implemented method of any of clauses 21-22 wherein calculating the plurality of distance functions further comprises, for each building footprint of the plurality of building footprints, combining a plurality of values indicative of similarity based on a respective plurality of weight values, the combining results in a similarity score.

Clause 24. The computer-implemented method of any of clauses 21-23 wherein selecting the building footprint further comprises: determining that at least two of the plurality of building footprints have similarity scores within a predetermined range of each other; selecting, as between the at least two of the plurality of building footprints, the building footprint closest to the approximate geo-location.

Clause 25. The computer-implemented method of clause 24 wherein determining that at least two of the plurality of building footprints have similarity scores within a predetermined range of each other further comprises determining that at least two of the plurality of building footprints have identical similarity scores.

Clause 26. The computer-implemented method of any of clauses 21-25 further comprising correcting the building footprint for at least one selected from the group consisting of: obliqueness of the overhead image; scale of the building footprint in relation to the floor-level outline; and rotational orientation of the building footprint in relation to the floor-level outline.

Clause 27. The computer-implemented method of any of clauses 21-26 wherein determining the floor-level outline further comprises: preprocessing, by a device, an original CAD drawing and thereby creating a modified CAD drawing, a text database containing text from the modified CAD drawing, a CAD vector-image of the modified CAD drawing, and a CAD raster-image of the modified CAD drawing; and applying the CAD raster-image, the CAD vector-image, and the text database to a floor-level machine-learning algorithm, the determining results in the floor-level outline.

Clause 28. The computer-implemented method of any of clauses 21-27 wherein determining the floor depicted in the CAD drawing further comprises receiving the floor-level outline from a user.

Clause 29. A computer system comprising: a processor; and a memory coupled to the processor. The memory storing instructions that, when executed by the processor, cause the processor to: determine a floor-level outline of a floor depicted in a CAD drawing; receive an approximate geo-location of a building to which the CAD drawing applies; obtain an overhead image of a target area encompassing the approximate geo-location, the overhead image comprising a plurality of buildings within the target area; identify a plurality of building footprints within the target area; calculate a plurality of distance functions that relate the floor-level outline to the each of the plurality of building footprints, the calculating creates a plurality of similarity scores; select a building footprint from plurality of building footprints, the selecting based on the plurality of similarity scores; and calculate a final geo-location of the building corresponding to the building footprint.

Clause 30. The computer system of clause 29 wherein when the processor calculates the plurality of distance functions, the instructions cause the processor to calculate at least two selected from a group consisting of: a Hausdorf distance; a Modified Hausdorff distance; a Procrustes Shape Analysis; a Fréchet distance; and a turning distance.

Clause 31. The computer system of any of clauses 29-30 wherein when the processor calculates the plurality of distance functions, the instructions further cause the processor to, for each building footprint of the plurality of building footprints, combine a plurality of values indicative of similarity based on a respective plurality of weight values, the combining results in a similarity score.

Clause 32. The computer system of any of clauses 29-31 wherein when the processor selects the building footprint, the instructions cause the processor to: determine that at least two of the plurality of building footprints have similarity scores within a predetermined range of each other; select, as between the at least two of the plurality of building footprints, the building footprint closest to the approximate geo-location.

Clause 33. The computer system of clause 32 wherein when the processor determines that at least two of the plurality of building footprints have similarity scores within a predetermined range of each other, the instructions further cause the processor to determine that at least two of the plurality of building footprints have identical similarity scores.

Clause 34. The computer system of any of clauses 29-33 wherein the instructions further cause the processor to correct the building footprint for at least one selected from the group consisting of: obliqueness of the overhead image; scale of the building footprint in relation to the floor-level outline; and rotational orientation of the building footprint in relation to the floor-level outline.

Clause 35. The computer system of any of clauses 29-34 wherein when the processor determines the floor-level outline, the instructions cause the processor to: preprocess an original CAD drawing and thereby creating a modified CAD drawing, a text database containing text from the modified CAD drawing, a CAD vector-image of the modified CAD drawing, and a CAD raster-image of the modified CAD drawing; and apply the CAD raster-image, the CAD vector-image, and the text database to a floor-level machine-learning algorithm, the determining results in the floor-level outline.

Clause 36. The computer system of any of clauses 29-35 wherein when the processor determines the floor depicted in the CAD drawing, the instructions cause the processor to receive the floor-level outline from a user.

Clause 37. A computer-implemented method of machine learning, the method comprising: receiving, by a device, a first set of updates to a first indoor map, the first indoor map previously created by a production machine-learning system having a production map accuracy; training, by a device, a supporting machine-learning system using the first set of updates to the first indoor map; and then applying, by a device, test data to the supporting machine-learning system, the applying results in first-evaluation indoor map with a first-evaluation map accuracy; and when the first-evaluation map accuracy is within a predetermined window above the production map accuracy refraining, by a device, from updating the production machine-learning system based on the first set of updates.

Clause 38. The computer-implemented method of clause 37 further comprising, when the first-evaluation map accuracy is below the production map accuracy, triggering, by a device, a manual intervention for the supporting machine-learning system.

Clause 39. The computer-implemented method of any of clauses 37-38 wherein training further comprises training the support machine-learning system with a training set incorporating at least a portion of the first set of updates and original CAD drawings.

Clause 40. The computer-implemented method of any of clauses 37-39 further comprising: receiving, by a device, a second set of updates to an indoor map; training, by a device, the supporting machine-learning system using the first and second sets of updates, the training results in a second-support machine-learning registry; and then applying, by a device, test data to the supporting machine-learning system, the applying results in a second-evaluation indoor map with a second-evaluation map accuracy; and when second-evaluation map accuracy is greater than the production map accuracy updating, by a device, a production machine-learning registry of the production machine-learning system.

Clause 41. The computer-implemented method of clause 40 wherein the test data includes changes based on the second set of updates.

Clause 42. The computer-implemented method of clause 40 wherein the test data includes changes based on the first and second set of updates.

Clause 43. The computer-implemented method of any of clauses 37-42 wherein receiving the first set of updates to the first indoor map further comprises receiving from a plurality of human reviewers.

Clause 44. The computer-implemented method of clause 43 wherein receiving from the plurality of human reviewers comprises receiving from reviews that are asynchronous.

Clause 45. A computer system comprising: a processor; and a memory coupled to the processor. The memory storing instructions that, when executed by the processor, cause the processor to: receive a first set of updates to a first indoor map, the first indoor map previously created by a production machine-learning system having a production map accuracy; train a supporting machine-learning system using the first set of updates to the first indoor map; and then apply test data to the supporting machine-learning system, the applying results in first-evaluation indoor map with a first-evaluation map accuracy; and when the first-evaluation map accuracy is within a predetermined window above the production map accuracy refrain from updating the production machine-learning system based on the first set of updates.

Clause 46. The computer system of clause 45 wherein the instructions further cause the processor to, when the first-evaluation map accuracy is below the production map accuracy, trigger a manual intervention for the supporting machine-learning system.

Clause 47. The computer system of any of clauses 45-46 wherein when the processor trains the supporting machine-learning system, the instructions cause the processor to train the support machine-learning system with a training set incorporating at least a portion of the first set of updates and original CAD drawings.

Clause 48. The computer system of any of clauses 45-46 wherein the instructions further cause the processor to: receive a second set of updates to an indoor map; train the supporting machine-learning system using the first and second sets of updates, the training results in a second-support machine-learning registry; and then apply test data to the supporting machine-learning system, the applying results in a second-evaluation indoor map with a second-evaluation map accuracy; and when second-evaluation map accuracy is greater than the production map accuracy update a production machine-learning registry of the production machine-learning system.

Clause 49. The computer system of clause 48 wherein the test data includes changes based on the second set of updates.

Clause 50. The computer system of clause 48 wherein the test data includes changes based on the first and second set of updates.

Clause 51. The computer system of any of clauses 45-46 wherein when the processor receives the first set of updates to the first indoor map, the instructions cause the processor to receive from a plurality of human reviewers.

Clause 52. The computer system of clause 51 wherein when the processor receives from the plurality of human reviewers, the instructions cause the processor to receive from reviews that are asynchronous.

The above discussion is meant to be illustrative of the principles and various embodiments of the present invention. Numerous variations and modifications will become apparent to those skilled in the art once the above disclosure is fully appreciated. For example. It is intended that the following claims be interpreted to embrace all such variations and modifications.

What is claimed is:

1. A computer-implemented method of extracting room names from CAD drawings, the method comprising:
    preprocessing, by a device, a CAD drawing to create a text database containing text from the CAD drawing and associations of the text with locations within the CAD drawing;
    determining, by a device, a floor depicted in the CAD drawing, the determining results in a floor-level outline;
    identifying, by a device, a plurality of room-level outlines within the floor-level outline, the plurality of room-level outlines corresponds to a respective plurality of rooms;
    selecting, by a device, a name of a first room from the plurality of rooms, the selecting based on text within the text database, wherein selecting the name for the first room further comprises:
        grouping text in the text database associated with the first room, the grouping creates a first grouped text,
        lemmatizing words of the first grouped text to form a first plurality of lemmas;
        assigning a member probability to each lemma of the first plurality of lemmas, each member probability representing likelihood of a lemma being a member of the name of the first room,
        generating combinations of the first plurality of lemmas having probability above a predetermined threshold, the generating creates a first plurality of monikers,
        determining that the first plurality of monikers each lack a lemma having member probability above a predetermined threshold,
        retraining a machine-learning model configured to generate the combinations of the first plurality of lemmas, assigning a moniker probability to each moniker of the first plurality of monikers, each moniker probability representing likelihood of a moniker being the name of the first room, and selecting the name of the first room based on the first plurality of monikers and the moniker probabilities; and creating, by a device, an indoor map including the name of the first room, the name of the first room associated with a location of the first room within the floor-level outline.

2. The computer-implemented method of claim 1 further comprising, after grouping but before lemmatizing, separating words and numbers of the first grouped text.

3. The computer-implemented method of claim 1 further comprising, after selecting the name of the first room, de-lemmatizing the name of the first room.

4. The computer-implemented method of claim 1 further comprising selecting a name for a second room, distinct from the first room, the selecting by:

grouping text in the text database associated with the second room, the grouping creates a second grouped text;

lemmatizing words of the second grouped text to form a second plurality of lemmas;

assigning a member probability to each lemma of the second plurality of lemmas, each member probability of the second plurality of lemmas representing likelihood of a lemma being a member of the name of the second room;

generating combinations of the second plurality of lemmas having probability above a predetermined threshold, the generating creates a second plurality of monikers;

assigning a moniker probability to each moniker of the second plurality of monikers, each moniker probability of the second plurality of monikers representing likelihood of a moniker being the name of the second room; and selecting the name of the second room based on the second plurality of monikers and the moniker probabilities of the second plurality of monikers.

5. The computer-implemented method of claim 4 further comprising, after selecting the name of the second room, de-lemmatizing the name of the second room.

6. The computer-implemented method of claim 1 further comprising, prior to grouping text, removing predetermined characters.

7. The computer-implemented method of claim 6 wherein removing predetermined characters further comprises removing characters associated with formatting of the text.

8. The computer-implemented method of claim 1 wherein determining the floor depicted in the CAD drawing further comprises receiving the floor-level outline from a user.

9. A computer system comprising:
a processor;
a memory coupled to the processor, the memory storing instructions that, when executed by the processor, cause the processor to:
preprocess a CAD drawing to create a text database containing text from the CAD drawing and associations of the text with locations within the CAD drawing;
determine a floor depicted in the CAD drawing, the determining results in a floor-level outline;

identify a plurality of room-level outlines within the floor-level outline, the plurality of room-level outlines corresponds to a respective plurality of rooms;

select a name of a first room from the plurality of rooms, the selection based on text within the text database, wherein when the processor selects the name for the first room, the instructions further cause the processor to:

group text in the text database associated with the first room, the grouping creates a first grouped text, lemmatize words of the first grouped text to form a first plurality of lemmas, assign a member probability to each lemma of the first plurality of lemmas, each member probability representing likelihood of a lemma being a member of the name of the first room, generate combinations of the first plurality of lemmas having probability above a predetermined threshold, the generating creates a first plurality of monikers, determine that the first plurality of monikers each lack a lemma having member probability above a predetermined threshold, trigger retraining of a machine-learning model configured to generate the combinations of the first plurality of lemmas, assign a moniker probability to each moniker of the first plurality of monikers, each moniker probability representing likelihood of a moniker being the name of the first room, and select the name of the first room based on the first plurality of monikers and the moniker probabilities; and create an indoor map including the name of the first room, the name of the first room associated with a location of the first room within the floor-level outline.

10. The computer system of claim 9 wherein the instructions further cause the processor to, after grouping but before lemmatizing, separate words and numbers of the first grouped text.

11. The computer system of claim 10 wherein the instructions further cause the processor to, after select the name of the first room, de-lemmatize the name of the first room.

12. The computer system of claim 9 wherein the instructions further cause the processor to select a name for a second room, distinct from the first room, by causing the processor to:

group text in the text database associated with the second room, the grouping creates a second grouped text;

lemmatize words of the second grouped text to form a second plurality of lemmas;

assign a member probability to each lemma of the second plurality of lemmas, each member probability of the second plurality of lemmas representing likelihood of a lemma being a member of the name of the second room;

generate combinations of the first plurality of lemmas having probability above a predetermined threshold, the generating creates a second plurality of monikers;

assign a moniker probability to each moniker of the second plurality of monikers, each moniker probability of the second plurality of monikers representing likelihood of a moniker being the name of the second room; and select the name of the second room based on the first plurality of monikers and the moniker probabilities of the second plurality of monikers.

13. The computer system of claim 12 wherein when the instructions further cause the processor to, after selecting the name of the second room, de-lemmatize the name of the second room.

14. The computer system of claim 9 wherein the instructions further cause the processor to, prior to grouping text, remove predetermined characters.

15. The computer system of claim 14 wherein when the processor removes predetermined characters, the instructions cause the processor to remove characters associated with formatting of the text.

16. The computer system of claim 9 wherein when the processor determines the floor depicted in the CAD drawing, the instructions further cause the processor to receiving the floor-level outline from a user.

* * * * *